(12) United States Patent
Horita

(10) Patent No.: US 9,723,178 B2
(45) Date of Patent: Aug. 1, 2017

(54) PRINTED COLOR PREDICTION METHOD AND DEVICE, PROFILE GENERATION METHOD AND DEVICE, COLOR CONVERSION METHOD AND DEVICE, AND COLOR CONVERSION SYSTEM

(71) Applicant: FUJIFILM Corporation, Tokyo (JP)

(72) Inventor: Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/854,742

(22) Filed: Sep. 15, 2015

(65) Prior Publication Data
US 2016/0080607 A1   Mar. 17, 2016

(30) Foreign Application Priority Data

Sep. 16, 2014 (JP) ................................. 2014-187733
Sep. 16, 2014 (JP) ................................. 2014-187734

(51) Int. Cl.
*G06K 15/00* (2006.01)
*G06K 1/00* (2006.01)
(Continued)

(52) U.S. Cl.
CPC ............... *H04N 1/52* (2013.01); *H04N 1/603* (2013.01); *H04N 1/6033* (2013.01); *H04N 1/6097* (2013.01)

(58) Field of Classification Search
None
See application file for complete search history.

(56) References Cited

U.S. PATENT DOCUMENTS

2004/0076803 A1\* 4/2004 Jaynes ...................... B32B 7/12
428/195.1
2005/0275857 A1   12/2005 Kondo et al.
(Continued)

FOREIGN PATENT DOCUMENTS

EP   2284511 A1   2/2011
EP   2302897 A2   3/2011
(Continued)

OTHER PUBLICATIONS

Communication dated Feb. 2, 2016 from the European Patent Office in application No. 15184515.3.
(Continued)

*Primary Examiner* — Vincent Rudolph
*Assistant Examiner* — Michael Burleson
(74) *Attorney, Agent, or Firm* — Sughrue Mion, PLLC

(57) ABSTRACT

A printed color prediction method includes: a step of acquiring the spectral reflectance in a protective film non-coating region of a printed matter that the protective film does not coat; a step of estimating the optical physical property value of the protective film; a step of acquiring the spectral distribution of an observation light source; a step of estimating the color change property due to the interaction between the printed matter as a base matter and the protective film; and a step of predicting the colorimetric value of a protective film-attached printed matter, based on the acquired spectral reflectance of the printed matter, the optical physical property value of the protective film, the spectral distribution of the observation light source and the color change property due to the interaction.

12 Claims, 24 Drawing Sheets

(51) Int. Cl.
*H04N 1/52* (2006.01)
*H04N 1/60* (2006.01)

(56) References Cited

U.S. PATENT DOCUMENTS

2011/0077921 A1* 3/2011 Horita ..................... H04N 1/60
                                                        703/2
2011/0216335 A1 9/2011 Horita

FOREIGN PATENT DOCUMENTS

| | | |
|---|---|---|
| JP | 2003-289446 A | 10/2003 |
| JP | 2003-326749 A | 11/2003 |
| JP | 2004-153554 A | 5/2004 |
| JP | 2006-24971 A | 1/2006 |
| JP | 2011-75304 A | 4/2011 |
| JP | 2011-188091 A | 9/2011 |
| WO | 03095212 A1 | 11/2003 |

OTHER PUBLICATIONS

Hoffstadt J: "Simulating color changes due to coating of offset prints", Final Programme and Proceedings of CGIV 2004, Second European Conference on Color in Graphics, Imaging, and Vision and Sixth International Symposium on Multispectral Color Science : Apr. 5-8, 2004, Technology Center AGIT, Aachen, Germany, SPRINGFI, Apr. 5, 2004 (Apr. 5, 2004), pp. 489-493.
Communication dated Nov. 1, 2016, from the Japanese Patent Office in counterpart Japanese application No. 2014-187733.

* cited by examiner

PRINTED COLOR PREDICTION METHOD AND DEVICE, PROFILE GENERATION METHOD AND DEVICE, COLOR CONVERSION METHOD AND DEVICE, AND COLOR CONVERSION SYSTEM

CROSS-REFERENCE TO RELATED APPLICATIONS

The patent application claims priority under 35 U.S.C. §119 to Japanese Patent Application Nos. 2014-187733 and 2014-187734, filed on Sep. 16, 2014. Each of the above application(s) is hereby expressly incorporated by reference, in its entirety, into the present application.

BACKGROUND OF THE INVENTION

Field of the Invention

The present invention relates to a printed color prediction method and device, a profile generation method and device, a program, a color conversion method and device, and a color conversion system, and particularly, relates to a technology for predicting a color reproduction on a protective film-attached printed matter in which a protective film coats a printed matter, as well as a technology for color conversion.

Description of the Related Art

It is known that the image formation surface of a printed matter is coated with a protective film and thereby the durability of the image and the quality of the printed surface are enhanced (Japanese Patent Application Laid-Open No. 2011-75304). The term "image formation surface" is synonymous with the "printed surface". The color tone of a printed matter varies between a state in which the printed surface is coated with a protective film and a state of non-coating. As the protective film, there are various types. In the case where there are enormous combinations of the type of the protective film and the printed matter (the resulting matter in which the paper sheet, the ink and the printing condition are combined), an extreme trouble is required for generating profiles for the color reproduction on protective film-attached printed matters with respect to all combinations. Therefore, it is difficult to operate the color management including the protective film.

For this problem, a technology for estimating the optical physical property value of the protective film and easily predicting the color reproduction on the protective film-attached printed matter has been proposed (Japanese Patent Application Laid-Open No. 2011-75304 and No. 2011-188091). In Japanese Patent Application Laid-Open No. 2011-75304, there is proposed a method allowing for the reduction of the working man-hours required for the generation of the profile, without decreasing the color reproduction accuracy for the protective film-attached printed matter. In Japanese Patent Application Laid-Open No. 2011-75304, a configuration of acquiring the spectral reflectance of the printed matter, estimating the optical physical property value of the protective film and predicting the spectral reflectance of the protective film-attached printed matter using the acquired spectral reflectance and optical physical property value is adopted.

SUMMARY OF THE INVENTION

The technology described in Japanese Patent Application Laid-Open No. 2011-75304 predicts the color of the protective film-attached printed matter by applying the Kubelka-Munk model. In the Kubelka-Munk model, the relation of the light intensity in the incident direction, the light intensity in the reflection direction, and the scattering and absorption of light is simplified to a single dimension and is modeled, on the assumption that an isotropic and homogeneous light scattering/absorption layer infinitely extends at a constant film thickness on a uniform base matter. It is understood that the "base matter" is an element corresponding to the "printed matter" in the present invention. Further, it is understood that the "light scattering/absorption layer" is an element corresponding to the "protective film" in the present invention.

In a printed matter expressing a shade or the like by the area coverage modulation, a paper-white region and a solid print region fit with the assumption of the "uniform base matter", but a middle tone portion reproduced by halftone dot is not the "uniform base matter", resulting in a deviation from the assumption (premise) in the Kubelka-Munk model.

The inventor in the present application has newly found out that the coating of the printed surface of the printed matter with the protective film has an effect of increasing the dot gain of the middle tone compared to before the coating with the protective film. Also, the inventor in the present application has found out that the degree of the increase effect of the dot gain varies depending on the type of the protective film. However, a new problem has been found out in that the effect of the dot gain due to the coating with the protective film cannot be considered in the conventional color prediction method based on the Kubelka-Munk model, and in the conventional technology, the color prediction accuracy is reduced for a protective film having a great increase effect of the dot gain.

The present invention, which has been made in view of such circumstances, has an object to provide a printed color prediction method, a profile creation method and device, and a program that make it possible to solve the above problem and to further enhance the color prediction accuracy for the protective film-attached printed matter compared to the conventional technology.

Further, the present invention has an object to provide a color conversion method and device, a program and a color conversion system that make it possible to solve the above problem and to much more enhance the accuracy of the color reproduction on the protective film-attached printed matter compared to the conventional technology.

For achieving the above objects, the following invention aspects are provided.

A printed color prediction method according to a first aspect is a printed color prediction method for predicting a color reproduction on a protective film-attached printed matter in which a protective film coats a printed matter, the printed color prediction method including: a spectral reflectance acquisition step of acquiring a spectral reflectance in a protective film non-coating region of the printed matter, the printed matter having a printed surface that the protective film does not coat; an optical physical property value estimation step of performing a process of estimating an optical physical property value of the protective film; a spectral distribution acquisition step of acquiring a spectral distribution of an observation light source for the protective film-attached printed matter; an interaction property estimation step of performing a process of estimating a color change property due to an interaction between the printed matter as a base matter and the protective film, the printed matter being coated with the protective film; and a prediction step of predicting a colorimetric value of the protective film-attached printed matter, based on the spectral reflectance of the printed matter acquired by the spectral reflectance acquisition step, the optical physical property value of the protective film estimated by the optical physical property value estimation step, the spectral distribution of the observation light source acquired by the spectral distribution acquisition step and the color change property due to the interaction estimated by the interaction property estimation step.

The "protective film non-coating region of the printed matter" means a region of the printed surface that the protective film does not coat. The "process of estimating" includes a process of calculating a value using a computation expression, a function, a look up table or the like that are previously decided. The "process of estimating the optical physical property value of the protective film" includes a computation process of determining the optical physical property value from a physical quantity such as an actual measurement value. The "process of estimating the color change property due to the interaction" includes a process of determining, by computation or the like, data that indicates the color change property due to the interaction.

According to the first aspect, the process of the color prediction in consideration of the color change property due to the interaction between the printed matter as the base matter and the protective film is performed, and therefore, it is possible to enhance the color prediction accuracy, compared to the conventional color prediction method.

A second aspect can have a configuration in which the color change property due to the interaction is a dot gain property that indicates a dot gain increase amount due to the interaction between the protective film and the printed matter as the base matter, in the printed color prediction method according to the first aspect.

A third aspect can have a configuration in which the optical physical property value of the protective film includes two independent optical physical property values of an intrinsic reflectance, a scattering coefficient and an absorption coefficient of the protective film for each light wavelength, in the printed color prediction method according to the first aspect or the second aspect.

A fourth aspect can have a configuration in which the optical physical property value estimation step includes: a first acquisition step of acquiring spectral reflectances of at least two types of base matters that the protective film does not coat; a second acquisition step of acquiring spectral reflectances in a state in which the protective film is arranged on each of the at least two types of base matters; and a computation step of determining a relational expression based on a mathematical model, for each of the at least two types of base matters, using the respective spectral reflectances acquired in the respective steps of the first acquisition step and the second acquisition step and the optical physical property value of the protective film as an unknown value, and simultaneously solving the relational expression for each of the base matters, and the optical physical property value of the protective film is estimated based on a computation process in the computation step, in the printed color prediction method according to any one aspect of the first aspect to the third aspect.

A fifth aspect can have a configuration in which in the interaction property estimation step, the process of estimating the color change property due to a change in dot gain as the interaction is performed based on a dot gain property in a case of presence of the protective film and a dot gain property in a case of absence of the protective film, the case of the presence of the protective film being a case of a state in which the protective film coats each of multiple types of base matters, the case of the absence of the protective film being a case of a state in which the protective film does not coat each of the multiple types of base matters, the multiple types of base matters having a monochromatic gradation by different halftone dot area ratios, in the printed color prediction method according to any one aspect of the first aspect to the fourth aspect.

A sixth aspect can have a configuration in which the interaction property estimation step includes: a step of calculating a dot gain increase amount that indicates a difference between a dot gain amount for a primary color in the case of the presence of the protective film and a dot gain amount for the primary color in the case of the absence of the protective film; and a step of specifying a relation between the halftone dot area ratio of the base matter in the case of the absence of the protective film and the dot gain increase amount, in the printed color prediction method according to the fifth aspect.

A seventh aspect can have a configuration in which the interaction property estimation step includes: a correction parameter acquisition step of acquiring a correction parameter for correcting data that indicates the color change property due to the interaction between the printed matter as the base matter and the protective film, the printed matter being coated with the protective film; and a correction process step of correcting the color change property using the correction parameter, in the printed color prediction method according to any one aspect of the first aspect to the sixth aspect.

An eighth aspect can have a configuration in which the data that indicates the color change property due to the interaction is data that indicates a dot gain increase amount property for a primary color, and the correction parameter is a parameter that indicates an inhibition ratio of a dot gain increase amount relevant to a multi-order color of a secondary or higher color, in the printed color prediction method according to the seventh aspect.

A ninth aspect can have a configuration in which the prediction step includes: a first process step of performing a process of predicting a spectral reflectance of the protective film-attached printed matter, based on a mathematical model, using the optical physical property value estimated by the optical physical property value estimation step; and a second process step of modifying the spectral reflectance of the protective film-attached printed matter predicted by the first process step, or a predicted color value calculated based on the spectral reflectance of the protective film-attached printed matter predicted by the first process step, using the color change property due to the interaction estimated by the interaction property estimation step, in the printed color prediction method according to any one aspect of the first aspect to the eighth aspect.

A profile generation method according to a tenth aspect is a profile generation method including: a decision process step of predicting the colorimetric value of the protective film-attached printed matter from a spectral reflectance of a color chart as the printed matter, using the printed color prediction method according to any one aspect of the first aspect to the ninth aspect, and further deciding a colorimetric value corresponding to each grid point of a color conversion table, based on the predicted colorimetric value of the protective film-attached printed matter; and a generation process step of generating a profile based on the colorimetric value corresponding to each grid point of the color conversion table.

A printed color prediction device according to an eleventh aspect is a printed color prediction device for predicting a color reproduction on a protective film-attached printed matter in which a protective film coats a printed matter, the printed color prediction device including: a spectral reflectance acquisition unit that acquires a spectral reflectance in a protective film non-coating region of the printed matter, the printed matter having a printed surface that the protective film does not coat; an optical physical property value estimation unit that performs a process of estimating an optical physical property value of the protective film; a spectral distribution acquisition unit that acquires a spectral distribution of an observation light source for the protective film-attached printed matter; an interaction property estimation unit that performs a process of estimating a color change property due to an interaction between the printed matter as a base matter and the protective film, the printed matter being coated with the protective film; and a prediction unit that predicts a colorimetric value of the protective film-attached printed matter, based on the spectral reflectance of the printed matter acquired by the spectral reflectance acquisition unit, the optical physical property value of the protective film estimated by the optical physical property value estimation unit, the spectral distribution of the observation light source acquired by the spectral distribution acquisition unit and the color change property due to the interaction estimated by the interaction property estimation unit.

In the printed color prediction device according the eleventh aspect, it is possible to appropriately combine the same matters as the specified matters of the printed color prediction methods specified in the second aspect to the ninth aspect. In that case, it is possible to understand the steps and processing contents specified in the printed color prediction methods, as elements of the processing units and function units corresponding to these.

A profile generation device according to a twelfth aspect is a profile generation device including: the printed color prediction device according to the eleventh aspect; a decision process unit that decides a colorimetric value corresponding to each grid point of a color conversion table, based on the colorimetric value of the protective film-attached printed matter predicted from a spectral reflectance of a color chart as the printed matter by the prediction unit; and a generation process unit that generates a profile based on the colorimetric value corresponding to each grid point of the color conversion table.

In the profile generation device according the twelfth aspect, it is possible to appropriately combine the same matters as the specified matters of the printed color prediction methods specified in the second aspect to the ninth aspect. In that case, it is possible to understand the steps and processing contents specified in the printed color prediction methods, as elements of the processing units and function units corresponding to these.

A program according to a thirteenth aspect is a program for making a computer implement a function of predicting a color reproduction on a protective film-attached printed matter in which a protective film coats a printed matter, the computer implementing: a spectral reflectance acquisition function of acquiring a spectral reflectance in a protective film non-coating region of the printed matter, the printed matter having a printed surface that the protective film does not coat; an optical physical property value estimation function of performing a process of estimating an optical physical property value of the protective film; a spectral distribution acquisition function of acquiring a spectral distribution of an observation light source for the protective film-attached printed matter; an interaction property estimation function of performing a process of estimating a color change property due to an interaction between the printed matter as a base matter and the protective film, the printed matter being coated with the protective film; and a prediction function of predicting a colorimetric value of the protective film-attached printed matter, based on the spectral reflectance of the printed matter acquired by the spectral reflectance acquisition function, the optical physical property value of the protective film estimated by the optical physical property value estimation function, the spectral distribution of the observation light source acquired by the spectral distribution acquisition function and the color change property due to the interaction estimated by the interaction property estimation function.

In the program according to the thirteenth aspect, it is possible to appropriately combine the same matters as the specified matters of the printed color prediction methods specified in the second aspect to the ninth aspect. In that case, it is possible to understand the steps and processing contents specified in the printed color prediction methods, as elements of the "functions" of the program for performing processes and operations corresponding to these.

A color conversion method according to a fourteenth aspect is a color conversion method for performing a color conversion using an input-side profile and an output-side profile, in which a color conversion process of image data is performed based on the input-side profile and the output-side profile, using a profile generated by a profile generation process as the input-side profile or the output-side profile, the profile generation process including: a spectral reflectance acquisition step of acquiring a spectral reflectance in a protective film non-coating region of a printed matter, the printed matter having a printed surface that a protective film does not coat; an optical physical property value estimation step of performing a process of estimating an optical physical property value of the protective film; a spectral distribution acquisition step of acquiring a spectral distribution of an observation light source for a protective film-attached printed matter in which the protective film coats the printed matter; an interaction property estimation step of performing a process of estimating a color change property due to an interaction between the printed matter as a base matter and the protective film, the printed matter being coated with the protective film; a prediction step of predicting a colorimetric value of the protective film-attached printed matter, based on the spectral reflectance of the printed matter acquired by the spectral reflectance acquisition step, the optical physical property value of the protective film estimated by the optical physical property value estimation step, the spectral distribution of the observation light source acquired by the spectral distribution acquisition step and the color change property due to the interaction estimated by the interaction property estimation step; a decision process step of deciding a colorimetric value corresponding to each grid point of a color conversion table, based on the colorimetric value of the protective film-attached printed matter predicted from a spectral reflectance of a color chart as the printed matter; and a generation process step of generating the profile based on the decided colorimetric value corresponding to each grid point of the color conversion table.

According to the fourteenth aspect, the process of the color prediction in consideration of the color change property due to the interaction between the printed matter as the base matter and the protective film is performed, and therefore, it is possible to enhance the color prediction accuracy, compared to the conventional color prediction method. The color conversion process is performed using the profile generated by this highly accurate a color prediction process, and therefore, the accuracy of the color reproduction on the protective film-attached printed matter is enhanced much more.

A fifteenth aspect can have a configuration of including: a step of generating a first profile based on a colorimetric value corresponding to each grid point of a first color conversion table, by applying the profile generation process to a first protective film-attached printed matter in which a first protective film coats a first printed matter, predicting a colorimetric value of the first protective film-attached printed matter from a spectral reflectance of a first color chart as the first printed matter, and deciding the colorimetric value corresponding to each grid point of the first color conversion table based on the obtained colorimetric value of the first protective film-attached printed matter; and a step of generating a second profile based on a colorimetric value corresponding to each grid point of a second color conversion table, by applying the profile generation process to a second protective film-attached printed matter in which a second protective film coats a second printed matter, predicting a colorimetric value of the second protective film-attached printed matter from a spectral reflectance of a second color chart as the second printed matter, and deciding the colorimetric value corresponding to each grid point of the second color conversion table based on the obtained colorimetric value of the second protective film-attached printed matter, in which the color conversion process is performed using the first profile as the input-side profile and using the second profile as the output-side profile, in the color conversion method according to the fourteenth aspect.

A sixteenth aspect can have a configuration in which the first protective film and the second protective film are the same protective film, in the color conversion method according to the fifteenth aspect.

A seventeenth aspect can have a configuration in which the first printed matter and the second printed matter are printed by different printing machines from each other, in the color conversion method according to the sixteenth aspect.

An eighteenth aspect can have a configuration in which the color change property due to the interaction is a dot gain property that indicates a dot gain increase amount due to the interaction between the protective film and the printed matter as the base matter, in the color conversion method according to any one aspect of the fourteenth aspect to the seventeenth aspect.

A nineteenth aspect can have a configuration in which the optical physical property value of the protective film includes two independent optical physical property values of an intrinsic reflectance, a scattering coefficient and an absorption coefficient of the protective film for each light wavelength, in the color conversion method according to any one aspect of the fourteenth aspect to the eighteenth aspect.

A twentieth aspect can have a configuration in which the optical physical property value estimation step includes: a first acquisition step of acquiring spectral reflectances of at least two types of base matters that the protective film does not coat; a second acquisition step of acquiring spectral reflectances in a state in which the protective film is arranged on each of the at least two types of base matters; and a computation step of determining a relational expression based on a mathematical model, for each of the at least two types of base matters, using the respective spectral reflectances acquired in the respective steps of the first acquisition step and the second acquisition step and the optical physical property value of the protective film as an unknown value, and simultaneously solving the relational expression for each of the base matters, and the optical physical property value of the protective film is estimated based on a computation process in the computation step, in the color conversion method according to any one aspect of the fourteenth aspect to the nineteenth aspect.

A twenty-first aspect can have a configuration in which in the interaction property estimation step, the process of estimating the color change property due to a change in dot gain as the interaction is performed based on a dot gain property in a case of presence of the protective film and a dot gain property in a case of absence of the protective film, the case of the presence of the protective film being a case of a state in which the protective film coats each of multiple types of base matters, the case of the absence of the protective film being a case of a state in which the protective film does not coat each of the multiple types of base matters, the multiple types of base matters having a monochromatic gradation by different halftone dot area ratios, in the color conversion method according to any one aspect of the fourteenth aspect to the twentieth aspect.

A twenty-second aspect can have a configuration in which the interaction property estimation step includes: a step of calculating a dot gain increase amount that indicates a difference between a dot gain amount for a primary color in the case of the presence of the protective film and a dot gain amount for the primary color in the case of the absence of the protective film; and a step of specifying a relation between the halftone dot area ratio of the base matter in the case of the absence of the protective film and the dot gain increase amount, in the color conversion method according to the twenty-first aspect.

A twenty-third aspect can have a configuration in which the interaction property estimation step includes: a correction parameter acquisition step of acquiring a correction parameter for correcting data that indicates the color change property due to the interaction between the printed matter as the base matter and the protective film, the printed matter being coated with the protective film; and a correction process step of correcting the color change property using the correction parameter, in the color conversion method according to any one aspect of the fourteenth aspect to the twenty-second aspect.

A twenty-fourth aspect can have a configuration in which the data that indicates the color change property due to the interaction is data that indicates a dot gain increase amount property for a primary color, and the correction parameter is a parameter that indicates an inhibition ratio of a dot gain increase amount relevant to a multi-order color of a secondary or higher color, in the color conversion method according to the twenty-third aspect.

A twenty-fifth aspect can have a configuration in which the prediction step includes: a first process step of performing a process of predicting a spectral reflectance of the protective film-attached printed matter, based on a mathematical model, using the optical physical property value estimated by the optical physical property value estimation step; and a second process step of modifying the spectral reflectance of the protective film-attached printed matter predicted by the first process step, or a predicted color value calculated based on the spectral reflectance of the protective film-attached printed matter predicted by the first process step, using the color change property due to the interaction estimated by the interaction property estimation step, in the color conversion method according to any one aspect of the fourteenth aspect to the twenty-fourth aspect.

A color conversion device according to a twenty-sixth aspect is a color conversion device for performing a color conversion using an input-side profile and an output-side profile, the color conversion device including a color conversion unit that performs a color conversion process of image data, based on the input-side profile and the output-side profile, using a profile generated by a profile generation process as the input-side profile or the output-side profile, the profile generation process including: a spectral reflectance acquisition process of acquiring a spectral reflectance in a protective film non-coating region of a printed matter, the printed matter having a printed surface that a protective film does not coat; an optical physical property value estimation process of performing a process of estimating an optical physical property value of the protective film; a spectral distribution acquisition process of acquiring a spectral distribution of an observation light source for a protective film-attached printed matter in which the protective film coats the printed matter; an interaction property estimation process of performing a process of estimating a color change property due to an interaction between the printed matter as a base matter and the protective film, the printed matter being coated with the protective film; a prediction process of predicting a colorimetric value of the protective film-attached printed matter, based on the spectral reflectance of the printed matter acquired by the spectral reflectance acquisition process, the optical physical property value of the protective film estimated by the optical physical property value estimation process, the spectral distribution of the observation light source acquired by the spectral distribution acquisition process and the color change property due to the interaction estimated by the interaction property estimation process; a decision process of deciding a colorimetric value corresponding to each grid point of a color conversion table, based on the colorimetric value of the protective film-attached printed matter predicted from a spectral reflectance of a color chart as the printed matter; and a generation process of generating the profile based on the decided colorimetric value corresponding to each grid point of the color conversion table.

In the color conversion device according to the twenty-sixth aspect, it is possible to appropriately combine the same matters as the specified matters of the color conversion methods specified in the fifteenth aspect to the twenty-fifth aspect. In that case, it is possible to understand the steps and processing contents specified in the color conversion methods, as elements of the processing units and function units corresponding to these.

A program according to a twenty-seventh aspect is a program for making a computer implement a color conversion function of performing a color conversion using an input-side profile and an output-side profile, the color conversion function being a function of performing a color conversion process of image data, based on the input-side profile and the output-side profile, using a profile generated by a profile generation process as the input-side profile or the output-side profile, the profile generation process including: a spectral reflectance acquisition process of acquiring a spectral reflectance in a protective film non-coating region of a printed matter, the printed matter having a printed surface that a protective film does not coat; an optical physical property value estimation process of performing a process of estimating an optical physical property value of the protective film; a spectral distribution acquisition process of acquiring a spectral distribution of an observation light source for a protective film-attached printed matter in which the protective film coats the printed matter; an interaction property estimation process of performing a process of estimating a color change property due to an interaction between the printed matter as a base matter and the protective film, the printed matter being coated with the protective film; a prediction process of predicting a colorimetric value of the protective film-attached printed matter, based on the spectral reflectance of the printed matter acquired by the spectral reflectance acquisition process, the optical physical property value of the protective film estimated by the optical physical property value estimation process, the spectral distribution of the observation light source acquired by the spectral distribution acquisition process and the color change property due to the interaction estimated by the interaction property estimation process; a decision process of deciding a colorimetric value corresponding to each grid point of a color conversion table, based on the colorimetric value of the protective film-attached printed matter predicted from a spectral reflectance of a color chart as the printed matter; and a generation process of generating the profile based on the decided colorimetric value corresponding to each grid point of the color conversion table.

In the program according to the twenty-seventh aspect, it is possible to appropriately combine the same matters as the specified matters of the color conversion methods specified in the fifteen aspect to the twenty-fifth aspect. In that case, it is possible to understand the steps and processing contents specified in the color conversion methods, as elements of the "functions" of the program for performing processes and operations corresponding to these.

A color conversion system according to a twenty-eighth aspect is a color conversion system including: a spectral reflectance acquisition unit that acquires a spectral reflectance in a protective film non-coating region of a printed matter, the printed matter having a printed surface that a protective film does not coat; an optical physical property value estimation unit that performs a process of estimating an optical physical property value of the protective film; a spectral distribution acquisition unit that acquires a spectral distribution of an observation light source for a protective film-attached printed matter in which the protective film coats the printed matter; an interaction property estimation unit that performs a process of estimating a color change property due to an interaction between the printed matter as a base matter and the protective film, the printed matter being coated with the protective film; a prediction unit that predicts a colorimetric value of the protective film-attached printed matter, based on the spectral reflectance of the printed matter acquired by the spectral reflectance acquisition unit, the optical physical property value of the protective film estimated by the optical physical property value estimation unit, the spectral distribution of the observation light source acquired by the spectral distribution acquisition unit and the color change property due to the interaction estimated by the interaction property estimation unit; a decision process unit that decides a colorimetric value corresponding to each grid point of a color conversion table, based on the colorimetric value of the protective film-attached printed matter predicted from a spectral reflectance of a color chart as the printed matter; a generation process unit that generates a profile based on the decided colorimetric value corresponding to each grid point of the color conversion table; and a color conversion unit that performs a color conversion using an input-side profile and an output-side profile, the color conversion unit performing a color conversion process of image data, based on the input-side profile and the output-side profile, using the profile generated by the generation process unit as the input-side profile or the output-side profile.

The color conversion system according to the twenty-eighth aspect can be configured as a part of an image processing device or an image processing system that processes image data for print. Further, the color conversion system can be configured as a part of a printing system that includes a printing machine.

In the color conversion system according to the twenty-eighth aspect, it is possible to appropriately combine the same matters as the specified matters of the color conversion methods specified in the fifteenth aspect to the twenty-fifth aspect. In that case, it is possible to understand the steps and processing contents specified in the color conversion methods, as elements of the processing units and function units corresponding to these.

According to the first aspect to the thirteenth aspect of the present invention, it is possible to much more enhance the color prediction accuracy for the protective film-attached printed matter, compared to the conventional technology.

According to the fourteenth aspect to the twenty-eighth aspect of the present invention, the color conversion process is performed using the profile generated by the color prediction process with a higher color prediction accuracy compared to the conventional technology, and therefore, it is possible to perform the color reproduction on the protective film-attached printed matter much more properly.

DETAILED DESCRIPTION OF THE PREFERRED EMBODIMENTS

Hereinafter, modes for embodying the present invention are described in detail, in accordance with the accompanying drawings.

[Increase in Optical Dot Gain Due to Interaction Between Protective Film and Base Printed Matter]

First, the phenomenon of the increase in optical dot gain due to the interaction between a protective film and a base printed matter, which has been found out by the inventor in the present application, is explained.

Generally, there is known a phenomenon called an optical dot gain in which a printed matter expressed by an area coverage modulation, relative to a physical halftone dot area ratio, increases the light absorbed by ink (that is, decreases the reflectance) due to the scattering of the light within the paper sheet, and increase the halftone dot area ratio in appearance. The inventor in the present application has found out that the coating of the printed matter with a protective film causes a phenomenon in which the optical dot gain is further increased compared to before the coating with the protective film. Here, unless otherwise noted, "area ratio" is an abbreviation of "halftone dot area ratio."

Figure 1:
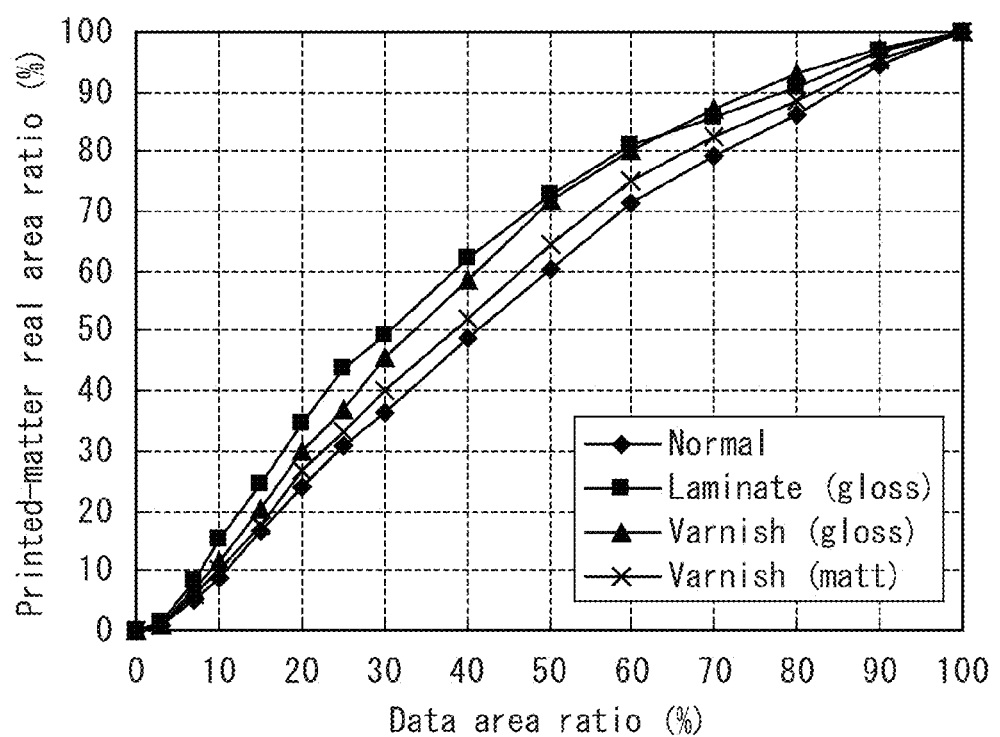
FIG. 1 is a graph showing the relation between the area ratio for data and the real area ratio for a printed matter.

The graph shown in FIG. 1 is an example in which the relation between the area ratio for data and the real area ratio for a printed matter is plotted for each of a protective film-absence printed matter that is not coated with a protective film and protective film-presence printed matters in which the printed matters are coated with various protective films. FIG. 1 shows an example of the cyan gradation by flexographic printing.

The abscissa in FIG. 1 indicates the area ratio for image data (referred to as the "data area ratio"), and the ordinate indicates the real area ratio for the printed matter (referred to as the "printed-matter real area ratio"). The printed-matter real area ratio is a real area ratio including a mechanical dot gain, which is the phenomenon of the physical extension of a halftone dot region, and an optical dot gain.

In FIG. 1, the protective film-absence printed matter is described as "Normal". Further, FIG. 1 shows an example in which three kinds of a gloss type laminate, a gloss type varnish and a matt type varnish are used, and they are described as "Laminate (gloss)", "Varnish (gloss)" and "Varnish (matt)", respectively.

The real area ratio for the printed matter can be determined from the Murray-Davies expression. Specifically, in a certain monochromatic gradation, when the colorimetric value at an area ratio of 0% (paper white) is represented as Xw, the colorimetric value at an area ratio of 100% (solid) is represented as Xs and the colorimetric value at the data area ratio of a real area ratio calculation object is represented as X, the real area ratio to the data area ratio of the object is expressed as the following expression.

$$\text{Real area ratio} = \{(Xw-X)/(Xw-Xs)\} \times 100$$

Here, in the case of the cyan gradation, the real area ratio is calculated using the X among the XYZ values. This is because the X value involves the greatest change among the XYZ values in the cyan gradation and therefore it is possible to reduce the influence of measurement errors. In the calculation, it is preferable that the Y value be used in the magenta gradation, the Z value be used in the yellow gradation and the Y value be used in the black gradation. Similarly, in the case of the application to the ink other than CMYK, it is preferable that the real area ratio be calculated using a value among the XYZ values that involves a great change.

Figure 2:
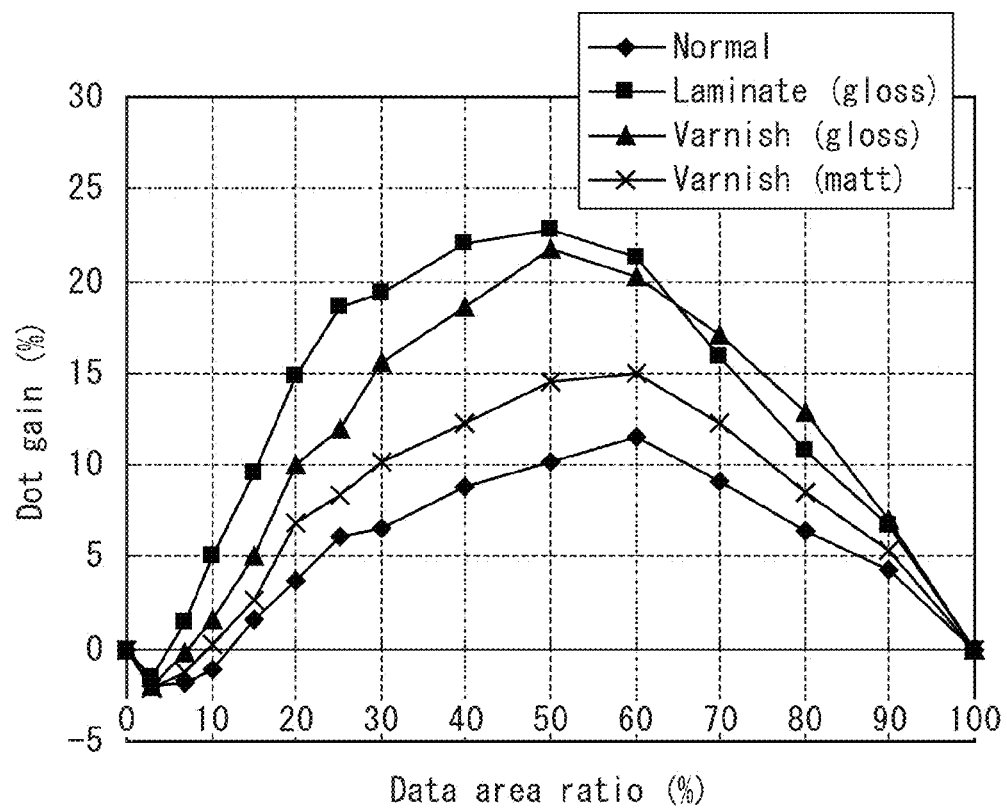
FIG. 2 is a graph showing the relation between the area ratio for the data and the dot gain amount.

FIG. 2 is a graph in which the dot gain amount (printed-matter real area ratio−data area ratio) is calculated based on the graph of FIG. 1 and the dot gain amount (real area ratio−data area ratio) is displayed as the ordinate.

As shown in FIG. 2, it is found that all of the printed matters after the coating with the protective film increase the dot gain amount, compared to the protective film-absence printed matter (normal). This is due to the interaction between the protective film and the printed matter. Here, it seems that the mechanical dot gain hardly changes by the coating with the protective film, and it is presumed that the increase in the optical dot gain is dominant as the factor of the increase in the dot gain amount shown in FIG. 2. As described above, it has been revealed that the dot gain increases by the coating with the protective film.

However, in the color prediction model based on the Kubelka-Munk model described in Japanese Patent Application Laid-Open No. 2011-75304, the increase in the dot gain due to the interaction between the protective film and the printed matter is not considered. Therefore, in the technology described in Japanese Patent Application Laid-Open No. 2011-75304, there is a problem in that the color prediction accuracy is low for a protective film that has a great effect on the dot gain increase due to the interaction.

An embodiment of the present invention provides a technology for the color prediction in consideration of the effect of the increase in the dot gain due to the interaction between the protective film and the printed matter.

Here, as the color change due to the interaction between the protective film and the printed matter, other than the change by the effect of the increase in the dot gain, there can be a phenomenon in which the ink itself on the printed matter discolors by the influence of a solvent contained in an adhesive for the protective film (surface treatment), the heat at the time of the treatment and the like. However, it seems that the effect of the "increase in the dot gain" described herein is basically dominant.

Outline of Embodiment

Figure 3:
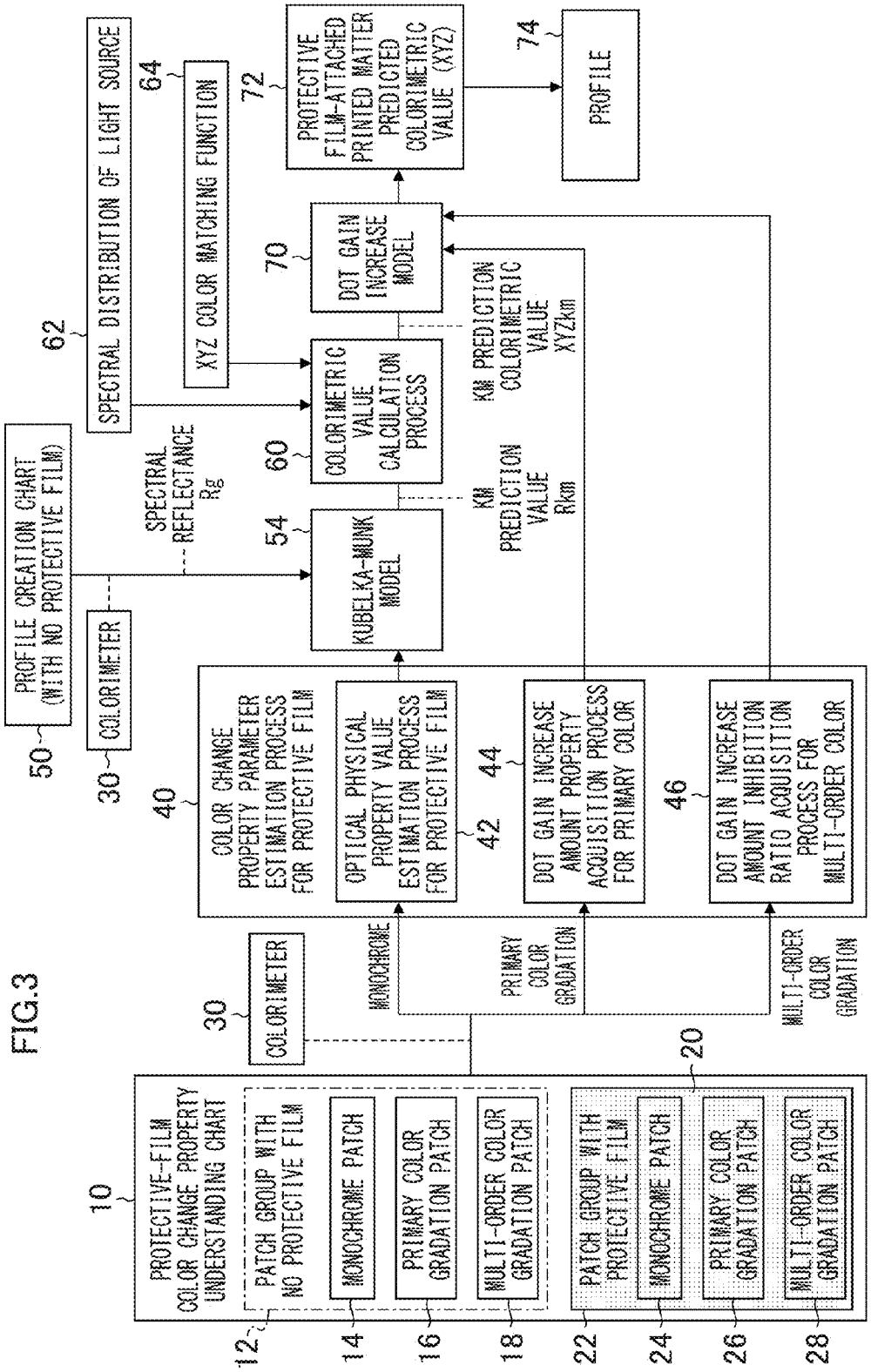
FIG. 3 is an explanatory diagram showing the outline of a printed color prediction method according to an embodiment.

FIG. 3 is an explanatory diagram showing the outline of a printed color prediction method according to the embodiment. In the printed color prediction method according to the embodiment, as the color change property parameter of the protective film, the dot gain increase amount property as the color change property due to the interaction between the protective film and the printed matter is used in addition to the use of the optical physical property value of the protective film.

Therefore, in the printed color prediction method according to the embodiment, a protective-film color change property understanding chart 10 is created for acquiring the color change property parameter of the protective film. The protective-film color change property understanding chart 10 includes a monochrome patch 14, a primary color gradation patch 16 and a multi-order color gradation patch 18, as a patch group 12 with no protective film. Further, the protective-film color change property understanding chart 10 includes a monochrome patch 24, a primary color gradation patch 26 and a multi-order color gradation patch 28, as a patch group 22 with the protective film by the coating with a protective film 20.

The term "with the protective film" means the state of being coated with the protective film, and is synonymous with "protective film-attached" and "after the coating with the protective film". The term "with no protective film" means the state of being not coated with the protective film, and is synonymous with "without the protective film" and "before the coating with the protective film". These terms are not limited to the meaning for specifying the presence or absence of the protective film for the whole surface of the printed surface, and can be understood as the meaning for specifying the presence or absence of the protective film for an attention-paid image region of a part of the printed surface.

The monochrome patches 14, 24 are patches for understanding the light scattering and absorption properties that are optical physical property values of the protective film 20.

The primary color gradation patches 16, 26 are patches for understanding the dot gain increase amount property for a primary color. The primary color gradation patches 16, 26 include patches with multiple gradations in which gradation values are changed in stages. For example, the primary color gradation patches 16, 26 can be gradation patches for K in which the gradation is changed at a pitch of 10% in a range of 0 to 100% for black (K) as a primary color. Further, the primary color gradation patches 16, 26 can be gradation patches for each color in which the gradations are changed at a pitch of 10% in a range of 0 to 100% respectively for each color of cyan (C), magenta (M), yellow (Y) and black (K) as primary colors.

The multi-order color gradation patches 18, 28 are patches for understanding the dot gain increase amount inhibition ratio for multi-order colors. The multi-order color gradation patches 18, 28 include patches with multiple gradations in which the gradation values are changed in stages for each of the secondary colors, the tertiary color and the quaternary color. For example, the multi-order color gradation patches 18, 28 can be gradation patches in which the gradations are changed at a pitch of 20%, in a balance of an equal amount for each color, for each of CM, MY and YC as the secondary colors, CMY as the tertiary color and CMYK as the quaternary color. However, it is preferable to exclude 0% and 100%.

Here, although the detail is described later, a configuration in which the dot gain increase amount property for the primary color is applied also to the multi-order color without using the dot gain increase amount inhibition ratio for the multi-order color is also possible. In this case, a mode in which the multi-order color gradation patches 18, 28 are omitted is also possible.

For the protective film 20, a laminate, varnish, transparent ink, clear toner, or an acrylic plate, and various other materials can be used, or an appropriate combination of them may be used. The protective-film color change property understanding chart 10 is created for each type of the protective film.

It is preferable to be a mode in which the protective-film color change property understanding chart 10 is formed as a single printed matter including the patch group 12 with no protective film and the patch group 22 with the protective film, but in the implementation of the invention, the patch groups of the protective-film color change property understanding chart 10 may be divided into multiple paper sheets (printed media) and may be form separately. For example, the patch group 12 with no protective film and the patch group 22 with the protective film may be created as separate printed matters from each other.

Next, the colorimetry of the patches (14 to 18, 24 to 28) of the protective-film color change property understanding chart 10 is performed with a colorimeter 30. As the colorimeter 30, a spectral colorimeter is used. The spectral colorimeter can measure the reflectance in the wavelength region of visible light, in units of a predetermined wavelength pitch width, and can acquire the colorimetric value by calculating an XYZ value using an XYZ color matching function that indicates the spectral sensitivity for human visual sense. For example, the colorimeter 30 measures the reflectance in a wavelength region of 380 nanometers [nm] to 730 nanometers [nm], which is the wavelength region of visible light, in units of a wavelength pitch width (wavelength step) of 10 nanometers [nm].

A process of estimating the color change property parameter of the protective film 20 is performed based on the colorimetric information of each of the patches (14 to 18) with no protective film and the patches (24 to 28) with the protective film. In FIG. 3, this was described as a block of "color change property parameter estimation process 40 for protective film". The color change property parameter of the protective film 20 is classified into three kinds shown as the following (a) to (c). That is, it is classified into three: (a) the optical physical property value of the protective film, (b) the dot gain increase amount property for the primary color due to the interaction between the protective film and the printed matter, and (c) the dot gain increase amount inhibition ratio for the multi-order color.

(a) Optical Physical Property Value for Protective Film

The optical physical property value for the protective film includes the intrinsic reflectance, the scattering coefficient and the absorption coefficient that indicate the optical property (light scattering and absorption) of the protective film. However, there is a relational expression among the three of the intrinsic reflectance, the scattering coefficient and the absorption coefficient (see Expression (9) described later), and therefore, there are two independent parameters among them. The intrinsic reflectance is represented as "R∞", the scattering coefficient is represented as "Sx", and the absorption coefficient is represented as "Kx". "S" is the scattering coefficient per unit thickness, and "x" is the thickness. Here, as for the definition of the scattering coefficient, the scattering coefficient (that is, one variable) at a film thickness x is defined as Sx (=S·x) that is the product of S and x, but any of S and Sx may be used. Further, as the definition of the absorption coefficient, similarly, the absorption coefficient K per unit thickness may be used, or the absorption coefficient at the film thickness x may be defined as Kx (=K·x) that is the product of K and x.

The intrinsic reflectance R∞, the scattering coefficient Sx and the absorption coefficient Kx are parameters that depend on the wavelength respectively. The intrinsic reflectance R∞ is synonymous with a "spectral intrinsic reflectance R∞".

The optical physical property value of the protective film is estimated based on the respective colorimetric results of the monochrome patch 14 with no protective film and the monochrome patch 24 with the protective film. In FIG. 3, the block of the process of estimating the optical physical property value of the protective film is described as "optical physical property value estimation process 42 for protective film".

(b) Dot Gain Increase Amount Property for Primary Color Due to Interaction Between Protective Film and Printed Matter The dot gain increase amount property for the primary color due to the interaction between the protective film and the printed matter may be a parameter Δdg that is common to all colors of CMYK, or may be parameters ΔCdg, ΔMdg, ΔYdg, ΔKdg on a gradation basis, for the respective colors of CMYK. The dot gain increase amount property for the primary color is a parameter that depends on the real area ratio of the base printed matter coated with the protective film. The dot gain increase amount property for the primary color is acquired based on the respective colorimetric results of the primary color gradation patch 16 with no protective film and the primary color gradation patch 26 with the protective film. In FIG. 3, the block of the process of acquiring the dot gain increase amount property for the primary color is described as "dot gain increase amount property acquisition process 44 for primary color".

(c) Dot Gain Increase Amount Inhibition Ratio for Multi-Order Color

The dot gain increase amount inhibition ratio for the multi-order color is a parameter for considering that the optical dot gain increase amount due to the protective film for the multi-order color is small compared to the primary color. The dot gain increase amount inhibition ratio for the multi-order color has a role as a correction parameter (correction coefficient) for correcting the parameter value, in order to apply the dot gain increase amount parameter for the primary color to the multi-order color. For example, the dot gain increase amount inhibition ratio for the multi-order color can be set so as to have a secondary color correction parameter α, a tertiary color correction parameter β and a quaternary color correction parameter γ.

The dot gain increase amount inhibition ratio for the multi-order color is acquired based on the respective colorimetric results of the multi-order color gradation patch 18 with no protective film and the multi-order color gradation patch 28 with the protective film. In FIG. 3, the block of the process of acquiring the dot gain increase amount inhibition ratio for the multi-order color is described as "dot gain increase amount inhibition ratio acquisition process 46 for multi-order color".

The detail of an estimation method of the respective parameters classified into the above-described (a) to (c) and a color prediction model using these parameters are described later.

As shown in FIG. 3, the color change property parameter estimation process 40 for the protective film includes the optical physical property value estimation process 42 for the protective film, the dot gain increase amount property acquisition process 44 for the primary color, and the dot gain increase amount inhibition ratio acquisition process 46 for the multi-order color. However, the dot gain increase amount inhibition ratio for the multi-order color is positioned as a "correction parameter", and a mode in which the dot gain increase amount inhibition ratio acquisition process 46 for the multi-order color is omitted is also possible.

While the color change property parameter of the protective film is estimated and the parameters necessary for the computation of the color prediction are acquired, a profile creation chart 50 with no protective film is output, and the colorimetry of each patch of the profile creation chart 50 is performed with the colorimeter 30. The profile creation chart 50 is a color chart that is used for creating an ICC (International Color Consortium) profile. The printed surface of the profile creation chart 50 is not coated with the protective film. In the profile creation chart 50 with no protective film, the whole surface of the printed surface falls under a "protective film non-coating region".

By performing the colorimetry of the profile creation chart 50 with the colorimeter 30, the spectral reflectance Rg(C, M, Y, K) of a protective film-absence printed matter is obtained. In FIG. 3, this is described as "spectral reflectance Rg", for simple description.

The process of predicting a spectral reflectance Rkm(C, M, Y, K) after the color change due to the optical property (the light scattering property and absorption property herein) of the protective film is performed for the spectral reflectance Rg(C, M, Y, K) of the protective film-absence printed matter obtained by the colorimetry of the profile creation chart 50.

That is, a Kubelka-Munk model 54 is applied to the spectral reflectance Rg(C, M, Y, K) of the protective film-absence printed matter, based on the optical physical property value (the combination of R∞ and Sx) of the protective film, and thereby, the spectral reflectance Rkm(C, M, Y, K) of the KM prediction value is obtained. In FIG. 3, this was described as "KM prediction value Rkm", for simple description. The notation of the KM prediction value means the value predicted from the Kubelka-Munk model 54.

The Kubelka-Munk model 54 is a color prediction model using a relational expression KM(Rg, R∞, Sx) that is known as the Kubelka-Munk model described in Japanese Patent Application Laid-Open No. 2011-75304.

Next, a colorimetric value calculation process 60 of determining an XYZkm(C, M, Y, K) that is the XYZ value as the colorimetric value corresponding to the spectral reflectance Rkm(C, M, Y, K) of the KM prediction value is performed. In the colorimetric value calculation process 60, the XYZkm(C, M, Y, K) corresponding to the Rkm(C, M, Y, K) is obtained from a spectral distribution 62 of an observation light source and an XYZ color matching function 64. The XYZkm(C, M, Y, K) corresponds to the XYZ value as the KM prediction colorimetric value. In FIG. 3, this is described as "KM prediction colorimetric value XYZkm", for simple description.

In the embodiment, the predicted color value of the protective film-attached printed matter is calculated by further applying, to the KM prediction value, a dot gain increase model 70 that reflects the effect of the optical dot gain increase due to the interaction between the protective film and the printed matter. The dot gain increase model 70 is a color prediction model for determining the predicted color value using at least the dot gain increase amount property for the primary color.

By the process of the combination of the Kubelka-Munk model 54, the colorimetric value calculation process 60 and the dot gain increase model 70, the predicted value (the XYZ value herein) of the colorimetric value in the case of attaching the protective film is obtained from the colorimetric result of the profile creation chart 50 with no protective film. Based on the correspondence relation between a protective film-attached printed matter predicted colorimetric value 72 obtained in this way and the CMYK value of each patch of the profile creation chart 50, a profile 74 in the format of the ICC profile is generated.

Here, by a known conversion expression, the XYZ value can be converted into a color coordinate value in a device-independent color space such as a L*a*b* color system.

In the embodiment, an example in which an XYZ color system (a stimulus value Y including brilliance (brightness) and stimulus values X, Z of the color) is used as the color system (color coordinate system) in the device-independent color space that indicates the colorimetric value is described, but the color system is not limited to this. Instead of the XYZ color system, the L*a*b* color system can be used. Further, not only a Yxy color system (brilliance Y, chromaticity coordinates x, y) and a L*u*v* color system but also an HSV color system (color phase H (hue), chroma S (saturation), lightness V (value) or B (brightness)), an HLS color system (color phase H (hue), chroma S (saturation), brilliance L (luminance)), a YCbCr color system (brilliance Y, color differences Cb, Cr) and the like, which are defined by International Commission on Illumination, can be used.

In the specification, for simplifying notations, the color space in the L*a*b* color system is referred to as the "Lab color space", and the chromaticity value indicated by the coordinate value in the Lab color space is referred to as the "Lab value". Further, in some cases, the image data in which the image signal value of each pixel is described by the Lab value is referred to as the "Lab image".

[Specific Example of Protective-Film Color Change Property Understanding Chart]

Figure 4:
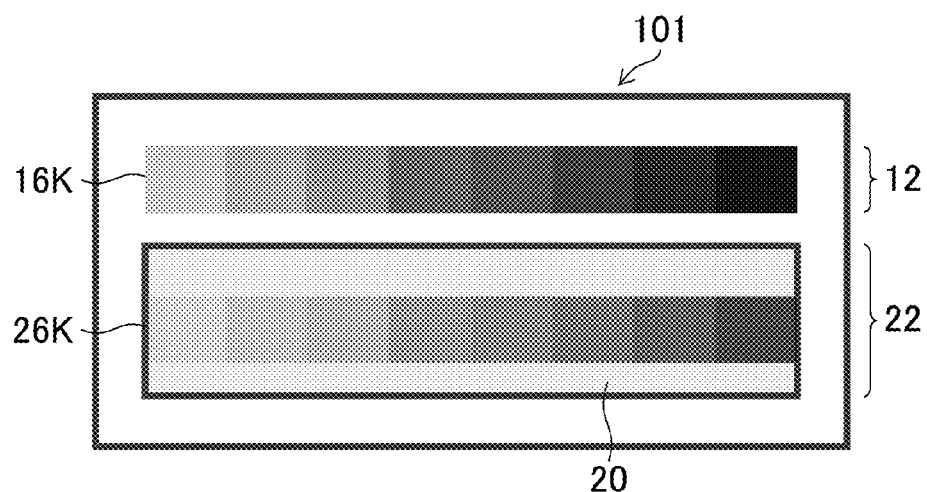
FIG. 4 is a diagram showing a first example of a protective-film color change property understanding chart.

FIG. 4 is a first example of the protective-film color change property understanding chart. A protective-film color change property understanding chart 101 shown in FIG. 4 is a chart in which the paper white and a K monochromatic gradation patch are combined, and has a protective film-presence patch group 22 coated with the protective film 20 and a protective film-absence patch group 12 with no protective film. Here, because of limitations of figure description, the colors and gradations of the patches are not sufficiently expressed in FIG. 4 and other figures. Reference character 16K in FIG. 4 designates a K monochromatic gradation patch with no protective film, and reference character 26K designates a K monochromatic gradation patch with the protective film. As for the region of the paper white, an arbitrary image position can be utilized as a white patch. The protective-film color change property understanding chart 101 shown in FIG. 4 is a chart that does not have the multi-order color gradation patches 18, 28 described in FIG. 3. By the combination of the paper white and the K monochromatic gradation patch, the protective-film color change property understanding chart 101 is configured to have the monochrome patches 14, 24 and the primary color gradation patches 16, 26 described in FIG. 3.

Figure 5:
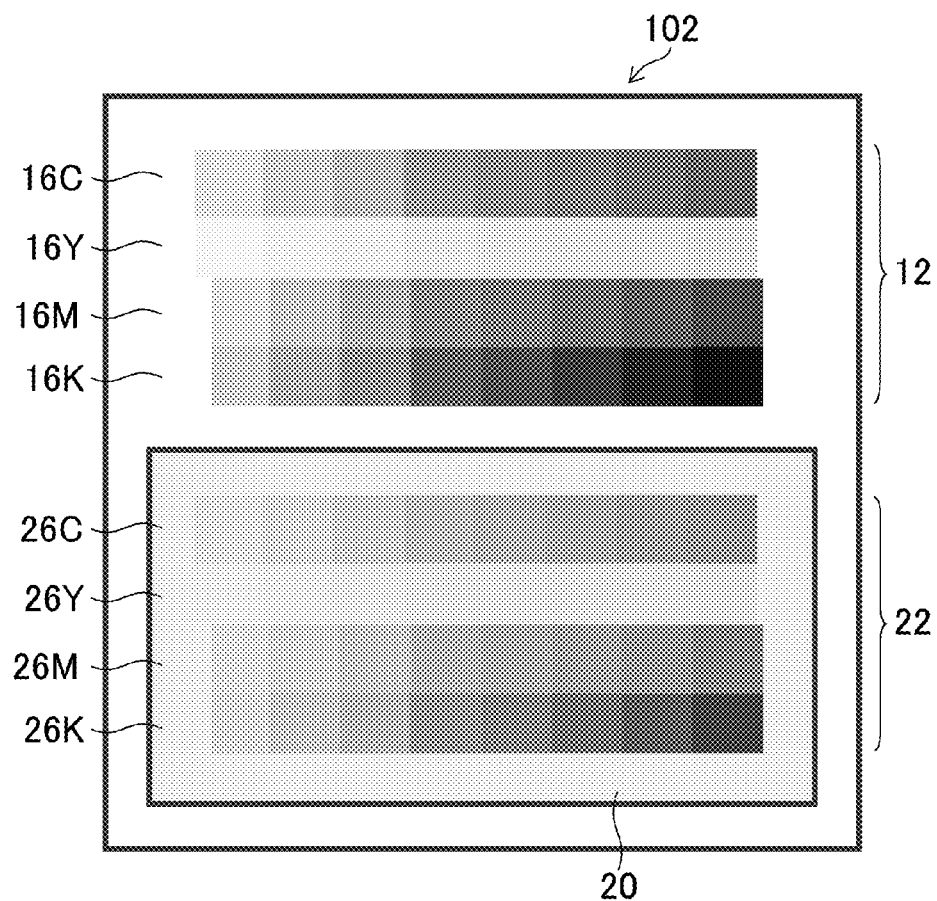
FIG. 5 is a diagram showing a second example of the protective-film color change property understanding chart.

FIG. 5 is a second example of the protective-film color change property understanding chart. A protective-film color change property understanding chart 102 shown in FIG. 5 is a chart in which the paper white and the monochromatic gradation patches for the respective colors of CMYK are combined, and has a protective film-presence patch group 22 coated with the protective film 20 and a protective film-absence patch group 12 with no protective film. The protective-film color change property understanding chart 102 shown in FIG. 5 is a chart that does not have the multi-order color gradation patches 18, 28 described in FIG. 3. By the combination of the paper white and the monochromatic gradation patches for the respective colors of CMYK, the protective-film color change property understanding chart 102 shown in FIG. 5 is configured to have the monochrome patches 14, 24 and the primary color gradation patches 16, 26 described in FIG. 3.

Reference character 16C in FIG. 5 designates a C monochromatic gradation patch with no protective film, reference character 16Y designates a Y monochromatic gradation patch with no protective film, and reference character 16M designates an M monochromatic gradation patch with no protective film. Further, reference character 26C in FIG. 5 designates a C monochromatic gradation patch with the protective film, reference character 26Y designates a Y monochromatic gradation patch with the protective film, and reference character 26M designates an M monochromatic gradation patch with the protective film.

Figure 6:
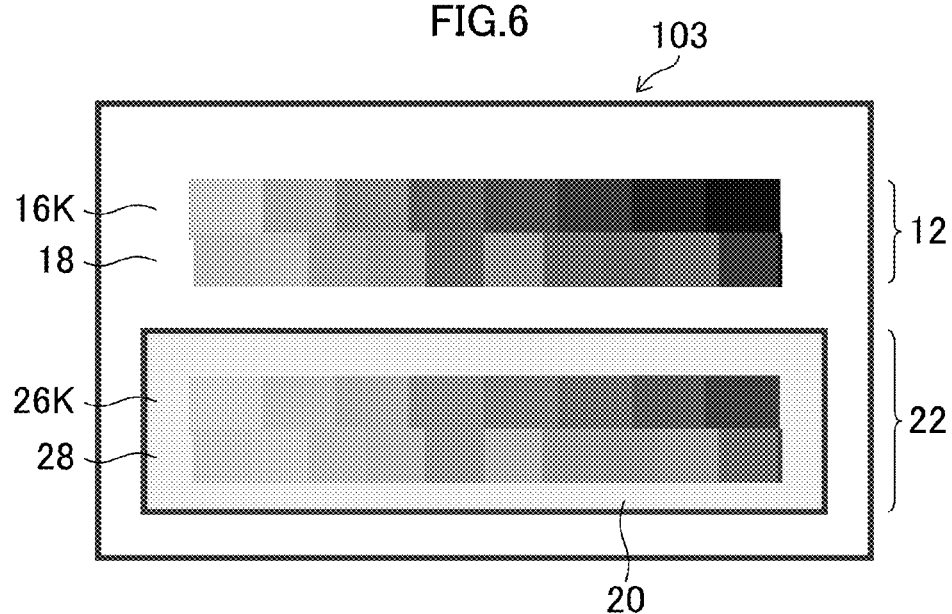
FIG. 6 is a diagram showing a third example of the protective-film color change property understanding chart.

FIG. 6 is a third example of the protective-film color change property understanding chart. A protective-film color change property understanding chart 103 shown in FIG. 6 is a chart in which the paper white, the K monochromatic gradation patches and multi-order color gradation patches are combined, and has a protective film-presence patch group 22 coated with the protective film 20 and a protective film-absence patch group 12 with no protective film. The multi-order color gradation patches 18, 28 include secondary color gradation patches, tertiary color gradation patches and quaternary color gradation patches. The protective-film color change property understanding chart 103 shown in FIG. 6 is configured to include all of the monochrome patches 14, 24, the primary color gradation patches 16, 26 and the multi-order color gradation patches 18, 28 described in FIG. 3.

Figure 7:
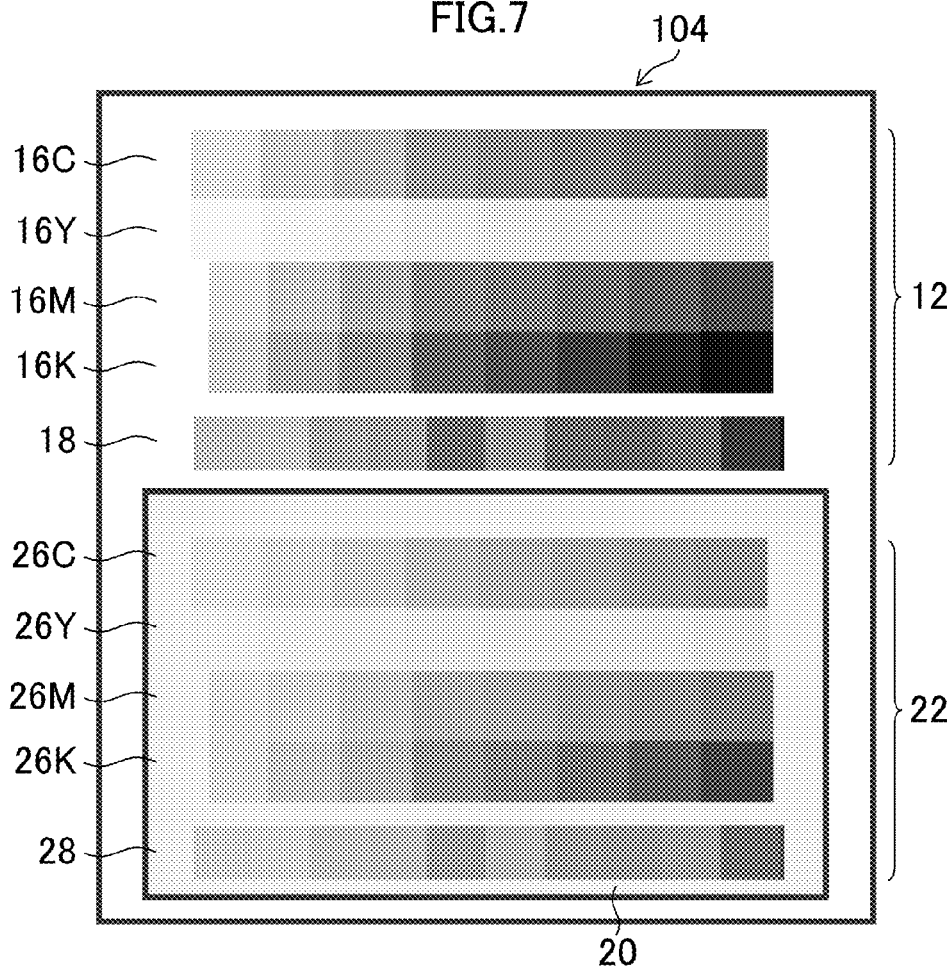
FIG. 7 is a diagram showing a fourth example of the protective-film color change property understanding chart.

FIG. 7 is a fourth example of the protective-film color change property understanding chart. A protective-film color change property understanding chart 104 shown in FIG. 7 is a chart in which the paper white, the monochromatic gradation patches for the respective colors of CMYK, the multi-order color gradation patches are combined, and has a protective film-presence patch group 22 coated with the protective film 20 and a protective film-absence patch group 12 with no protective film. The multi-order color gradation patches 18, 28 include secondary color gradation patches, tertiary color gradation patches and quaternary color gradation patches. The protective-film color change property understanding chart 104 shown in FIG. 7 is configured to include all of the monochrome patches 14, 24, primary color gradation patches 16, 26 and multi-order color gradation patches 18, 28 described in FIG. 3.

[Parameterization of Color Change Property of Protective Film]

Next, the parameterization of the color change property of the protective film is described for each type of the parameter.

(a) Optical Physical Property Value to be Used in Kubelka-Munk Model

The technology for predicting the spectral reflectance of the protective film-attached printed matter by applying the Kubelka-Munk model is described in Japanese Patent Application Laid-Open No. 2011-75304. Based on the following Expression (1), by the Kubelka-Munk model, the spectral reflectance R of the protective film-attached printed matter is predicted. Each variable is a function on a light wavelength basis, which is omitted for the convenience of description.

$$R=[(Rg-R\infty)/R\infty-R\infty(Rg-1/R\infty)\exp\{Sx(1/R\infty-R\infty)\}]/ [(Rg-R\infty)-(Rg-1/R\infty)\exp\{Sx(1/R\infty-R\infty)\}] \quad (1)$$

"Rg" in Expression (1) represents the spectral reflectance of the protective film-absence printed matter itself "R∞" represents the intrinsic reflectance of the protective film. "S" represents the scattering coefficient of the protective film per unit thickness, and "x" represents the thickness of the protective film (see "New Contribution to the Optics of Intensely Light-Scattering Materials. Part I", JOURNAL OF THE OPTICAL SOCIETY OF AMERICA, VOLUMES38, NUMBERS, PP, 448-457, May, 1948).

Rg is the data that is obtained from the measurement result of the profile creation chart 50 described in FIG. 3.

The intrinsic reflectance R∞ and the scattering coefficient Sx, which are optical physical property values of the protective film, are estimated based on the colorimetric result of the protective-film color change property understanding chart 10.

Figure 8:
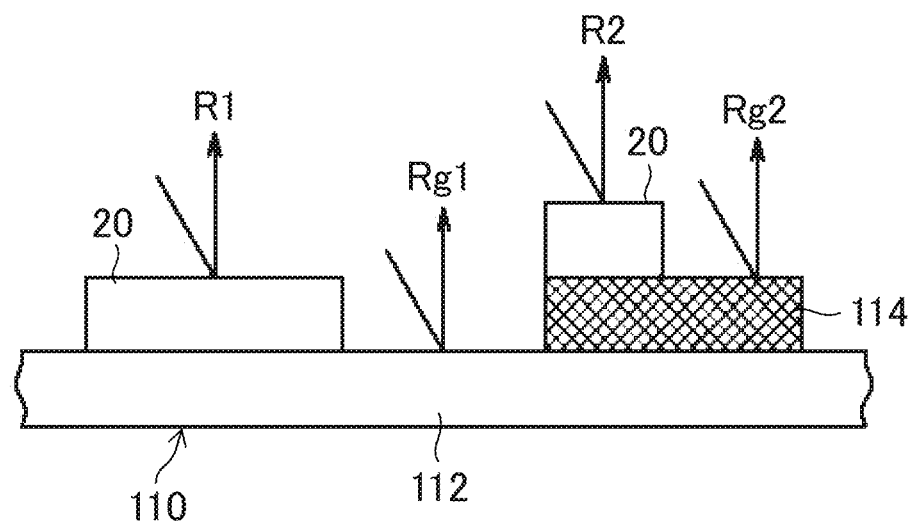
FIG. 8 is a schematic cross-section view of an exemplary measurement sample that is made for estimating the optical physical property value of the protective film.

FIG. 8 is a schematic cross-section view of a measurement sample 110 that is made for estimating the optical physical property value of the protective film 20. The measurement sample 110 is actualized by the combination of the monochrome patch 14 with no protective film and the monochrome patch 24 with the protective film in the protective-film color change property understanding chart 10 described in FIG. 1.

The measurement sample 110 is constituted by a base member 112 of the spectral reflectance $Rg_1$ having a white opaque body, a black color member 114 and the protective film 20. The base member 112 corresponds to a paper sheet as a printed medium. The black color member 114 corresponds to a K ink. A region on the base member 112 where the black color member 114 adheres corresponds to a black patch. Further, a region on the base member 112 where the black color member 114 does not adhere is a so-called paper-white region, and corresponds to a "white patch"

In FIG. 8, in the region where the black color member 114 adheres, a region where the protective film 20 is further laminated on the black color member 114 corresponds to a black patch with the protective film, and a region where the protective film 20 does not coat the black color member 114 corresponds to a black patch with no protective film.

Further, in FIG. 8, in the paper-white region where the black color member 114 does not adhere, a region where the protective film 20 is laminated on the base member 112 corresponds to a white patch with the protective film, and a region where the protective film 20 does not coat the base member 112 corresponds to a white patch with no protective film.

The step of acquiring each spectral reflectance from the monochrome patch 14 with no protective film corresponds to a mode of the "first acquisition step". Further, the step of acquiring the spectral reflectance from the monochrome patch 24 with the protective film corresponds to a mode of the "second acquisition step".

An operator measures the spectral reflectance at each site of the measurement sample 110, using the colorimeter 30 (see FIG. 1). As a result, suppose that a measurement value of $R_1$ is obtained as the spectral reflectance to be obtained from the region (protective film-presence white patch) where the protective film 20 coats the base member 112, a measurement value of $Rg_2$ is obtained as the spectral reflectance to be obtained from the region (protective film-absence black patch) where the black color member 114 is provided on the base member 112, a measurement value of $R_2 (R_1 > R_2)$ is obtained as the spectral reflectance to be obtained from the region (protective film-presence black patch) where the protective film 20 further coats the black color member 114 on the base member 112.

A computation process of determining the optical physical property value from these measurement values is performed, in accordance with Expressions (2) to (4) shown as follows.

By mathematical analysis, the intrinsic reflectance $R\infty$ of the protective film 20 is calculated as follows (see Feature on Paper: "TAKAGA KAMI, SAREDO KAMI, YAHARI KAMI (Merely Paper, Still Paper, After All Paper)", "Paper properties and their evaluation methods with latest relevant testing standards" (2004, Journal of the Imaging Society of Japan 150)).

$$R\infty = \{C - (C^2 - 4)^{1/2}\}/2 \qquad (2)$$

$$C = \{(R_1 + Rg_2)(R_2 \cdot Rg_1 - 1) - (R_2 + Rg_1)(R_1 \cdot Rg_2 - 1)\} / (R_2 \cdot Rg_1 - R_1 \cdot Rg_2) \qquad (3)$$

Here, in the case of $R_1 < R_2$, the subscripts 1 and 2 in Expression (3) are reversed.

Here, the intrinsic reflectance $R\infty$ is the reflectance in the case of assuming that the sample has infinite thickness. Therefore, in the case where the formation by overlaying many protective films 20 of the same type is possible, the intrinsic reflectance $R\infty$ may be directly measured and determined.

Next, using the actual measurement value $R_n$ (n=1 or 2), the actual measurement value $Rg_n$ (n=1 or 2) and the $R\infty$ calculated by Expression (2), the product of the scattering coefficient S and thickness x of the protective film 20 can be calculated by the following Expression (4) (see Expression (21) described on page 88 in Yoichi Miyake et al. "SHIKI-SAISAIGEN NO KISO TO OYOGIJUTSU (Basic and Applied Technology for Color Reproduction)" (publisher: TRICEPS CO., LTD)).

$$S \cdot x = \ln \left[\{(R\infty - Rg_n)(1/R\infty - R_n)\} / \{(R\infty - R_n)(1/R\infty - Rg_n)\}\right] / (1/R\infty - R\infty) \qquad (4)$$

In Expression (4), "S" is the scattering coefficient per unit thickness, and "x" is the thickness of the protective film 20.

Thus, it is possible to estimate the intrinsic reflectance $R\infty$ and the scattering coefficient Sx, which are optical physical property values of the protective film 20, using the measurement sample 110 in which the base member 112, the black color member 114 and the protective film 20 are combined.

Figure 9:
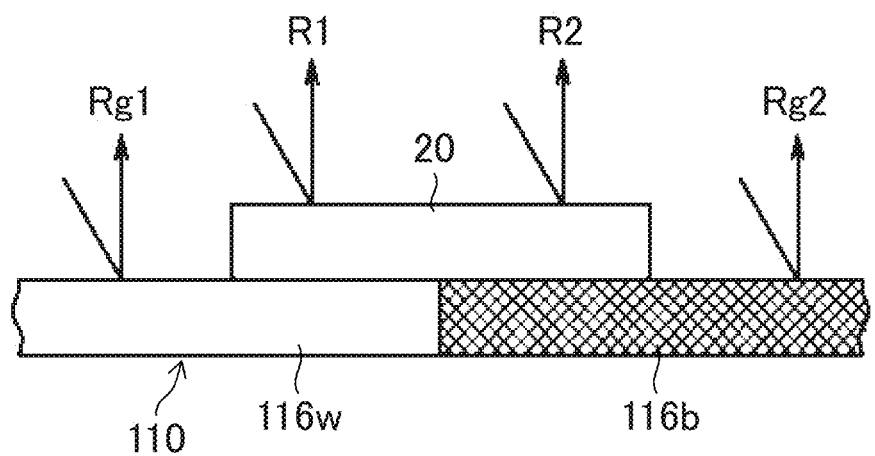
FIG. 9 is a schematic cross-section view of another exemplary measurement sample that is made for estimating the optical physical property value of the protective film.

Here, the measurement sample 110 is not limited to the example of FIG. 8, and as shown in FIG. 9, may have a configuration in which a white base matter 116w and a black base matter 116b are arranged so as to be arrayed and the protective film 20 is laminated across both base matters 116w, 116b.

As described in FIG. 8 and FIG. 9, it is possible to estimate the optical physical property value (the intrinsic reflectance $R\infty$ and the scattering coefficient Sx) of the protective film 20, using the measurement sample 110 in which the two types of base matters and the protective film 20 are combined. As for the two types of base matters, in the example of FIG. 8, it can be understood that the surface of the base member 112 is one type of base matter and the black color member 114 is the other type of base matter. In the example of FIG. 9, it can be understood that the base matter 116w is one type of base matter and the base matter 116b is the other type of base matter. In the example of FIG. 3 to FIG. 7, it can be understood that the white patch of the paper white is one type of base matter and the black patch by the K solid is the other type of base matter.

However, in the case of using a different base matter from the two types of base matters, there is a probability that this optical physical property value cannot be applied with no change, because of the influence of the difference in the surface physical property or the like. That is, depending on the combination of the protective film 20 and the different base matter, it is likely that a difference appears in the optical physical property value and furthermore the color reproduction accuracy decreases.

Hence, it is further preferable to estimate the optical physical property value (the intrinsic reflectance $R\infty$ and the scattering coefficient Sx) of the protective film 20, using a measurement sample in which n (n>2) types of base matters and the protective film 20 are combined, in addition to two types minimally necessary for the estimation.

Specifically, by coating n types of base matters different in the spectral reflectance $Rg_n$ with the same type of protective film 20, a measurement sample (not illustrated) is made. As the n different types of base matters, for example, the primary color gradation patch for K, or the like can be utilized.

Then, after the measurement sample is measured and the spectral reflectances $Rg_n$, $R_n$ before and after the coating with the protective film are obtained, a non-linear equation whose two unknown values are the intrinsic reflectance $R\infty$ and the scattering coefficient Sx is established, based on Expression (1). Here, since one relational expression is formed for one type of base matter, a total of n simultaneous equations are established for n types of base matters.

The number of the unknown values is two for the number (n) of the simultaneous equations, and therefore, there is a redundancy. Here, it is possible to estimate unknown values that most meets the relation of the respective equations. Here, not only the case where the solutions of the simultaneous equations are uniquely determined as the above-described case but also the estimation of the optimal unknown values based on a predetermined evaluation function are included in the "solving of the simultaneous equations".

For example, when the right side of Expression (1) is $KM(Rg_i, R\infty, Sx)$, Expression (5) can be provided as the evaluation function, and ($R\infty$, Sx) to minimize Err in Expression (5) can be adopted as the estimate value.

$$\text{Err} = \Sigma \{R_i - KM(Rg_i, R\infty, Sx)\}^2 \qquad (5)$$

Here, "$\Sigma$" represents the summation with respect to i=1, n.

For determining the estimate value of ($R\infty$, Sx), a known non-linear optimization method, for example, the steepest descent method, the Newton method, the quasi-Newton method, the simplex method or the like can be used.

Thus, by using the n types of base matters, it is possible to reduce the estimate variation (estimate error) of the intrinsic reflectance $R\infty$ and scattering coefficient Sx due to the difference in the surface physical property or the like for each base matter.

Here, the measured spectral reflectance $R_n$ may be corrected using the Saunderson correction formula or the like, and thereafter, the Kubelka-Munk model may be applied (see "Calculation of the color pigment plastics", JOURNAL OF THE OPTICAL SOCIETY OF AMERICA, VOLUME 32, PP, 727-736, 1942).

Specifically, as shown in the following Expression (6) and Expression (7), the spectral reflectance $R_i$ in which the influence of the light reflection to occur at the interface between the protective film 20 and the exterior is excluded can be used instead of the measured spectral reflectance $R_i'$. Here, $r_1$ is the spectral reflectance at the interface with the protective film 20 with respect to the incident light from the exterior to the protective film 20, and $r_2$ is the spectral reflectance at the interface with the protective film 20 with respect to the outgoing light from the protective film 20 to the exterior.

$$R_i'=r_1+(1-r_1)(1-r_2)R_i/(1-r_2R_i)=SD(R_i,r_1,r_2) \quad (6)$$

$$R_i=(R_i'-r_1)/\{(1-r_1)(1-r_2)+r_2R_i'-r_1r_2\}=invSD(R_i',r_1,r_2) \quad (7)$$

On this occasion, similarly to Expression (5), an evaluation function Err' is given by the following Expression (8).

$$Err'=\Sigma\{invSD(R_i',r_1,r_2)-KM(Rg_i',R\infty,Sx)\}^2 \quad (8)$$

If the spectral reflectances $r_1$ and $r_2$ are known values, they can be directly substituted into Expression (8), to be used. If the spectral reflectances $r_1$ and $r_2$ are unknown values, they can be estimated similarly to the other unknown values ($R\infty$, Sx). That is, it is possible to estimate ($R\infty$, Sx, $r_1$, $r_2$) to minimize the value of Err' in Expression (8).

By this correction, the light reflection at the interface between the protective film 20 and the exterior is further considered, and therefore, the spectral reflectance of the protective film-attached printed matter can be predicted at a further higher accuracy. Moreover, there is a relation shown in Expression (9) among the intrinsic reflectance $R\infty$, the scattering coefficient S and the absorption coefficient K.

$$K/S=(1-R\infty)^2/2R\infty \quad (9)$$

Therefore, not the intrinsic reflectance $R\infty$ or the scattering coefficient S (or Sx) but the absorption coefficient K (or Kx) may be used. This is because when any two values of the three optical physical property values of the intrinsic reflectance $R\infty$, the scattering coefficient S (or Sx) and the absorption coefficient K (or Kx) are decided, the other one value is uniquely determined.

The method for estimating the optical physical property value of the protective film is not limited to the above-described technique in which the simultaneous equations are solved, and the Monte Carlo method, the neutral network, the boosting algorithm, the genetic algorithm or the like may be applied.

(b) Dot Gain Increase Amount Property ($\Delta dg$)

The dot gain increase amount property ($\Delta dg$) is parameterized by acquiring the difference in the dot gain amount of the primary color gradation patch. That is, for each gradation patch, the dot gain amount before the coating with the protective film and the dot gain amount after the coating with the protective film are calculated based on the Murray-Davies expression. The calculated difference in the dot gain amount (the dot gain after the coating with the protective film−the dot gain before the coating with the protective film) is adopted as the dot gain increase amount $\Delta dg$ for the real area ratio before the coating with the protective film, and is defined as a look up table (LUT) or a function for the real area ratio before the coating with the protective film. The $\Delta dg$ may be parameterized representatively by the dot gain increase amount for the K gradation, or may be parameterized by averaging the dot gain amounts for the respective color gradations of CMYK. Further, the dot gain increase amount may be parameterized for each ink, and may be parameterized as a dot gain increase amount $\Delta Cdg$ for cyan, a dot gain increase amount $\Delta Mdg$ for magenta, a dot gain increase amount $\Delta Ydg$ for yellow, and a dot gain increase amount $\Delta Kdg$ for black.

Figure 10:
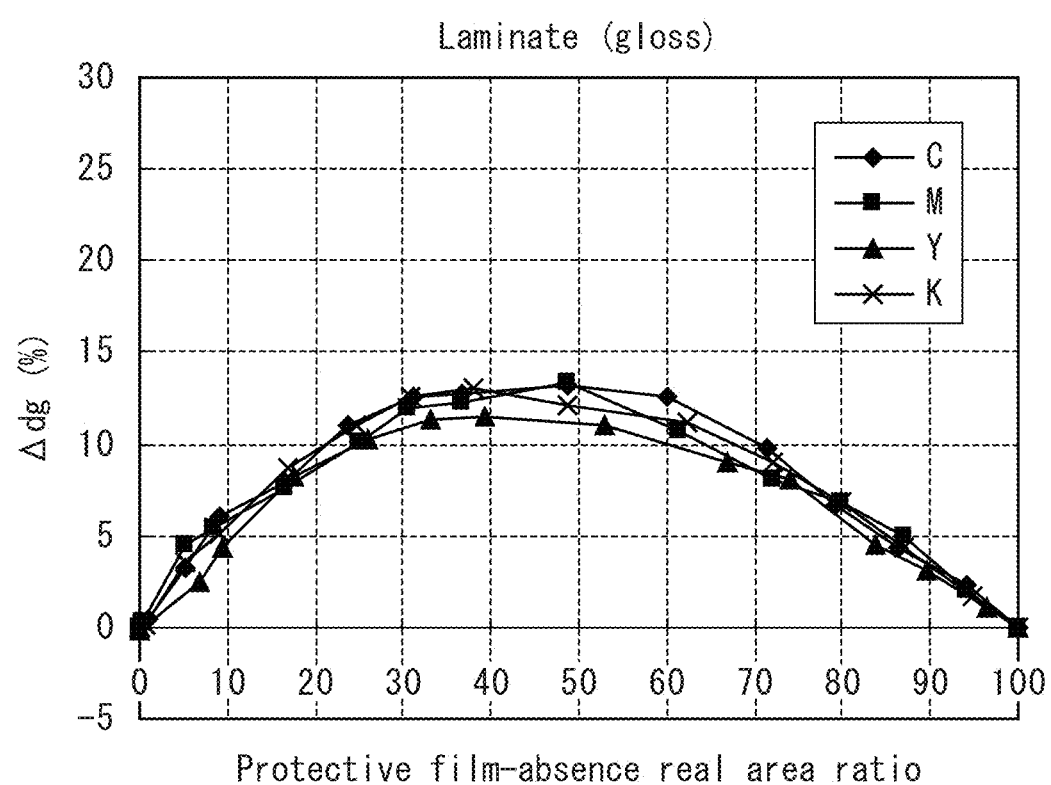
FIG. 10 is a graph showing an example of the primary-color dot gain increase amount property of a gloss type laminate.

The graph shown in FIG. 10 is an example of the primary-color dot gain increase amount property of a gloss type laminate. The abscissa in FIG. 10 indicates the protective film-absence real area ratio (the unit is "%"), and the ordinate indicates the dot gain increase amount $\Delta dg$.

Here, in some cases, the dot gain increase amount property for the primary color is referred to as the "primary-color dot gain increase amount property", or merely the "dot gain increase amount property".

(c) Inhibition Ratio of Multi-Order Color Dot Gain Increase Amount

The inhibit ratio of the multi-order color dot gain increase amount is determined by performing an optimization such that the difference between the actual measurement value for the multi-order color patch and the predicted value by a later-described color prediction model is minimized. That is, it is determined such that the difference (color difference) between the predicted colorimetric value after the coating with the protective film predicted by the later-described protective-film color prediction model with respect to the spectral reflectance for the protective film-absence multi-order color patch of the protective-film color change property understanding chart and the actual measurement colorimetric value for the protective film-presence multi-order color patch of the protective-film color change property understanding chart is minimized. In some cases, the inhibition ratio of the dot gain increase amount for the multi-order color is referred to as the "multi-order color dot gain increase amount inhibition ratio", or merely the "inhibition ratio".

The dot gain increase amount inhibition ratio for the secondary color is represented as $\alpha$, the dot gain increase amount inhibition ratio for the tertiary color is represented as $\beta$, and the dot gain increase amount inhibition ratio for the quaternary color is represented as $\gamma$. The optical dot gain increase amount becomes small with the increase in the number of the overlaid colors, and therefore, there is roughly a relation of "1>$\alpha$>$\beta$>$\gamma$>0". Here, a mode in which the multi-order color dot gain increase amount inhibition ratio is not used is also possible.

As an alternative embodiment relevant to the multi-order color dot gain increase amount inhibition ratio, the inhibition ratio parameter may be prescribed as a parameter that depends on the sum total of the real area ratios before the coating with the protective film for the respective colors of CMYK. In this case, the inhibition ratio is defined as a function or a look up table with respect to the sum total of the real area ratios before the coating with the protective film. When the sum total of the real area ratios before the coating with the protective film is represented as Tef, the inhibition ratio parameter $\alpha$ can be represented as $\alpha$(Tef), which is a function with respect to Tef.

As a further alternative embodiment relevant to the multi-order color dot gain increase amount inhibition ratio, the inhibition ratio parameter can be optimized depending on the image. A comprehensive patch (for example, the same patch as the profile creation chart) is previously prepared as the multi-order color patch, and the actual measurement data of the color change due to the protective film for the multi-order color is comprehensively acquired. Next, the image data of a color conversion object is analyzed, a multi-order color patch corresponding to a color appearing at a high frequency in the image is extracted from the comprehensive multi-order color patch. The inhibition ratio parameter is optimized based on the extracted multi-order color patch, and a protective film-attached printed matter profile dedicated for the image of the object is created and is utilized for the color conversion.

[Color Prediction Model for Protective Film-Attached Printed Matter]

For the spectral reflectance Rg(C, M, Y, K) with respect to the data halftone dot area ratio (C, M, Y, K) before the coating with the protective film, the spectral reflectance Rkm(C, M, Y, K) after the color change due to the light scattering/absorption property of the protective film is determined by the relational expression KM(Rg, R∞, Sx) of the Kubelka-Munk model.

$$Rkm(C,M,Y,K)=KM(Rg(C,M,Y,K),R\infty,Sx)$$

In some cases, the relational expression KM(Rg, R∞, Sx) of the Kubelka-Munk model is referred to as the "KM expression". The KM expression has been described by Expression (1).

Next, the XYZ value (referred to as the "XYZkm(C, M, Y, K)") corresponding to the Rkm(C, M, Y, K) is determined from the spectral distribution of the light source and the XYZ color matching function. This is applied for each patch of the profile creation chart 50 before the coating with the protective film so that the XYZ value of the whole chart is determined, and a LUT of CMYK→XYZkm is created by a look up table (LUT) creation technology. Hereinafter, the LUT prescribing the correspondence relation of "CMYK→XYZkm" is referred to as the "XYZkm(C, M, Y, K)". As the LUT creation technology, for example, the technologies disclosed in Japanese Patent Application Laid-Open No. 2003-289446 and Japanese Patent Application Laid-Open No. 2006-24971 can be used.

Next, the effect of the optical dot gain increase is applied. When the real area ratio before the coating with the protective film with respect to the data halftone dot area ratio (C, M, Y, K) is represented as (Cef, Mef, Yef, Kef), the XYZ value, which is the predicted color value after the surface treatment of the printed matter (that is, after the coating with the protective film), is determined for each of the primary color, the secondary color, the tertiary color and the quaternary color, in the following manner.

The primary color (the case of C) can be determined by XYZ=XYZkm(C+Δdg(Cef), 0, 0, 0). The same goes for the other primary colors M, Y, K, and the descriptions are omitted.

The secondary color (the case of CM) can be determined by XYZ=XYZkm(C+αΔdg(Cef), M+αΔdg(Mef), 0, 0). The same goes for the other secondary colors CY, MY, CK, MK, YK, and the descriptions are omitted.

The tertiary color (the case of CMY) can be determined by XYZ=XYZkm(C+βΔdg(Cef), M+βΔdg(Mef), Y+βΔdg(Yef), 0). The same goes for the other tertiary colors CMK, MYK, CYK, and the descriptions are omitted.

The quaternary color (CMYK) can be determined by XYZ=XYZkm(C+γΔdg(Cef), M+γΔdg(Mef), Y+γΔdg(Yef), K+γΔdg(Kef)).

Here, α, β and γ may preferably be included in the best mode, but are not essential. In the case where the multi-order color dot gain increase amount inhibition ratio is not considered, they are treated as α=β=γ=1. That is, the dot gain increase amount for the primary color is applied also to the multi-order colors of the secondary or higher colors.

In the above-described procedure, it is possible to determine the predicted color value of the printed matter after the coating with the protective film, for an arbitrary CMYK.

As an alternative embodiment relevant to the color prediction process of the printed matter after the coating with the protective film, in the case of parameterizing the dot gain increase amount property for each ink (for each color of CMYK), the predicted color value is determined for each of the primary color, the secondary color, the tertiary color and the quaternary color, in the following manner.

The primary color can be determined by XYZ=XYZkm(C+ΔCdg(Cef), 0, 0, 0).

The secondary color can be determined by XYZ=XYZkm(C+αΔCdg(Cef), M+αΔMdg(Mef), 0, 0).

The tertiary color can be determined by XYZ=XYZkm(C+βΔCdg(Cef), M+βΔMdg(Mef), Y+βΔYdg(Yef), 0).

The quaternary color can be determined by XYZ=XYZkm(C+γΔCdg(Cef), M+γΔMdg(Mef), Y+γΔYdg(Yef), K+γΔKdg(Kef)).

As a further alternative embodiment relevant to the color prediction process of the printed matter after the coating with the protective film, in the case where the inhibition ratio is the parameter α(Tef) that depends on the sum total of the real area ratios, when the sum total of the real area ratios is Tef=Cef+Mef+Yef+Kef, the predicted color value is determined for each of the primary color, the secondary color, the tertiary color and the quaternary color, in the following manner.

The primary color can be determined by XYZ=XYZkm(C+Δdg(Cef), 0, 0, 0).

The secondary color can be determined by XYZ=XYZkm(C+α(Tef) Δdg(Cef), M+α(Tef) Δdg(Mef), 0, 0).

The tertiary color can be determined by XYZ=XYZkm(C+α(Tef) Δdg(Cef), M+α(Tef) Δdg(Mef), Y+α(Tef) Δdg(Yef), 0).

The quaternary color can be determined by XYZ=XYZkm(C+α(Tef) Δdg(Cef), M+α(Tef) Δdg(Mef), Y+α(Tef) Δdg(Yef), K+α(Tef) Δdg(Kef)).

The multi-order color dot gain increase amount inhibition ratio corresponds to the correction parameter for correcting the data of the primary-color dot gain increase amount. The step of acquiring the multi-order color dot gain increase amount inhibition ratio corresponds to a mode of the "correction parameter acquisition step", and the step of the process of correcting the data of the primary-color dot gain increase amount using the multi-order color dot gain increase amount inhibition ratio corresponds to a mode of the "correction process step".

[Configuration of Having Different Color Number]

The color prediction model according to the embodiment is not limited to the four colors of CMYK, and can be extended to a color number less than four colors or a color number more than four colors, similarly. Here, in the case where the original color prediction object performs a four-color printing and subsequently colors are added so that the color prediction object performs a five or more-color printing, all of the quaternary or higher colors may be dealt with by the application of the parameters for the quaternary colors, or the like, without newly parameterizing the dot gain inhibition ratios for the fifth-order or higher colors.

[Arbitrariness of Color Space]

Further, although the XYZ is adopted as the colorimetric value, the value in another color space such as the Lab may be used. The color space for expressing the colorimetric value is not limited to the XYZ space, and an arbitrary device-independent color space can be used.

[Extension to Wavelength-Dependent (Spectral) Dot Gain Increase Amount Property]

Further, in the above description, the dot gain increase property has been described as a wavelength-independent format, but may be modeled as a spectral dot gain increase property. That is, as the spectral real area ratio, the Murray-Davies expression is expressed by a spectrum, and in a certain monochromatic gradation, when the spectral reflectance at an area ratio of 0% (paper white) is represented as $Rw(\lambda)$ the spectral reflectance at an area ratio of 100% (solid) is represented as $Rs(\lambda)$ and the colorimetric value at the data area ratio of the real area ratio calculation object is represented as $R(\lambda)$ the spectral real area ratio ($\lambda$) to the data area ratio of the object is shown by the following expression.

Spectral real area ratio($\lambda$)={$(Rw(\lambda)-R(\lambda))/(Rw(\lambda)-Rs(\lambda))$}×100      (10)

The spectral dot gain amount (spectral real area ratio ($\lambda$)–data area ratio) can be calculated from the spectral real area ratio ($\lambda$) in Expression (10), and the spectral dot gain increase property $\Delta dg(\lambda)$ can be calculated from the spectral dot gain amount. When the spectral real area ratio before the coating with the protective film with respect to the data halftone dot area ratio (C, M, Y, K) is represented as ($Cef(\lambda)$, $Mef(\lambda)$, $Yef(\lambda)$, $Kef(\lambda)$), the predicted color value can be determined for each of the primary color, the secondary color, the tertiary color and the quaternary color, in the following manner.

The primary color (the case of C) can be determined by $R=Rkm(C+\Delta dg(Cef(\lambda), \lambda), 0, 0, 0)$. The same goes for the other primary colors M, Y, K, and the descriptions are omitted.

The secondary color (the case of CM) can be determined by $R=Rkm(C+\alpha\Delta dg(Cef(\lambda), \lambda), M+\alpha\Delta dg(Mef(\lambda), \lambda), 0, 0)$. The same goes for the other secondary colors CY, MY, CK, MK, YK, and the descriptions are omitted.

The tertiary color (the case of CMY) can be determined by $R=Rkm(C+\beta\Delta dg(Cef(\lambda), \lambda), M+\beta \Delta dg(Mef(\lambda), \lambda), Y+\beta\Delta dg(Yef(\lambda), \lambda), 0)$. The same goes for the other tertiary colors CMK, MYK, CYK, and the descriptions are omitted.

The quaternary color (CMYK) can be determined by $R=Rkm(C+\gamma\Delta dg(Cef(\lambda), \lambda), M+\gamma\Delta dg(Mef(\lambda), \lambda), Y+\gamma\Delta dg(Yef(\lambda), \lambda), K+\gamma\Delta dg(Kef(\lambda), \lambda))$. Here, for the Rkm, a look up table only needs to be created for each wavelength.

The outline diagram of the embodiment shown in FIG. 3 shows the flow in which the KM prediction spectral reflectance (Rkm) is determined from the spectral reflectance R of the protective film-absence printed matter by applying the Kubelka-Munk model 54, the KM prediction colorimetric value (XYZ or Lab) is further calculated, and thereafter the predicted colorimetric value (XYZ or Lab) of the protective film-attached printed matter is obtained by applying the dot gain increase model 70. However, the case of the configuration of using the spectral dot gain increase amount property adopts a flow in which the KM prediction spectral reflectance (Rkm) is determined from the spectral reflectance R of the protective film-absence printed matter by applying the Kubelka-Munk model 54, the predicted spectral reflectance of the protective film-attached printed matter is calculated by applying the "spectral dot gain increase model" to this KM prediction spectral reflectance (Rkm), the colorimetric value is calculated by applying the spectral distribution 62 of the light source and the XYZ color matching function 64 to the obtained predicted spectral reflectance of the protective film-attached printed matter, and the predicted colorimetric value (XYZ or Lab) of the protective film-attached printed matter is obtained. That is, a mode in which the order of the colorimetric value calculation process 60 and the application process of the dot gain increase model 70 shown in FIG. 3 is changed is adopted.

[Example of Color Prediction Accuracy Evaluation]

The comparison between the conventional technology and the embodiment of the present invention with respect to the accuracy of the color prediction for the protective film-attached printed matter is arranged in Table 1. In the experimentation, a base printed matter as the object was coated with four types of protective films, and the respective differences between the actual measurement values and predicted values of the colorimetric values in that case were evaluated.

TABLE 1

| Type of protective film | KM model (Comparative Example) | KM + dot gain increase model (Example 1) | KM + dot gain increase + multi-order color dot gain increase amount inhibition ratio (Example 2) |
| --- | --- | --- | --- |
| Gloss laminate | 4.5 | 3.9 | 2.0 |
| Matt laminate | 3.6 | 3.4 | 1.7 |
| Gloss varnish | 4.6 | 2.2 | 2.0 |
| Matt varnish | 1.9 | 1.6 | 1.5 |

The base printed matter was printed by the combination of the UV flexographic printing using an ultraviolet cure type UV (Ultra Violet ray) ink, coat paper and the four colors of CMYK. Between the actual measurement values and predicted values of the colorimetric values when the base printed matter was coated with the four types of protective films described in Table 1, the average color differences for about 1000 patches were evaluated. The numerical values shown in Table 1 are the average color differences.

The KM in the table is the abbreviation of "Kubelka-Munk". As the parameter of the optical physical property value to be used in the KM expression, the value estimated from two types of base matters of white and black was used. The dot gain increase amount property $\Delta dg$ for the primary color to be applied to the dot gain increase model was estimated from the K monochromatic gradation patch.

Comparative Example was a color prediction using the KM model in the conventional technology described in Japanese Patent Application Laid-Open No. 2011-75304.

Example 1 was a color prediction in which the KM model and the dot gain increase model were combined. In Example 1, the dot gain increase amount inhibition ratio for the multi-order color was not used in the dot gain increase model, and only the dot gain increase amount property for the primary color was considered.

Example 2 was a color prediction in which the KM model and the dot gain increase model were combined, and the dot gain increase amount inhibition ratio for the multi-order color was considered.

For all types of the evaluated protective films described in Table 1, in both of Example 1 and Example 2 of the present invention, the color prediction accuracy was enhanced, relative to the KM model in the conventional technology. The average color differences were about "2", and the color prediction could be performed at practical accuracies.

[Profile Creation]

The above color prediction model is applied to the patches of the profile creation chart 50 before the coating with the protective film, and thereby, it is possible to predict the chart colorimetric value after the coating with the protective film. The profile of the protective film-attached printed matter is created based on the chart colorimetric value (predicted value) after the coating with the protective film.

[Configuration Example of Printing System]

Figure 11:
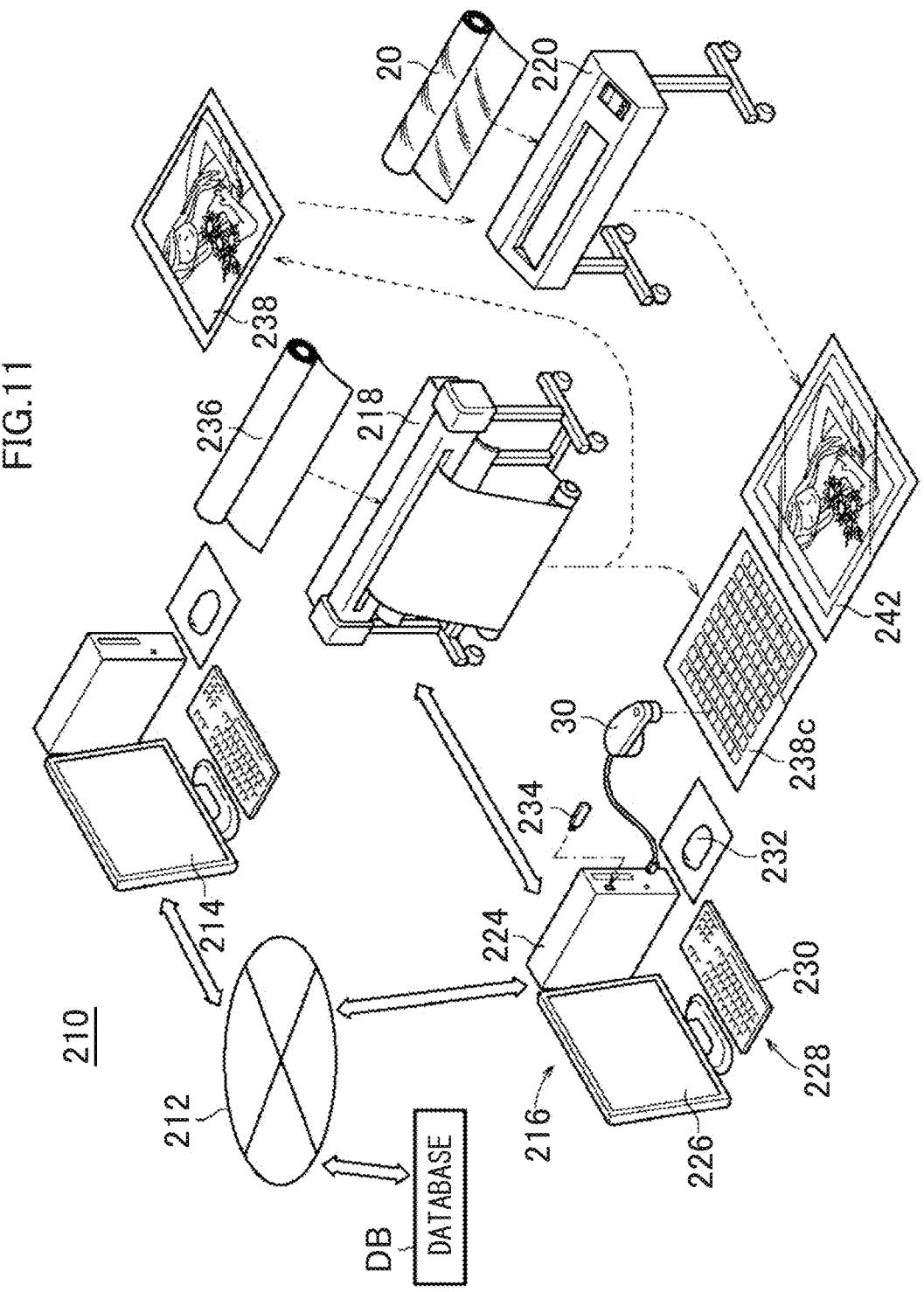
FIG. 11 is a perspective explanatory diagram showing an example of a printing system in which an image processing device as a printed color prediction device according to the embodiment is incorporated.

FIG. 11 is a perspective explanatory diagram showing an example of a printing system in which an image processing device as a printed color prediction device and a profile generation device according to the embodiment is incorporated. A printing system 210 includes an edit device 214, an image processing device 216 as the printed color prediction device, a printing machine 218, a laminate treatment device 220, and the colorimeter 30. The edit device 214 and the image processing device 216 are connected with each other through a communication network 212. The communication network 212 may be a local area network (LAN), may be a wide area network (WAN), or may be a combination thereof. The communication network 212 is not limited to a wire communication line, and a part or a whole can be a wireless communication line. Further, in the specification, the notation of the "connection" between devices allowing for the transfer of signals includes not only wire connection but also wireless connection.

The edit device 214 is a device that generates an electronic manuscript showing an image content intended to be printed. The edit device 214 is used for editing various types of image components such as a character, a figure, a picture and a photographic image and performing the work to perform the layout on the printed surface for each page. The edit device 214 has a function of performing the edit, revision and others of the electronic manuscript, in addition to the creation function for the electronic manuscript. As the electronic manuscript for print, for example, the document data described in a page description language (PDL) is utilized. The edit device 214 generates the electronic manuscript in the page description language (hereinafter, referred to as the PDL), for example, the 8-bit image data having color channels of four colors (CMYK) or three colors (RGB). The PDL is a language for describing the format information about a character, a figure and the like, and the image information such as position information and color information (including concentration information), in a "page" that is the output unit for the print, the display and the like. For example, PDF (the abbreviation of Portable Document Format, ISO32000-1; prescribed in 2008), Postscript (R) in Adobe Systems Incorporated, XPS (XML Paper Specification) and the like are known.

With the edit device 214, a color scanner, which is not illustrated, is connected. The color scanner can acquire the color image data that is a constituent element of the electronic manuscript, by optically reading a color manuscript set at a predetermined position.

The image processing device 216 has a function of performing various image processes for the electronic manuscript in the data format of the PDL, converting it into a printing signal suitable for the printing scheme of the printing machine 218, and sending the printing signal to the printing machine 218. The contents of the image processes to be performed by the image processing device 216 include a RIP process of expanding the electronic manuscript into the bitmap format (a type of raster image), a color conversion process, an image scaling process, an arrangement process and the like.

The image processing device 216 is configured by the combination of the hardware and software of the computer. The term of software is synonymous with a "program" or an "application". The image processing device 216 includes a main part 224, a display device 226 and an input device 228. Although the detailed configuration of the main part 224 is not illustrated, the main part 224 includes constituent elements of the computer such as a central processing unit (CPU), a memory and a communication interface. The display device 226 is a color display that displays a color image. The input device 228 includes a keyboard 230 and a mouse 232, but instead of these or in combination with these, can employ various input devices such as a touch panel and a trackball.

Further, the image processing device 216 includes a media interface allowing for the connection with a portable memory 234 as an external storage medium that can record and delete electronic data. Furthermore, the colorimeter 30 is connected with the image processing device 216.

Here, the functions of the image processing device 216 and the functions of the edit device 214 can be implemented in a single computer, or alternatively, a mode in which the functions of the image processing device 216 are implemented in multiple computers is also possible.

Furthermore, a database DB can be connected with the communication network 212. In the database DB, a variety of data to be used in the image processing device 216 and the edit device 214 can be saved. The database DB is a database server that performs the data management of a single or multiple types of data, as exemplified by such as a job ticket of the electronic manuscript, color sample data, a target profile, a profile suitable for the medium type, the data of the spectral distributions of various light sources assumed as the observation light source. As the job ticket, for example, a JDF (Job Definition Format) file can be used. It is also possible that the function of the database DB is constructed in a storage unit within the image processing device 216.

The printing machine 218 shown in FIG. 11 is an inkjet-scheme printing device that forms a color image using standard inks for the respective colors of cyan (C), magenta (M), yellow (Y) and black (K). The printing machine 218 can be configured to form the color image in combination with optional inks for light colors such as light cyan (LC) and light magenta (LM), white (W), colorlessness (CL) and the like, in addition to the standard inks for CMYK.

By performing the injection control of the ink for each color based on the printing signal received from the image processing device 216, the printing machine 218 prints the color image on a medium 236 that is a printed medium, and forms a printed matter 238. Here, the roll-shaped medium 236 shown in FIG. 11 is a non-printed medium 236 before the setting in the printing machine 218. The term "printed matter" includes various color charts 238c such as the protective-film color change property understanding chart 10 and the profile creation chart 50 described in FIG. 1, in addition to the printed matter that is printed based on the electronic manuscript.

The laminate treatment device 220 is a device that forms the protective film 20 on the printed surface of the printed matter 238. The laminate treatment device 220 forms a protective film-attached printed matter 242 in which the printed surface of the printed matter 238 is coated with the protective film 20, by performing a heating and pressing treatment using a heating roller not illustrated, in a state in which the protective film 20 is pasted on the printed surface of the printed matter 238 and further on the back surface as necessary.

For the base member of the medium 236, various materials, as exemplified by papers such as a synthetic paper, a cardboard or an aluminum deposited paper, resins such as vinyl chloride or polyethylene terephthalate (PET), or a tarpaulin, can be used. Here, for the convenience of description, the medium 236 is referred to as the "paper sheet", in some cases. For the protective film 20, various materials, as exemplified by a laminate film, liquid, vanish, transparent ink, clear toner and a protective plate such as an acrylic plate, can be used.

The colorimeter 30 measures the colorimetric value of a measurement object. The colorimetric value includes not only the tristimulus value XYZ, the coordinate value L*a*b* in the uniform color space, and the like, but also the distribution (hereinafter, referred to as the "spectral data") of the optical physical property value with respect to the wavelength, for example, the spectral radiant distribution (spectral distribution), the spectral sensitivity distribution, the spectral reflectance or the spectral transmittance.

The protective film-attached printed matter 242 obtained in this way is displayed at a predetermined place, under a light source DS as the observation light source, which is not illustrated.

[Printing Machine]

FIG. 11 exemplifies an inkjet printing machine as the printing machine 218, but in the practice of the invention, the type of the printing machine is not particularly limited. Instead of the inkjet printing machine, various printing machines such as an electrophotographic printer, a laser printer, an offset printing machine and a flexographic printing machine can be employed, regardless of the printing scheme. Further, it is possible to combine multiple types of printing machines and construct a printing system including the multiple printing machines. It is understood that the term "printing machine" is synonymous with the term of printer, printing device, image recording device, image formation device, image output device or the like. As the coloring material, ink, toner or the like can be used depending on the type of the printing machine.

[Example of Color Chart]

Figure 12:
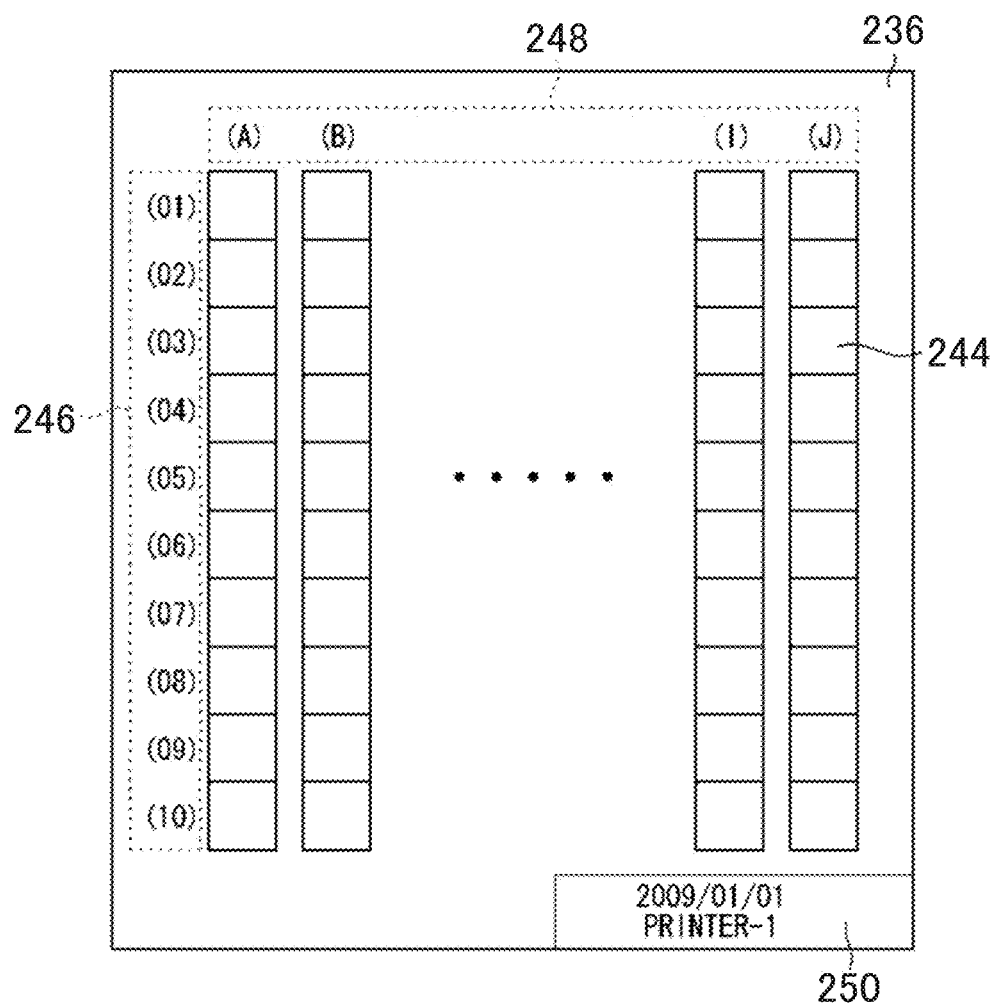
FIG. 12 is a diagram showing an example of a color chart.

FIG. 12 is a diagram showing an example of the color chart 238c. The color chart 238c shown in FIG. 12 can be used as the profile creation chart 50 described in FIG. 1. The color chart 238c in FIG. 12 is configured to include multiple pieces (for example, 100 pieces) of color patches 244, a number sequence 246 and alphabet character sequence 248 for specifying the array positions of the color patches 244, and the printing information 250 for discriminating the printing condition of the color chart 238c. The multiple pieces of color patches 244 have roughly the same shape (a square is exemplified herein), and are arrayed such that the pieces differing in color or gradation are arranged in the row direction and the column direction. Each array position of the color patches 244 can be specified by the combination of the number of the number sequence 246 and the alphabet of the alphabet character sequence 248.

As for each color patch 244 exemplified in FIG. 12, ten pieces of color patches 244 are arranged in the vertical direction with no space, and ten pieces of color patches 244 are arranged in the horizontal direction such that spaces with predetermined intervals are provided. For the color of each color patch 244, a predetermined value in the range (0% to 100% in percentage, 0 to 255 in the case of 8-bit gradation) of each signal level of the CMYK value is set. The number sequence 246, as a character sequence of (01) to (10) in the order from the top of FIG. 12, is assigned at leftward portions to the respective color patches 244, so as to correspond to the positions. On the other hand, the alphabet character sequence 248, as a character sequence of (A) to (J) in the order from the left of FIG. 12, is assigned at upward portions to the respective color patches 244, so as to correspond to the positions.

In the printing information 250, the machine type of the printing machine 218, the serial number or registered name, a later-described print mode, the type of the medium 236, the printed date and time, and the like are printed.

In the example of FIG. 12, the data of the spectral reflectance is acquired from each of the 100 pieces of color patches 244. As the data of the spectral reflectance, for example, a configuration of having 41 sets of data when a light wavelength range of $\lambda_1=400$ nm to $\lambda_{41}=800$ nm is sectioned at an equal interval of 10 nm can be adopted.

[Configuration of Image Processing Device]

Figure 13:
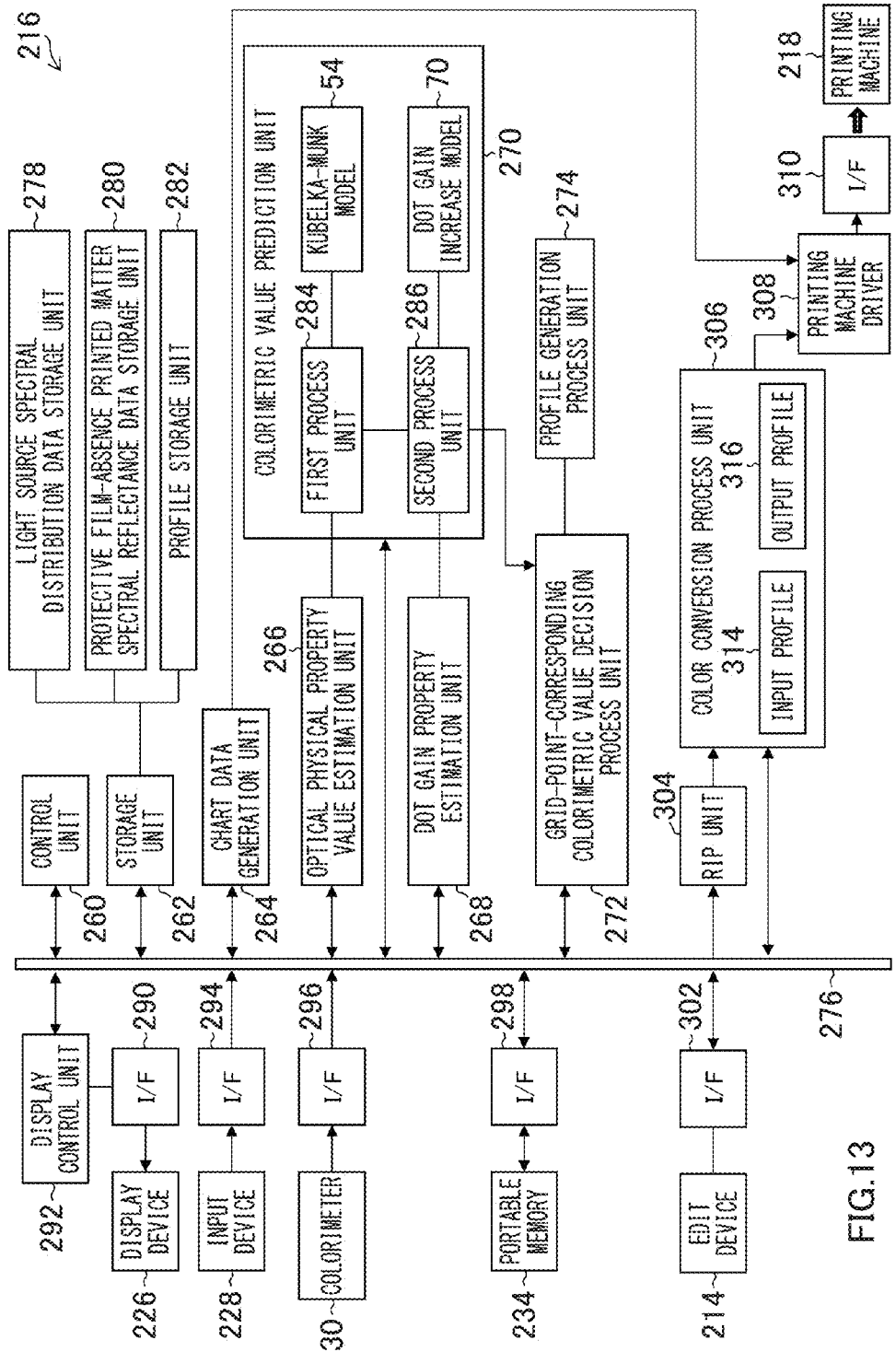
FIG. 13 is a functional block diagram of the image processing device.

FIG. 13 is a functional block diagram of the image processing device 216. In FIG. 13, for the identical elements to the configuration described in FIG. 11, the identical reference numerals are assigned, and the descriptions are omitted.

The image processing device 216 includes a control unit 260, a storage unit 262, a chart data generation unit 264, an optical physical property value estimation unit 266, a dot gain property estimation unit 268, a colorimetric value prediction unit 270, a grid-point-corresponding colorimetric value decision process unit 272, and a profile generation process unit 274.

The control unit 260 controls the operation of each unit of the image processing device 216. The storage unit 262 is a device that stores a variety of data. The storage unit 262 includes a volatile memory, and functions as a work memory. Further, the storage unit 262 includes a nonvolatile memory, a hard disc drive or a solid-state drive, or an appropriate combination of them, and functions as a storage for data save. The storage unit 262 is connected with the control unit 260, the chart data generation unit 264, the optical physical property value estimation unit 266, the dot gain property estimation unit 268, the colorimetric value prediction unit 270, the grid-point-corresponding colorimetric value decision process unit 272, and other function units, through a bus 276. The variety of data stored in the storage unit 262 is supplied to each function unit, as necessary.

The storage unit 262 includes a light source spectral distribution data storage unit 278, a protective film-absence printed matter spectral reflectance data storage unit 280, and a profile storage unit 282. In the light source spectral distribution data storage unit 278, the spectral distribution data of one or more types of light sources corresponding to the type of the observation light source is stored. Preferably, the spectral distribution data of multiple types of light sources should be stored. For the spectral distribution data, as necessary, the addition, the deletion and the modification can be performed.

In the protective film-absence printed matter spectral reflectance data storage unit 280, the spectral reflectance data of the protective film-absence printed matter is stored. The spectral reflectance data of the protective film-absence printed matter can be acquired by performing the colorimetry of the protective film-absence printed matter with the colorimeter 30. Further, it is also possible that the spectral reflectance data of the protective film-absence printed matter is taken in from the portable memory 234.

In the profile storage unit 282, various profiles such as a profile for a standard print color and a profile generated by the profile generation process unit 274 are stored. An example of the profile of the standard print color is the Japan Color (R) profile.

The chart data generation unit 264 generates chart data such as the protective-film color change property understanding chart 10 (see FIG. 3) and the profile creation chart 50 (see FIG. 3).

The optical physical property value estimation unit 266 performs the process of estimating the optical physical property value of the protective film. The optical physical property value estimation unit 266 performs the process of estimating a set of optical physical property values (in the example, the pair of the intrinsic reflectance R∞ and the scattering coefficient Sx is exemplified) to be used in the Kubelka-Munk model 54. That is, the optical physical property value estimation unit 266 performs the optical physical property value estimation process 42 for the protective film described in FIG. 3. The processing function of the optical physical property value estimation unit 266 corresponds to a mode of the "optical physical property value estimation function". The information of the optical physical property value of the protective film estimated by the optical physical property value estimation unit 266 can be saved in the storage unit 262. Further, the information of the optical physical property value of the protective film estimated by the optical physical property value estimation unit 266 can be accumulated in the database DB (see FIG. 11). In the case where it is possible to utilize the optical physical property value of the protective film already saved in the storage unit 262 or the database DB, the corresponding information of the optical physical property value of the protective film can be acquired from the storage unit 262 or the database DB, by an operation to select the type of the protective film by a predetermined GUI.

The dot gain property estimation unit 268 in FIG. 13 performs the process of estimating the dot gain property due to interaction between the protective film 20 and the printed matter. The dot gain property estimation unit 268 performs at least the process of estimating the primary-color dot gain increase amount property, and more preferably, should further perform the process of estimating the multi-order color dot gain increase amount inhibition ratio. That is, the dot gain property estimation unit 268 performs the dot gain increase amount property acquisition process 44 for the primary color described in FIG. 3. Further, the dot gain property estimation unit 268 can be configured to perform the dot gain increase amount inhibition ratio acquisition process 46 for the multi-order color described in FIG. 3. The dot gain property estimation unit 268 corresponds to a mode of the "interaction property estimation unit", and the processing function corresponds to a mode of the "interaction property estimation function".

The colorimetric value prediction unit 270 is a processing unit that performs the process of estimating the colorimetric value of the protective film-attached printed matter. The colorimetric value prediction unit 270 includes a first process unit 284 and a second process unit 286. The first process unit 284, using the optical physical property value estimated by the optical physical property value estimation unit 266, performs the process of predicting the spectral reflectance (corresponding to the KM prediction value Rkm described in FIG. 3) of the protective film-attached printed matter, based on the Kubelka-Munk model 54. The step of the process by the first process unit 284 corresponds to a mode of the "first process step". The colorimetric value prediction unit 270 has a computation processing function of performing the colorimetric value calculation process 60 described in FIG. 3.

The second process unit 286 performs the process of modifying the spectral reflectance of the protective film-attached printed matter predicted by the first process unit 284 or the predicted color value (corresponding to the KM prediction colorimetric value XYZkm described in FIG. 3) calculated based on the spectral reflectance of the protective film-attached printed matter predicted by the first process unit 284, based on the dot gain increase model 70. That is, the second process unit 286 modifies the spectral reflectance of the protective film-attached printed matter predicted by the first process unit 284 or the predicted color value calculated based on the spectral reflectance of the protective film-attached printed matter predicted by the first process unit 284, using the dot gain increase amount property estimated by the dot gain property estimation unit 268. The step of the process by the second process unit 286 corresponds to a mode of the "second process step". The function of the color prediction by the colorimetric value prediction unit 270 corresponds to a mode of the "prediction function".

The grid-point-corresponding colorimetric value decision process unit 272 performs the process of deciding the colorimetric value corresponding to each grid point of a color conversion table, based on the colorimetric value (referred to as the "predicted colorimetric value") of the protective film-attached printed matter predicted by the colorimetric value prediction unit 270. The step of the process by the grid-point-corresponding colorimetric value decision process unit 272 corresponds to a mode of the "decision process step".

As for the grid point of the color conversion table, for example, when the possible range (the variable range or the value range) of the signal value is indicated as 0% to 100% for each of the independent axes (as an example, the C axis, M axis, Y axis, K axis of CMYK) of the color space, the grid point is set at a pitch of 10% for each axis (see Japanese Patent Application Laid-Open No. 2003-289446). Here, the pitch width of the signal for each axis that prescribes the grid point is not limited to "10%". Further, in the case where a 8-bit integer value (0 to 255) is used as the signal value of the image signal, a signal value of "0" can be defined as 0%, a signal value of "255" can be defined as "100%", and the values of 0 to 255 can be mapped to a linear expression.

The grid-point-corresponding colorimetric value decision process unit 272 assigns the corresponding colorimetric value (the XYZ value or the Lab value), to each grid point of CMYK.

The profile generation process unit 274 performs the process of generating the profile 74 (see FIG. 13) based on the colorimetric value corresponding to each grid point decided by the grid-point-corresponding colorimetric value decision process unit 272. That is, the profile generation process unit 274 creates a profile showing the correspondence relation between the signal value (referred to as the "device value") in the device-dependent color space and the coordinate value (referred to as the "non-device value") in the device-independent color space, based on the processing result by the grid-point-corresponding colorimetric value decision process unit 272.

The profile generation process unit 274 in the example generates a CMYK-XYZ profile showing the correspondence relation between the CMYK value as the device value and the XYZ value as the non-device value, or a CMYK-Lab profile showing the correspondence relation between the CMYK value as the device value and the Lab value as the non-device value. The step of the process by the profile generation process unit 274 corresponds to a mode of the "generation process step". The profile generated by the profile generation process unit 274 can be saved in the profile storage unit 282.

In addition to the above configuration, the image processing device 216 includes an interface unit 290 allowing for the connection with the display device 226, and a display control unit 292. In FIG. 13, the description of "I/F"

designates the "interface unit". The display control unit 292 controls the displaying of the display device 226. Further, the image processing device 216 includes an interface unit 294 allowing for the connection with the input device 228, an interface unit 296 allowing for the connection with the colorimeter 30, an interface unit 298 allowing for the connection with the portable memory, and an interface unit 302 allowing for the connection with the edit device 214.

Further, the image processing device 216 includes a RIP (Raster Image Processor) unit 304, a color conversion process unit 306, a printing machine driver 308, and a data-output interface unit 310 for transferring data to the side of the printing machine 218.

The RIP unit 304 performs the process of expanding the PDL format of the electronic manuscript supplied from the edit device 214, into the bitmap format. In the expansion of the electronic manuscript into the bitmap format, the RIP unit 304 can perform various image processes such as a resolution conversion process corresponding to the resolution and others of the printing machine 218, an image scaling process, an image rotation process or image inversion process corresponding to the print format, or an appropriate combination of them.

The color conversion process unit 306 performs the color conversion process of the image data, using an input profile 314 and an output profile 316. The color conversion process unit 306 performs an input-side profile process of converting device-dependent data (device value) into device-independent data (non-device value) using the input profile 314, and performs an output-side profile process of converting device-independent data (non-device value) into device-dependent data (device value) using the output profile 316. The profile generated by the profile generation process unit 274 can be utilized as the input profile 314 or the output profile 316.

The term "input profile" is synonymous with the "input-side profile". The term "output profile" is synonymous with the "output-side profile". The color conversion process unit 306 corresponds to a mode of the "color conversion unit". The function of the color conversion process by the color conversion process unit 306 corresponds to a mode of the "color conversion function".

A configuration in which the input-side profile process using the input profile 314 and the output-side profile process using the output profile 316 are performed stepwise and thereby the color conversion is performed may be adopted, or a configuration in which the color conversion is performed by batch processing using a color conversion table in which the input profile 314 and the output profile 316 are arranged in a single table may be adopted.

Here, the color conversion process unit 306 can correct the profile depending on the print mode of the printing machine 218. The print mode means a variety of setting relevant to the print, as exemplified by the number of the nozzles of the printing head, the ink injection timing (one-way/both-way) of the printing head at the time of scanning, the number of the passes, the number and type of the mounted ink color, and the algorithm of the creation of ink injection control data.

The color conversion process unit 306 performs the color conversion process for the device value (for example, the CMYK value or the RGB value) of the electronic manuscript expanded by the RIP unit 304, and generates the device-dependent image data (herein, the image data of CMYK) to be used in the print by the printing machine 218.

The printing machine driver 308 generates the print control data to be used for the control of the print by the printing machine 218, from the image data expressed as the CMYK value. In the case of the printing machine 218 with the inkjet scheme shown in FIG. 11, the ink injection control data corresponding to each ink color (C, M, Y, K, LC, LM or W) is created from the CMYK value. This ink injection control data is associated with the ink injection operation (ON/OFF, the size of the ink dot diameter, or the like) of the printing machine 218, in accordance with the data definition specific to the printing machine 218. On this occasion, the conversion of a multi-gradation image (continuous-gradation image) having 8 bits or the like into a low-gradation image such as a binary image (the process called the "quantization process" or the "halftone process") is required, and a known algorithm such as the dither matrix or the error diffusion method can be used.

In FIG. 13, an inkjet printing machine, which is a non-plate type digital printing machine, is assumed as the printing machine 218, but a mode in which the configuration of the printing machine driver 308 is mounted on the side of the printing machine 218 is also possible. Further, in the case where a plate type printing machine using a printing plate is employed instead of the inkjet printing machine, the system configuration includes a plate making device (not illustrated) such as a plate recorder that makes the printing plate from the image data, and a printing machine that performs the print using the printing plate obtained by the plate making device.

The interface unit 296 that takes in the information of the spectral reflectance measured by the colorimeter 30 corresponds to a mode of the "spectral reflectance acquisition unit", and the function of taking in the information of the spectral reflectance corresponds to a mode of the "spectral reflectance acquisition function". Further, the function of the control unit 260 that reads the spectral distribution data necessary for the computation, from the light source spectral distribution data storage unit 278 or the database DB and provides it to the colorimetric value prediction unit 270 corresponds to a mode of the "spectral distribution acquisition unit", and the function of taking in the spectral distribution data of the observation light source corresponds to a mode of the "spectral distribution acquisition function".

The function of the image processing device 216 can be implemented in a computer system, and the image processing device 216 takes a role as a color conversion system. For example, the function of the image processing device 216 can be implemented by combining a computer as a printed color prediction device that implements the color prediction function of the colorimetric value prediction unit 270 described in the image processing device 216, a computer as a profile generation device that implements the profile generation function of the profile generation process unit 274, and a computer as a color conversion device that implements the color conversion function of the color conversion process unit 306.

[Printed Color Prediction Method]

Figure 14:
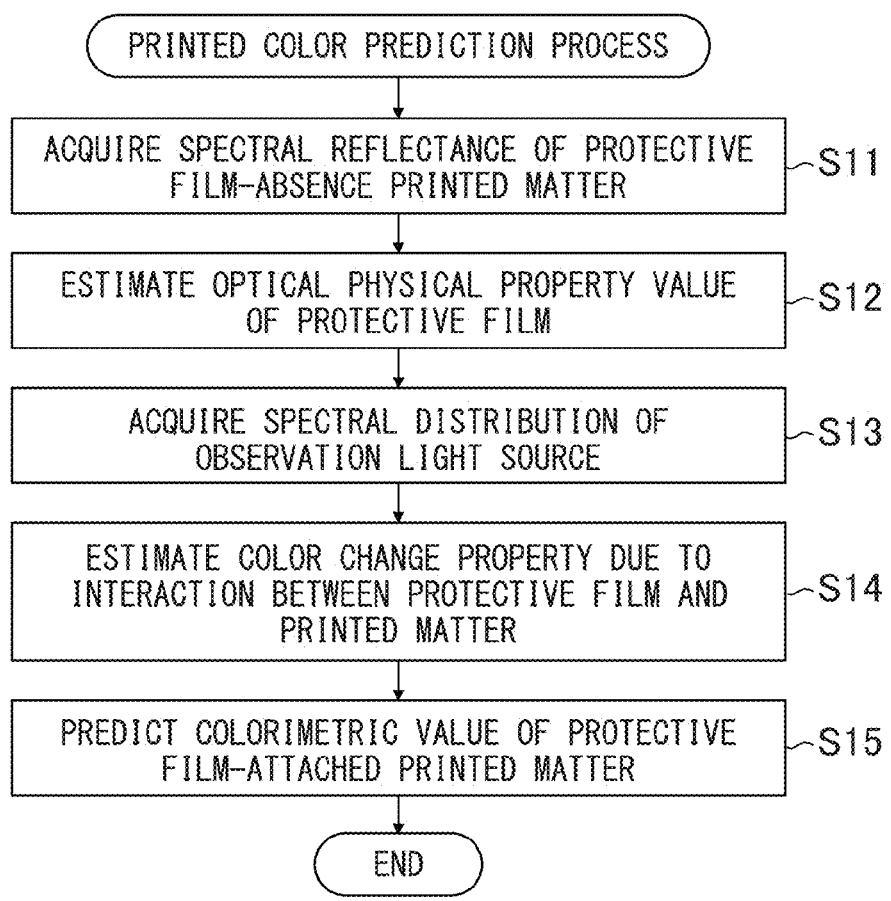
FIG. 14 is a flowchart showing the steps of the printed color prediction method according to the embodiment.

FIG. 14 is a flowchart in which the steps of a printed color prediction method according to the embodiment are organized.

A printed color prediction method according the embodiment includes a spectral reflectance acquisition step (step S11) of acquiring the spectral reflectance of the protective film-absence printed matter, an optical physical property value estimation step (step S12) of estimating the optical physical property value of the protective film, a spectral distribution acquisition step (step S13) of acquiring the spectral distribution of the observation light source, an interaction property estimation step (step S14) of estimating the color change property due to the interaction between the protective film and the printed matter, and a colorimetric value prediction step (step S15) of predicting the colorimetric value of the protective film-attached printed matter. Step S15 corresponds to the "prediction step". The process of acquiring the spectral reflectance of the protective film-absence printed matter in the spectral reflectance acquisition step (step S11) corresponds to the "spectral reflectance acquisition process". The process of estimating the optical physical property value of the protective film in the optical physical property value estimation step (step S12) corresponds to the "optical physical property value estimation process". The process of acquiring the spectral distribution of the observation light source in the spectral distribution acquisition step (step S13) corresponds to the "spectral distribution acquisition process". The process of estimating the color change property due to the interaction in the interaction property estimation step (step S14) corresponds to the "interaction property estimation process".

Figure 15:
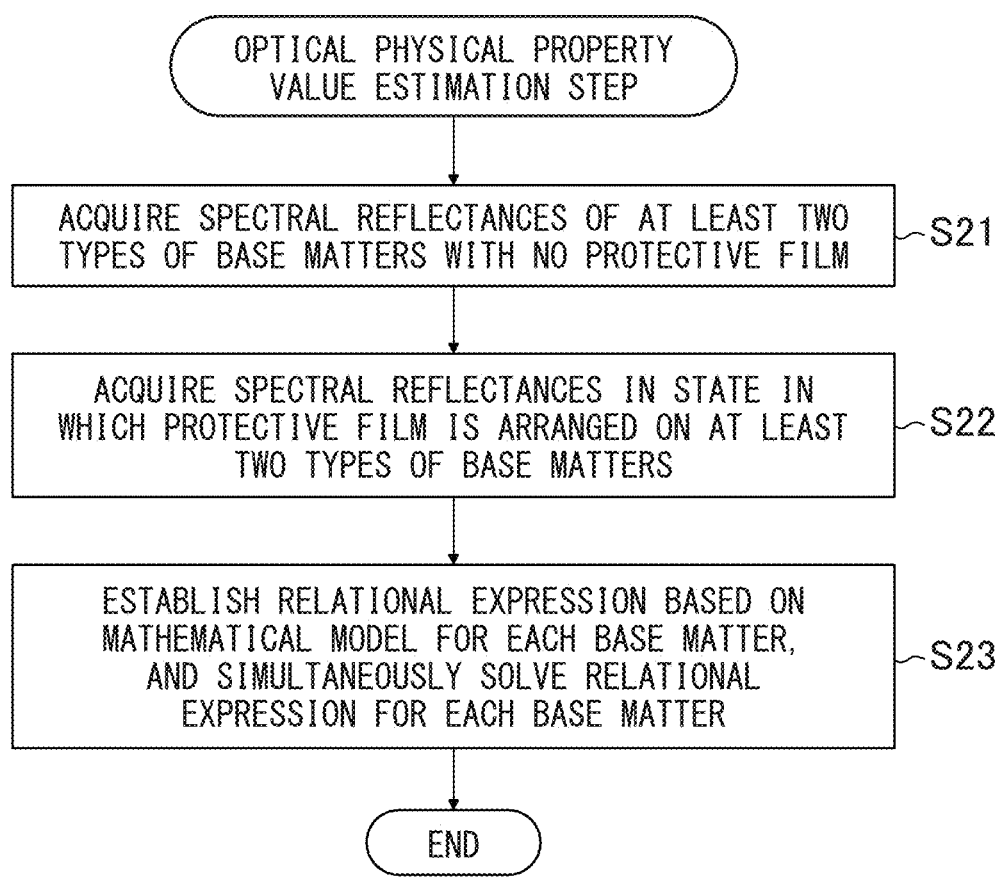
FIG. 15 is a flowchart showing the content of an optical physical property value estimation step.

FIG. 15 is a flowchart showing the content of the optical physical property value estimation step (step S12 in FIG. 14).

As shown in FIG. 15, the optical physical property value estimation step includes a step (step S21) of acquiring the spectral reflectances of at least two types of base matters with no protective film, a step (step S22) of acquiring the spectral reflectances in a state in which the protective film is arranged on the at least two types of base matters, and a computation step (step S23) of establishing a relational expression based on a mathematical model, for each base matter, using the spectral reflectances obtained in step S21 and step S22, and simultaneously solving the relational expression for each base matter.

Figure 16:
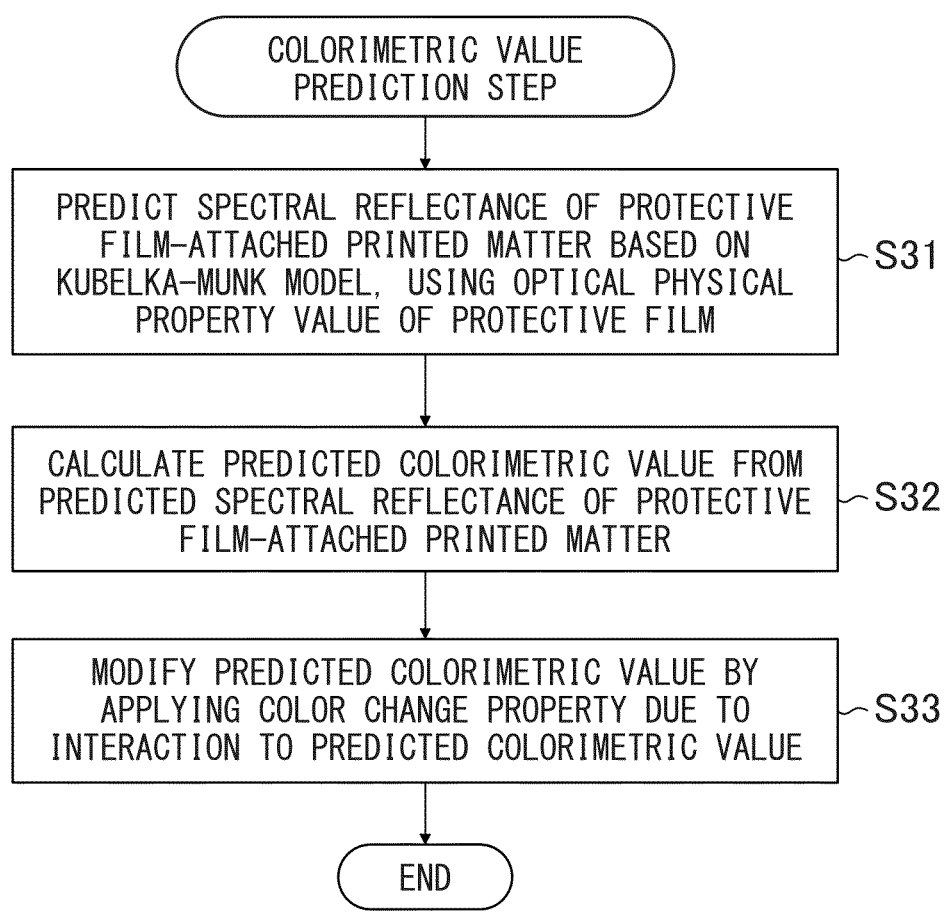
FIG. 16 is a flowchart showing the content of a colorimetric value prediction step.

FIG. 16 is a flowchart showing the content of the colorimetric value prediction step (step S15 in FIG. 14).

As shown in FIG. 16, the colorimetric value prediction step includes a step (step S31) of predicting the spectral reflectance of the protective film-attached printed matter based on the Kubelka-Munk model, using the optical physical property value of the protective film, a colorimetric value calculation step (step S32) of calculating the predicted colorimetric value from the spectral reflectance of the protective film-attached printed matter predicted in step S31, and a step (step S33) of modifying the predicted colorimetric value by applying the color change property due to the interaction to the predicted colorimetric value calculated in step S32.

Step S31 corresponds to the "first process step", and step S33 corresponds to the "second process step".

Figure 17:
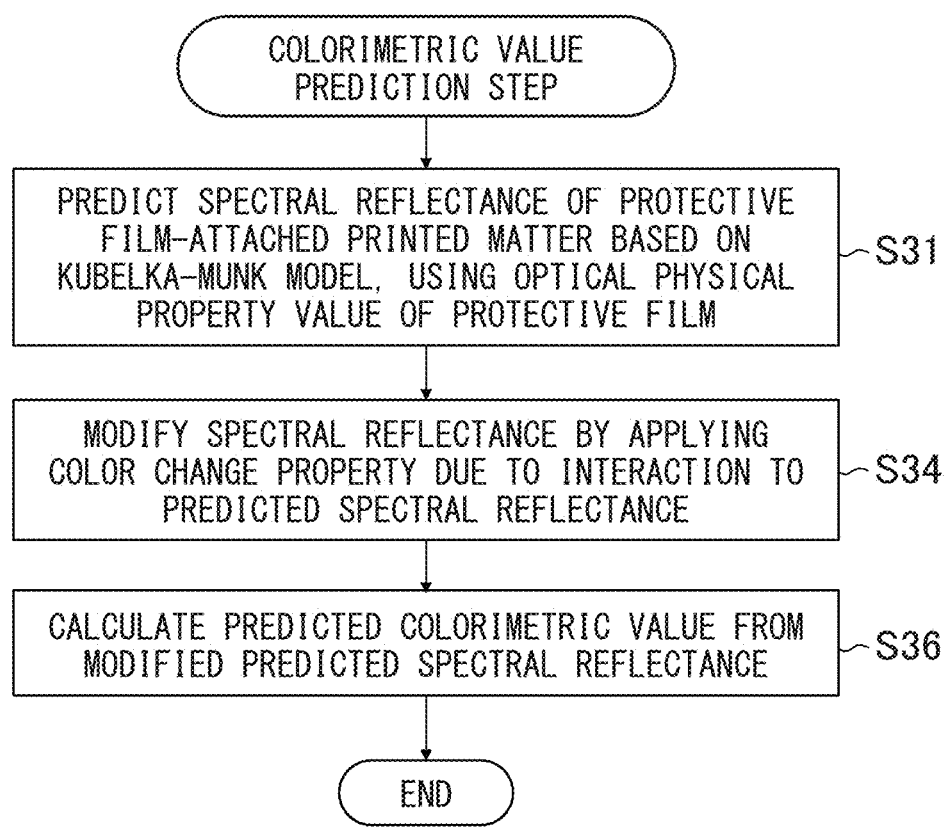
FIG. 17 is a flowchart showing the content of another example of the colorimetric value prediction step.

FIG. 17 is a flowchart showing another exemplary content of the colorimetric value prediction step (step S15 in FIG. 14). In FIG. 17, for the identical steps to the example described in FIG. 16, the identical step numbers are assigned.

As shown in FIG. 17, the colorimetric value prediction step can have a configuration in which that step includes a step (step S31) of predicting the spectral reflectance of the protective film-attached printed matter based on the Kubelka-Munk model, using the optical physical property value of the protective film, a step (step S34) of modifying the spectral reflectance by applying the color change property due to the interaction to the spectral reflectance predicted in step S31, and a colorimetric value calculation step (step S36) of calculating the predicted colorimetric value from the predicted spectral reflectance modified in step S34.

[Profile Generation Method]

Figure 18:
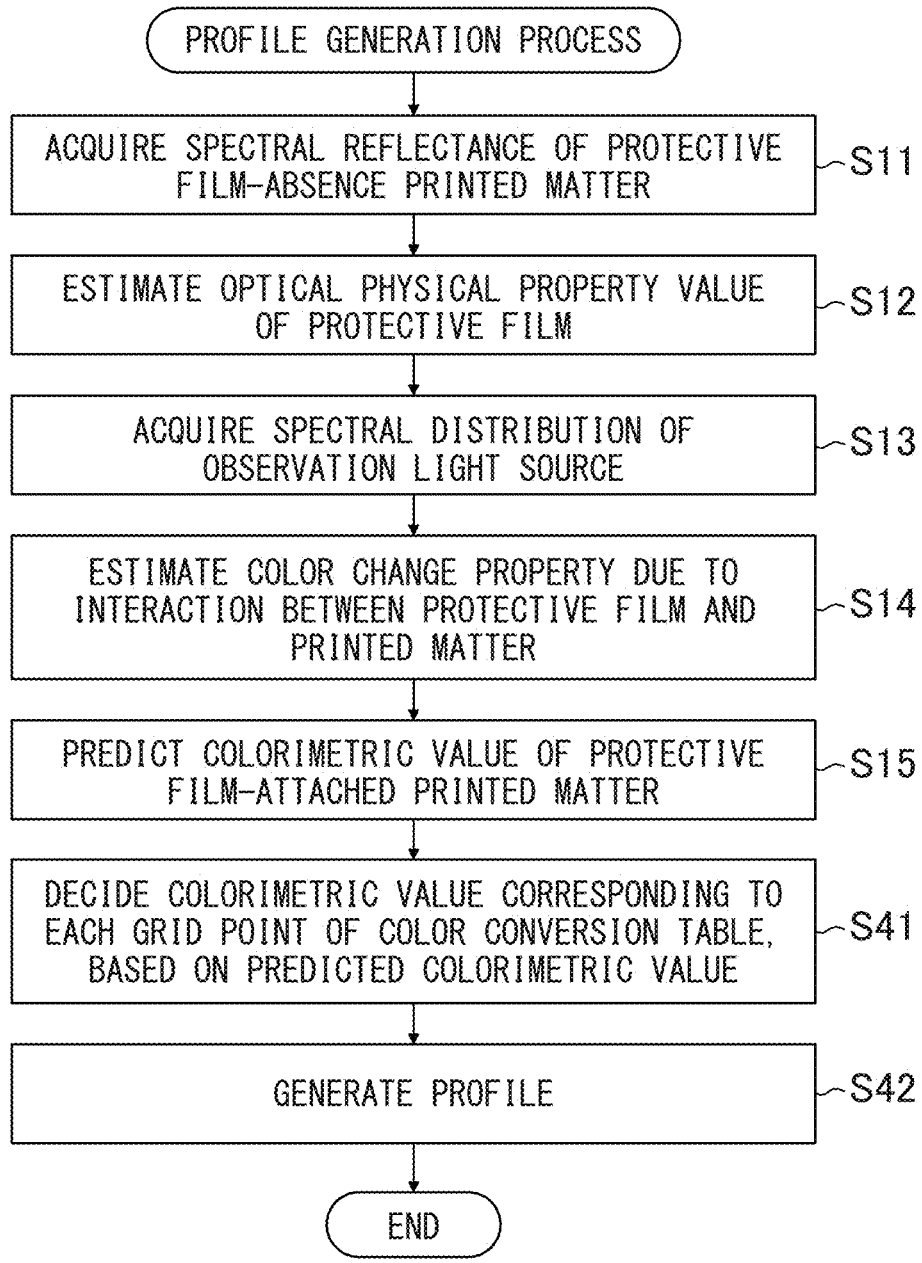
FIG. 18 is a flowchart showing the steps of a profile generation method according to the embodiment.

FIG. 18 is a flowchart in which the steps of a profile generation method according to the embodiment are organized. FIG. 18 includes the processes (steps S11 to S15) in the printed color prediction method described in FIG. 14. For the steps in common with the steps described in FIG. 14, the identical step numbers are assigned, and the descriptions are omitted. In the profile generation method in FIG. 18, in step S11, the spectral reflectance of each patch is acquired using a color chart with no protective film (in the example, the profile creation chart 50 with no protective film) as the protective film-absence printed matter. Then, in the steps of steps S12 to S15, the colorimetric value of each patch with the protective film is predicted. Each patch with the protective film corresponds to the "protective film-attached printed matter".

Furthermore, the profile generation method according to the embodiment includes a decision process step (step S41) of deciding the colorimetric value corresponding to each grid point of the multi-dimensional color conversion table, based on the colorimetric value (predicted colorimetric value) of each patch with the protective film predicted in step S15, and a generation process step (step S42) of generating the profile based on the correspondence relation between each grid point and the colorimetric value determined in step S41.

[Color Conversion]

The profile of the protective film-attached printed matter created as described above is applied to the color conversion process unit 306 (see FIG. 13), and is utilized for the color conversion. In the following, specific Utilization Examples 1 to 4 are described.

Utilization Example 1

Figure 19:
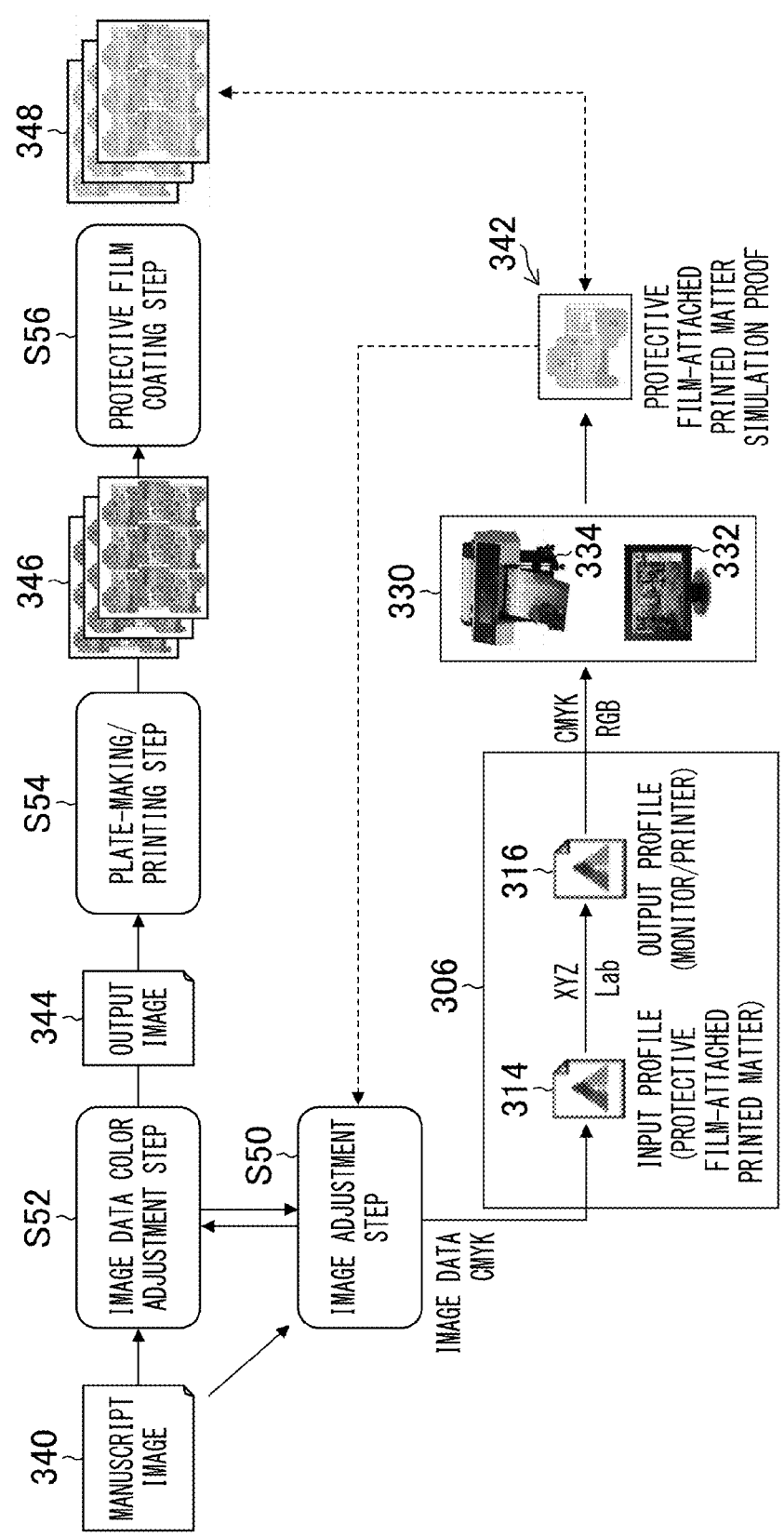
FIG. 19 is an explanatory diagram showing Utilization Example 1 of the color conversion using a profile of a protective film-attached printed matter created in the embodiment.

An Example in which the Simulation (Proof) of the Color of the Protective Film-Attached Printed Matter is Performed FIG. 19 is an explanatory diagram of Utilization Example 1. Utilization Example 1 involves a utilization mode in which the color of the protective film-attached printed matter is output on a monitor or a printer and is checked. Utilization Example 1 adopts a configuration in which the color of an intended protective film-attached printed matter can be checked by the display on the monitor, or by a printed matter with no protective film that is output by the printer, without coating an actual printed matter with the protective film (without actually making the protective film-attached printed matter).

In the utilization mode shown in FIG. 19, the profile of the protective film-attached printed matter is used as the input profile 314, and the profile of a proof output apparatus 330 is used as the output profile 316. As the proof output apparatus 330, a monitor 332 or a printer 334 can be used. The machine type and form of the proof output apparatus 330 are not particularly limited. As the monitor 332, the display device 226 (see FIG. 11 and FIG. 13) can be used. Further, as the printer 334, the printing machine 218 (see FIG. 11 and FIG. 13) can be used.

The image data indicating a manuscript image 340 is color-converted by the color conversion process unit 306, and is output to the proof output apparatus 330. In FIG. 19, the image data of the CMYK value is shown as the image data to be input to the color conversion process unit 306.

In the color conversion process unit 306, by an input-side profile process using the input profile 314, the image data of the CMYK value is converted into the data of the XYZ value or the Lab value. Further, by an output-side profile process using the output profile 316, the data of the XYZ value or the Lab value is converted into the data of the CMYK value or the RGB value. In the case of using the monitor 332 as the proof output apparatus 330, the data of the RGB value is provided from the color conversion process unit 306 to the side of the monitor 332. In the case of using the printer 334 as the proof output apparatus 330, the data of the CMYK value is provided from the color conversion process unit 306 to the side of the printer 334.

Thus, the proof output apparatus 330 generates a simulation proof 342 of the protective film-attached printed matter. The simulation proof 342 of the protective film-attached printed matter is a display image displayed on the monitor 332, or a printed matter (that the protective film does not coat) printed by the printer 334.

Based on the simulation proof 342 of the protective film-attached printed matter obtained in this way, it is possible to easily check the image of a finished color by the simulation proof 342, without actually making the protective film-attached printed matter.

An operator looks at the simulation proof 342 of the protective film-attached printed matter, and performs the adjustment of the image as necessary. In FIG. 19, this is described as "image adjustment step S50". The adjustment work in the image adjustment step S50 includes the process of modifying the signal value of the image data.

The image data after the adjustment by the image adjustment step S50 is color-converted and is output to the proof output apparatus 330, and thereby, it is possible to obtain the simulation proof 342 of the protective film-attached printed matter with respect to the image data after the adjustment. Such a work cycle is repeated one time or multiple times, and thereby, the image data making it possible to expect a desired finish is obtained.

After the color is decided with the simulation proof 342, an output image 344 for print is generated using the image data after the adjustment. In FIG. 19, the step of generating the output image 344 from the manuscript image 340 by performing the color conversion process after the image adjustment step S50 is described as "image data color adjustment step S52".

Based on the output image 344 obtained in this way, the plate-making and/or printing are performed so that a printed matter 346 is obtained. The step of performing the plate-making and/or printing is described as "plate-making/printing step S54". The printed matter 346 is a printed matter before the coating with the protective film, that is, a printed matter in a state of being not coated with the protective film. A protective film coating step S56 of coating the printed matter 346 with the protective film is performed so that a protective film-attached printed matter 348 is obtained.

The color of the protective film-attached printed matter 348, which is a printed matter after the coating with the protective film by the protective film coating step S56, accurately accords with the color decided with the simulation proof 342.

According to Utilization Example 1 described in FIG. 19, it is possible to easily check the finished color by the simulation proof 342, at the stage of the color adjustment, without actually making the protective film-attached printed matter. Therefore, it is possible to speedily circulate the cycle of "finish check→image adjustment (modification)→finish check→ . . . ", and to shorten the time for the color adjustment work. Further, Utilization Example 1 allows for the reduction in the man-hours and/or costs for the printing and protective film coating.

Utilization Example 2

Figure 20:
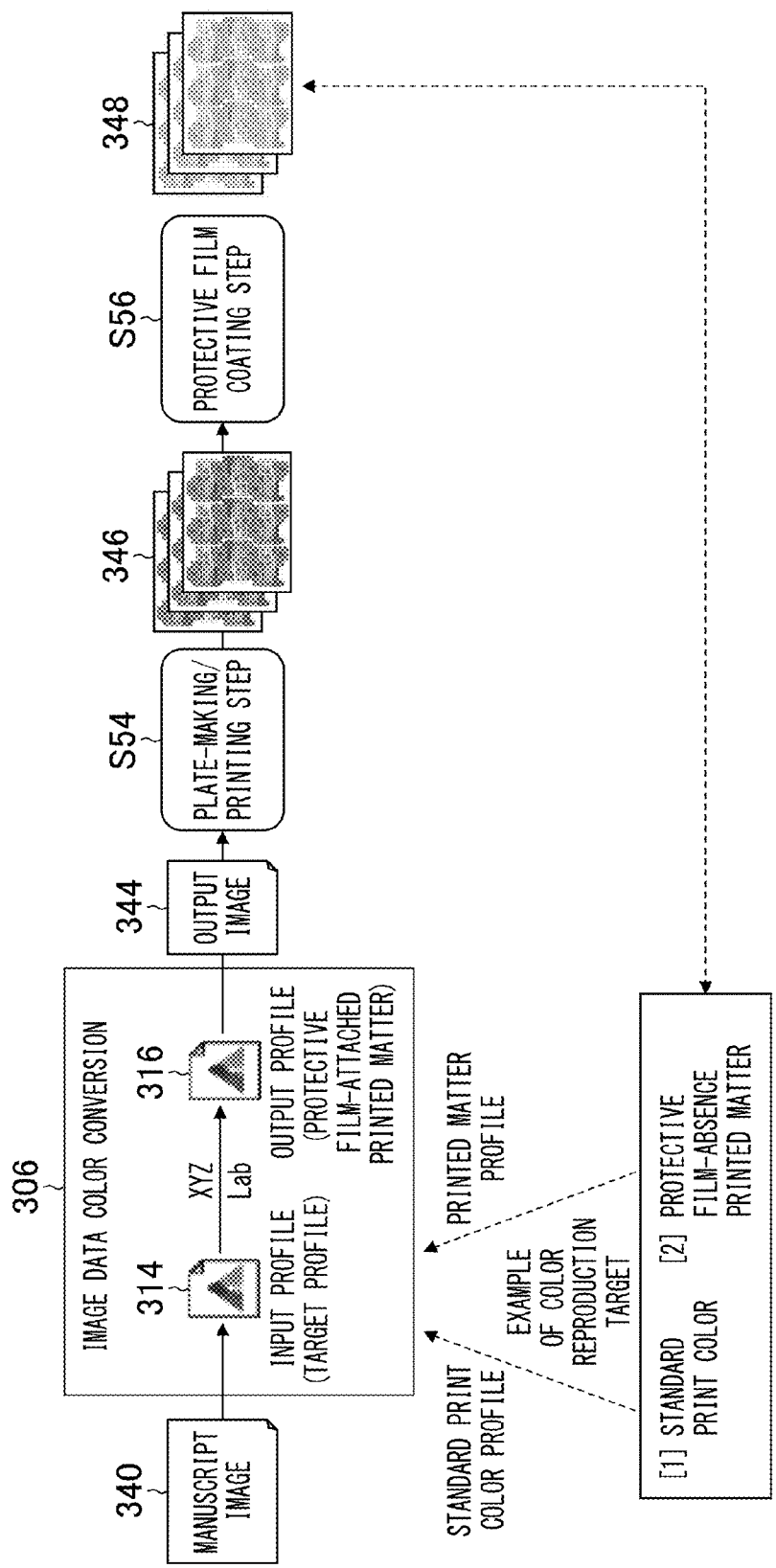
FIG. 20 is an explanatory diagram showing Utilization Example 2 of the color conversion using the profile of the protective film-attached printed matter created in the embodiment.

An Example in which the Correction of the Color Change Due the Protective Film is Performed FIG. 20 is an explanatory diagram of Utilization Example 2. Utilization Example 2 involves a utilization mode in which, in the case where a certain decided color reproduction target (target profile) is present, the image data is previously corrected (color-converted) such that the color after the coating with the protective film matches with the color reproduction target and then the printing is performed. When the printing is performed with no change by the target profile without considering the color change in the case of being coated with the protective film, the color after the coating with the protective film changes and the difference from the color reproduction target appears. In contrast, when a printed matter printed by Utilization Example 2 of the embodiment is coated with the protective film, the color matches with the color of the color reproduction target. Here, the expression "the color matches" includes not only the case where the color exactly coincides but also the case where the difference in the color falls within an allowable error range.

In FIG. 20, for the identical or similar elements to the configuration described in FIG. 19, the identical reference characters are assigned, and the descriptions are omitted.

In Utilization Example 2 shown in FIG. 20, the target profile that is the color reproduction target is used as the input profile 314, and the profile of the protective film-attached printed matter is used as the output profile 316.

Examples of the color reproduction target can include the standard print color of Japan Color (R) or the like, and the protective film-absence printed matter. In the case where the standard print color is the color reproduction target, the profile of the standard print color is the target profile. Further, in the case where the color reproduction target is a printed matter (protective film-absence printed matter) in a state of being not coated with the protective film, the target profile is the profile of the protective film-absence printed matter (that is, the profile of the printing machine).

The output image 344 obtained by performing the color conversion of the manuscript image 340 using the combination between the input profile 314 and the output profile 316 in this way is an image in which the color change amount due to the protective film has been corrected. Therefore, when the plate-making/printing step S54 is performed based on the output image 344 and the obtained printed matter 346 is coated with the protective film, the color of the protective film-attached printed matter 348 after the coating with the protective film matches with the color of the reproduction target.

Utilization Example 3

Figure 21:
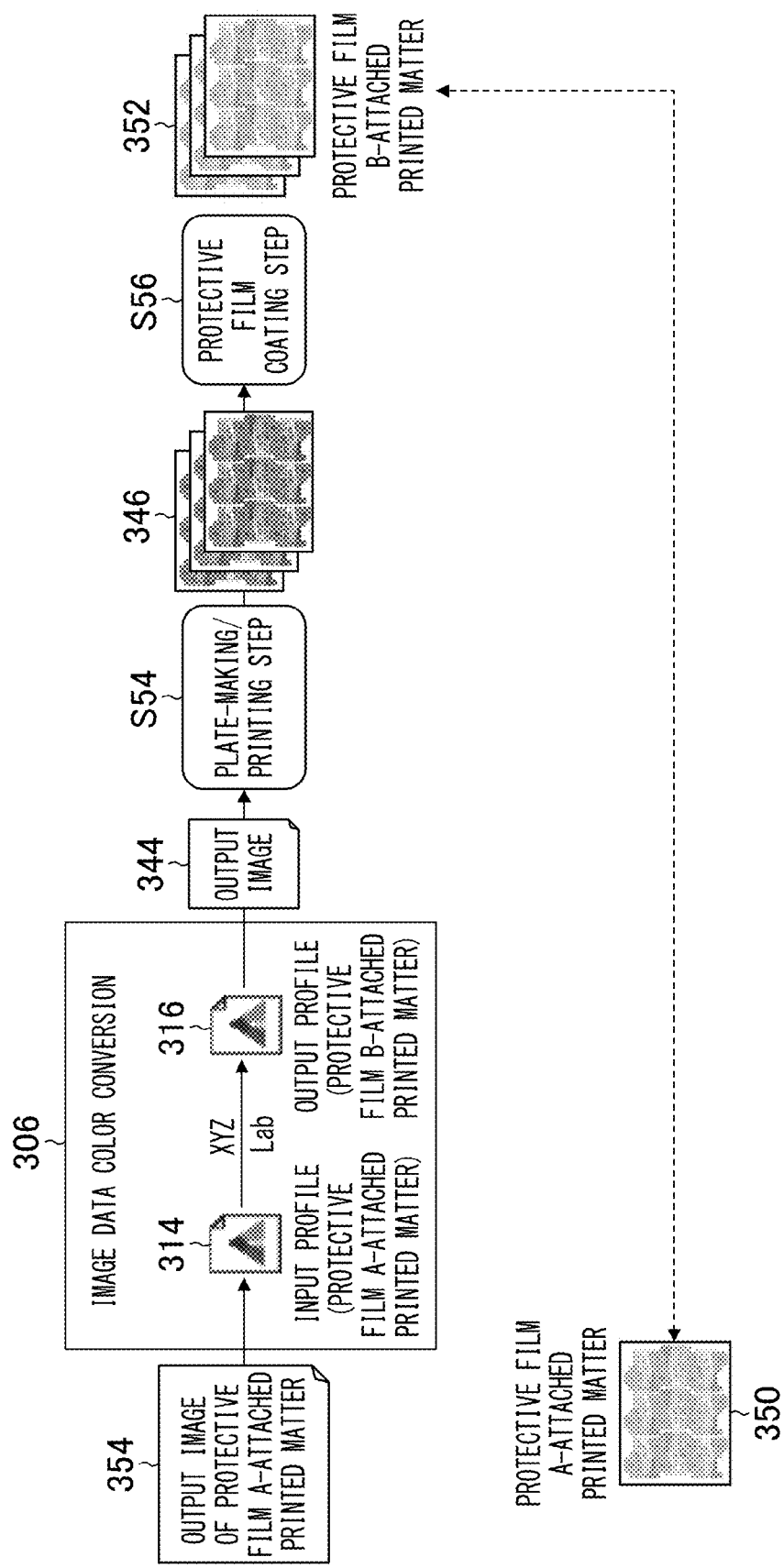
FIG. 21 is an explanatory diagram showing Utilization Example 3 of the color conversion using the profile of the protective film-attached printed matter created in the embodiment.

An Example in which the Color of a Protective Film A-Attached Printed Matter is Reproduced with a Protective Film B-Attached Printed Matter FIG. 21 is an explanatory diagram of Utilization Example 3. It is shown that a "protective film A" and a "protective film B" are different protective films from each other. In the case of being different in at least one of the material and thickness (film thickness) of the protective film, they are understood as the "different protective films from each other".

Utilization Example 3 involves a utilization mode in which the color of a protective film A-attached printed matter 350 as the target of the color reproduction and the color of a protective film B-attached printed matter 352 are matched. Utilization Example 3 is utilized, for example, in the case where for a certain protective film A, the color is once decided with the protective film A attached and thereafter it becomes necessary to alter the protective film to a protective film B. In FIG. 21, for the identical or similar elements to the configuration described in FIG. 19, the identical reference characters are assigned, and the descriptions are omitted.

In Utilization Example 3 shown in FIG. 21, the profile of the protective film A-attached printed matter is used as the input profile 314, and the profile of the protective film B-attached printed matter is used as the output profile 316. Then, the color conversion of the data of the output image 354 when the protective film A-attached printed matter is printed is performed. The printed matter 346 printed based on the output image 344 obtained by the color conversion process is coated with the protective film B, and thereby, the protective film B-attached printed matter 352 is obtained. The color of the protective film B-attached printed matter 352 made in this way matches with the color of the protective film A-attached printed matter 350.

Utilization Example 4

Figure 22:
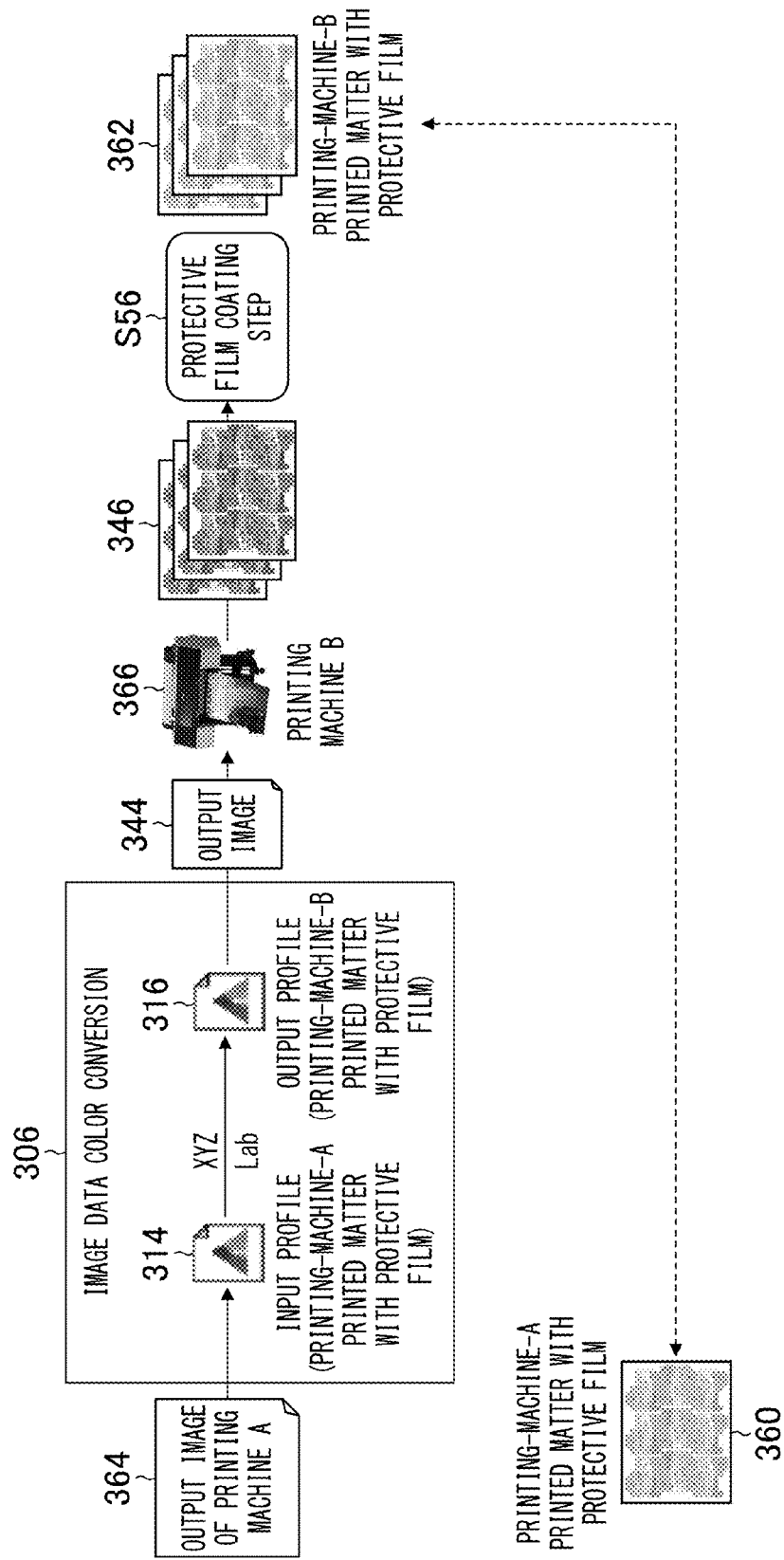
FIG. 22 is an explanatory diagram showing Utilization Example 4 of the color conversion using the profile of the protective film-attached printed matter created in the embodiment.

An Example in which the Color of a Protective Film-Attached Printed Matter by a Printing Machine A is Reproduced with a Protective Film-Attached Printed Matter by a Printing Machine B FIG. 22 is an explanatory diagram of Utilization Example 4. It is shown that a "printing machine A" and a "printing machine B" are different printing machines from each other. For example, suppose that the printing machine A is an offset printing machine and the printing machine B is an inkjet printer. Utilization Example 4 involves a utilization mode in which the color (including the texture of the protective film) to be actualized by the combination between the offset printing machine and the protective film is reproduced by the combination between the inkjet printer and the protective film.

In FIG. 22, a protective film-attached printed matter in which a printed matter printed by the printing machine A is coated with the protective film is described as "printing-machine-A printed matter 360 with protective film". Further, a protective film-attached printed matter in which a printed matter printed by the printing machine B is coated with the protective film is described as "printing-machine-B printed matter 362 with protective film". The protective film of the printing-machine-A printed matter 360 with the protective film and the protective film of the printing-machine-B printed matter 362 with the protective film are the same protective film.

In the utilization mode of the color conversion described in Utilization Example 1, the color reproduction on the protective film-attached printed matter is simulated for the monitor or printer, without being not actually coated with the protective film, but the texture such as the shiny appearance due to the protective film cannot be reproduced if the coating with the protective film is not actually performed.

By the configuration in Utilization Example 4, it is possible to simulate the finished color and texture due to the combination between the offset printing machine (printing machine A) and the protective film, by the combination between the inkjet printer as the printing machine B and the protective film, without actually performing the printing by the offset printing machine (printing machine A). In FIG. 22, the printing machine A is not illustrated, and the printing machine B is designated by reference numeral 366. In FIG. 22, for the identical or similar elements to the configuration described in FIG. 19, the identical reference characters are assigned, and the descriptions are omitted.

In Utilization Example 4 shown in FIG. 22, the profile of the printing-machine-A printed matter with the protective film is used as the input profile 314, and the profile of the printing-machine-B printed matter with the protective film is used as the output profile 316. Then, the color conversion of the data of the output image 364 printed by the printing machine A is performed. Based on the output image 344 obtained by the color conversion process, the printing is performed by the printing machine B 366, and the obtained printed matter 346 is coated with the protective film so that the printing-machine-B printed matter 362 with the protective film is obtained. The printing-machine-B printed matter 362 with the protective film made in this way matches in color and texture, with the printing-machine-A printed matter with the protective film.

Here, the optical physical property value of the protective film is the property specific to the protective film. Therefore, in the case where the same protective film is used on the side of the printing machine A and the side of the printing machine B, the same optical physical property value can be applied to both profile creations. However, the dot gain increase property is the change in the optical dot gain due to the interaction between the protective film and the printed matter, and therefore, the property varies depending on the halftone dot type and others in the print. The halftone dot type includes the number of the lines of an AM (Amplitude Modulation) screen, the difference in the type of AM halftone dot or FM (Frequency Modulation) halftone dot, and the like. That is, in the case where the halftone dot type differs between the side of the printing machine A and the side of the printing machine B, it is necessary to previously acquire the dot gain increase property due to the protective film for each and to apply a different dot gain increase property for each.

[Flow of Color Conversion Process]

As exemplified in Utilization Example 1 to Utilization Example 4, the profile of the protective film-attached printed matter generated by the profile generation process described in FIG. 18 is used as the input profile 314 or output profile 316 in the color conversion process unit 306 (see FIG. 13).

Figure 23:
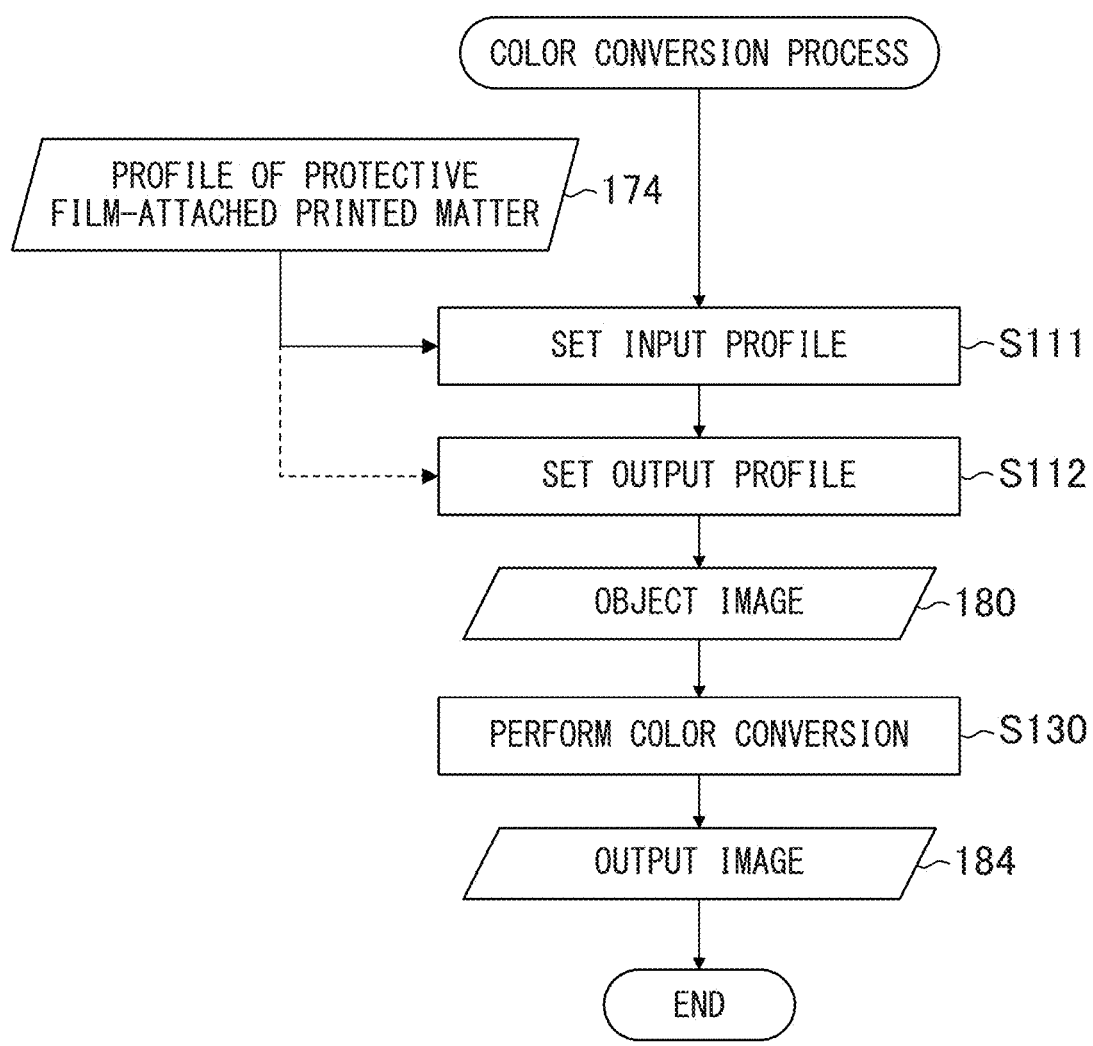
FIG. 23 is a flowchart of a color conversion method according to the embodiment.

FIG. 23 is a flowchart of a color conversion method according to the embodiment. The flowchart of FIG. 23 shows a comprehensive procedure that is common among Utilization Example 1 to Utilization Example 4 described in FIG. 19 to FIG. 22.

In the preparation necessary for the color conversion process according to the embodiment, a profile 174 of the protective film-attached printed matter is generated by the profile generation process described in FIG. 18. The profile 174 of the protective film-attached printed matter shown in FIG. 23 corresponds to the profile 74 described in FIG. 3.

Then, the profile 174 of the protective film-attached printed matter is set as the input profile 314 for the input-side profile process, or as the output profile 316 for the output-side profile process (step S111, step S112). Here, the processing orders of the process (step S111) of setting the input profile and the process (step S112) of setting the output profile can be exchanged for each other, and also both setting processes may be performed simultaneously.

As for step S111 and step S112, in Utilization Example 1 described in FIG. 19, the profile 174 of the protective film-attached printed matter is set as the input profile 314. In Utilization Example 2 described in FIG. 20, the profile 174 of the protective film-attached printed matter is set as the output profile 316. In Utilization Example 3 described in FIG. 21, the two types of the "profile of the protective film A-attached printed matter" and the "profile of the protective film B-attached printed matter" are generated as the profile 174 (see FIG. 23) of the protective film-attached printed matter, and the "profile of the protective film A-attached printed matter" is set as the input profile 314 while the "profile of the protective film B-attached printed matter" is set as the output profile 316. In Utilization Example 4 described in FIG. 22, the two types of the "profile of the printing-machine-A printed matter with the protective film" and the "profile of the printing-machine-B printed matter with the protective film" are generated as the profile 174 of the protective film-attached printed matter, and the "profile of the printing-machine-A printed matter with the protective film" is set as the input profile 314 while the "profile of the printing-machine-B printed matter with the protective film" is set as the output profile 316.

By steps S111 and S112 in FIG. 23, each of the input profile and the output profile is set, and thereafter, using these profiles, the color conversion is performed for the data of an object image 180 (step S130). By the process of the color conversion in step S130, the data of an output image 184 as the image after the color conversion is obtained.

The object image 180 in the case of Utilization Example 1 described in FIG. 19 is the manuscript image 340, or the image after the adjustment in which the image adjustment of the manuscript image 340 has been performed. Further, the output image 184 in the case of Utilization Example 1 is the output image 344 shown in FIG. 19, or the image after the color conversion that is given to the proof output apparatus 330.

The object image 180 in the case of Utilization Example 2 described in FIG. 20 is the manuscript image 340. The object image 180 in the case of Utilization Example 3 described in FIG. 21 is the output image 354 of the protective film A-attached printed matter. The object image 180 in the case of Utilization Example 4 described in FIG. 22 is the output image 364 of the printing machine A. Further, the output image 344 in FIG. 20 to FIG. 22 corresponds to the output image 184 shown in FIG. 23.

Figure 24:
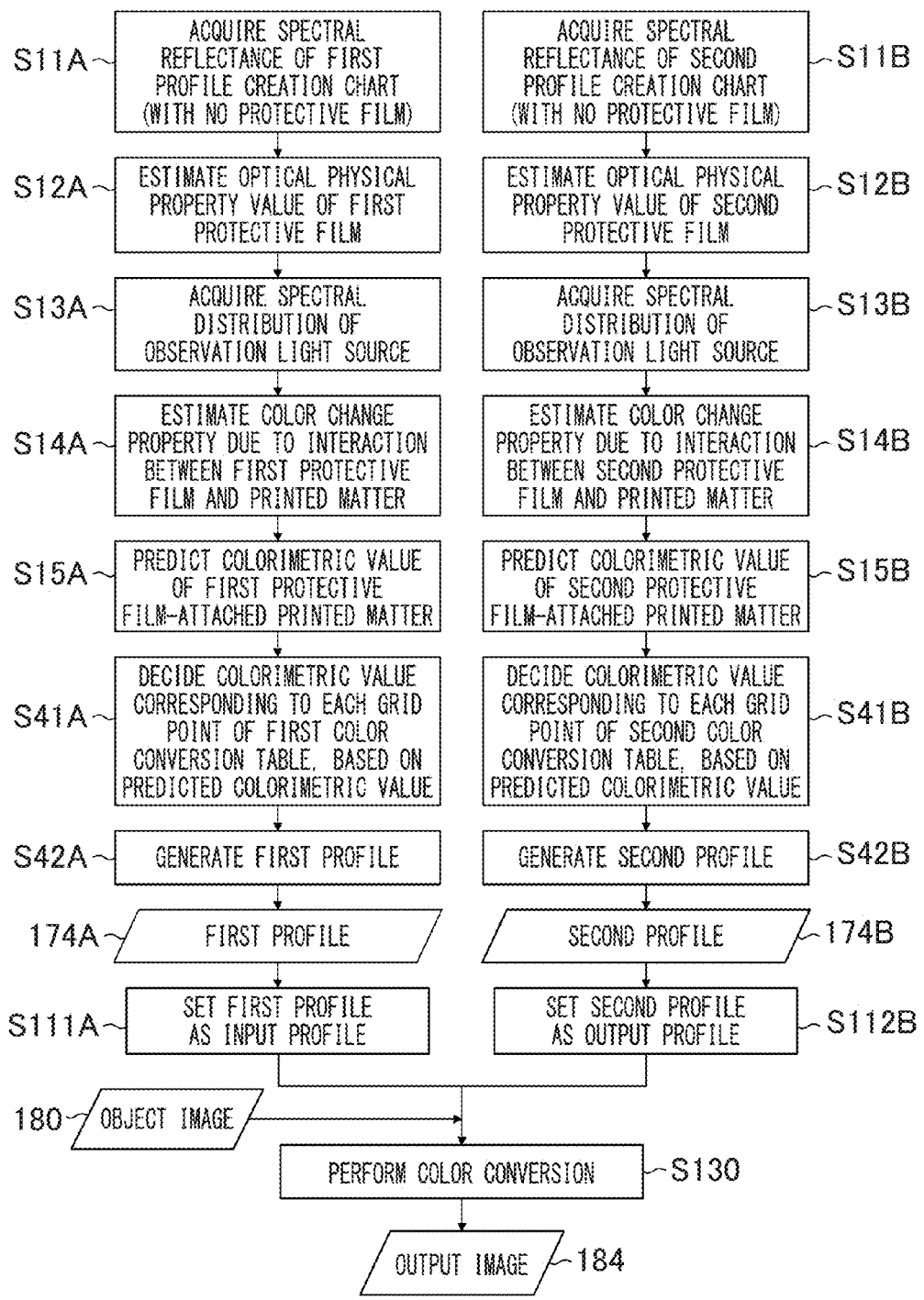
FIG. 24 is a flowchart showing an example of the color conversion method according to the embodiment.

FIG. 24 is a flowchart showing an example of the color conversion method according to the embodiment. The flowchart of FIG. 24 shows a comprehensive procedure that is common between the configurations exemplified in Utilization Example 3 and Utilization Example 4. FIG. 24 shows a flow in which a first profile 174A and a second profile 174B are obtained by applying, to two types of printed matters, the process of the profile generation process described in FIG. 18, and the color conversion is performed using them as the input profile and the output profile, respectively.

The reference characters such as the step numbers shown in the flowchart of FIG. 24 correspond to the reference characters used in the descriptions of the flowcharts described in FIG. 18 and FIG. 23, and for the elements and steps in common with the flowchart described in FIG. 23, the identical reference characters are used. In FIG. 24, the "A" or "B" added to the ends of the reference characters shows the difference between the two types of printed matters. The contents of the steps shown in FIG. 24 have been explained in FIG. 18 and FIG. 23, and therefore, for the description in FIG. 24, the detailed explanation is omitted.

The step of acquiring the spectral reflectance of a first profile creation chart with no protective film shown in step S11A of FIG. 24 corresponds to the step of acquiring the "spectral reflectance of a first color chart as a first printed matter". The colorimetric value of the "first profile creation chart with the protective film" as a first protective film-attached printed matter is predicted by the printed color prediction process in step S11A to step S15A of FIG. 24. Then, the colorimetric value corresponding to each grid point of a first color conversion table is decided based on the obtained predicted colorimetric value (step S41A), and a first profile is generated (step S42A). The first profile 174A obtained in this way is set as the input profile (step S111A).

Similarly, the step of acquiring the spectral reflectance of a second profile creation chart with no protective film shown in step S11B corresponds to the step of acquiring the "spectral reflectance of a second color chart as a second printed matter". The colorimetric value of the "second profile creation chart with the protective film" as a second protective film-attached printed matter is predicted by the printed color prediction process in step S11B to step S15B of FIG. 24. Then, the colorimetric value corresponding to each grid point of a second color conversion table is decided based on the obtained predicted colorimetric value (step S41B), and a second profile is generated (step S42B). The second profile 174B obtained in this way is set as the output profile (step S112B).

Utilization Example 3 described in FIG. 21 is an example in the case where the first protective film and the second protective film are different protective films from each other. The "profile of the protective film A-attached printed matter" described in Utilization Example 3 corresponds to the first profile 174A, and the "profile of the protective film B-attached printed matter" corresponds to the second profile 174B.

Utilization Example 4 described in FIG. 22 is an example in the case where the first protective film and the second protective film are the same protective film. The "profile of the printing-machine-A printed matter with the protective film" described in Utilization Example 4 corresponds to the first profile 174A, and the "profile of the printing-machine-B printed matter with the protective film" corresponds to the second profile 174B.

[Black Spot Correction]

As another additional configuration relevant to the process of the color conversion described above, a configuration in which a black spot correction is performed in the color conversion is also possible. The color reproduction range (gamut) greatly changes depending on the type of the protective film, and therefore, in a color conversion aimed at the colorimetric coincidence, there is a probability that the gradation on the shadow side is lost, leading to an undesirable result. Hence, it is preferable to include a configuration allowing for the addition of a black spot correction process.

The black spot correction is a color conversion process of performing a mapping such that the color values of black spots on the boundary of a gamut (hereinafter, referred to as a "first gamut") with respect to the first profile and the color values of black spots on the boundary of a gamut (hereinafter, referred to as a "second gamut") with respect to the second profile coincide.

As the algorithm for performing the black spot correction, for example, a technique disclosed in Japanese Patent Application Laid-Open No. 2004-153554 can be used. The outline of the technique is described with reference to FIGS. 25A to 25C.

Figure 25:
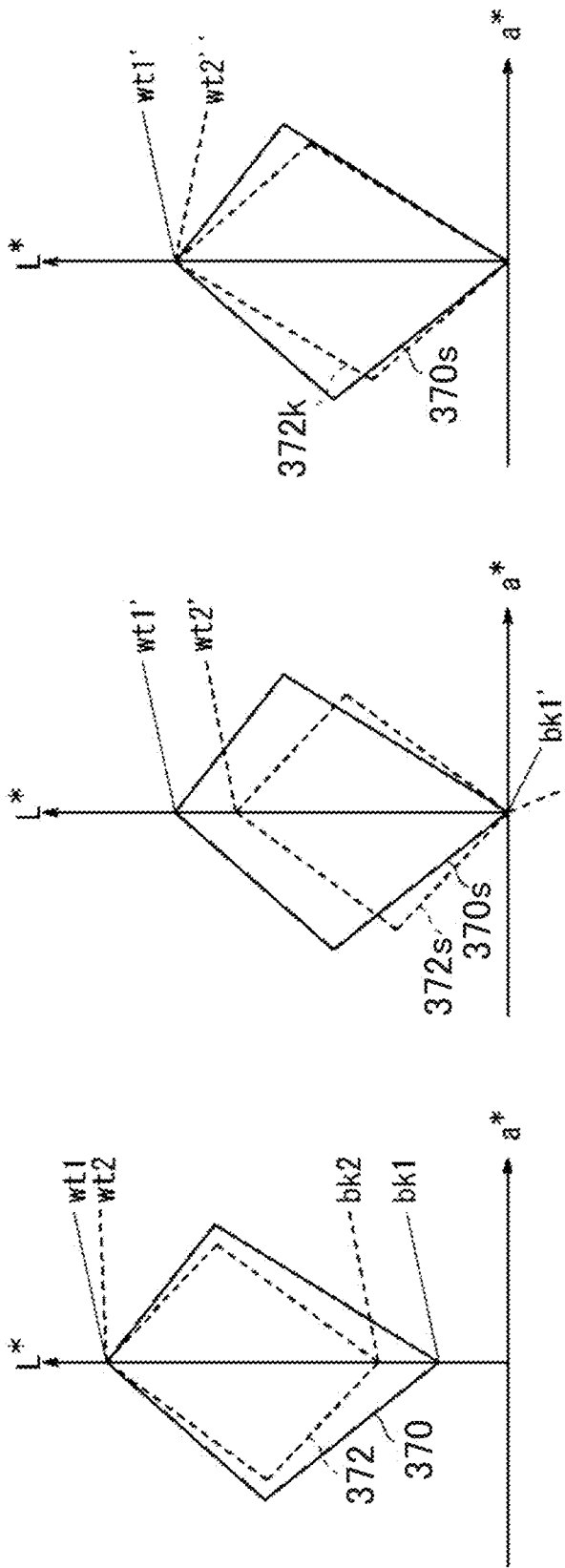
FIGS. 25A to 25C are explanatory diagrams showing a gamut conversion progress by black spot correction.

FIGS. 25A to 25C are diagrams for explaining a gamut conversion progress by the black spot correction. FIG. 25A is a graph showing the positional relation between a first gamut 370 (the region surrounded by the solid line) and a second gamut 372 (the region surrounded by the broken line) before the black spot correction is performed. The abscissa of the graph is defined as a* while the ordinate is defined as L*, and cross section diagrams in a three-dimensional color space L*a*b* are shown. The same goes for the axis definitions in the graphs shown in FIG. 25B and FIG. 25C.

For example, suppose that the first gamut 370 is a gamut when the observation is performed under a light source PS while a first medium is not coated with the protective film. Further, suppose that the second gamut 372 is a gamut when the observation is performed under the light source PS while the first medium is coated with the protective film. That is, the case where there is a difference between the first gamut 370 and the second gamut 372 depending on whether the coating with the protective film is performed is discussed.

Suppose that a white spot wt1 in the first gamut 370 is $(L^*_{wt1}, a^*_{wt1}, b^*_{wt1})$, and a black spot bk1 is $(L^*_{bk1}, a^*_{bk1}, b^*_{bk1})$. Further, suppose that a white spot wt2 in the second gamut 372 is $(L^*_{wt2}, a^*_{wt2}, b^*_{wt2})$, and a black spot bk2 is $(L^*_{bk2}, a^*_{bk2}, b^*_{bk2})$.

First, the parallel translation of the respective gamuts is performed downward such that the black spot bk1 in the first gamut 370 and the black spot bk2 in the second gamut 372 coincide. When the color values of the first gamut 370 and second gamut 372 after the black spot correction are $(L_1', a_1', b_1')$ and $(L_2', a_2', b_2')$ respectively, the conversion expressions for the respective gamuts are expressed as the following Expression (11) and Expression (12).

$$(L_1', a_1', b_1') = (L^* - L^*_{bk1}, a^* - a^*_{bk1}, b^* - b^*_{bk1}) \quad (11)$$

$$(L_2', a_2', b_2') = (L^* - L^*_{bk2}, a^* - a^*_{bk2}, b^* - b^*_{bk2}) \quad (12)$$

In this way, a first gamut 370s and second gamut 372s after the parallel translation are obtained (see FIG. 25B). As shown in FIG. 25B, the color value of a black spot bk1' after the conversion of the black spot bk1 and the color value of a black spot bk2' after the conversion of the black spot bk2 both are (0, 0, 0) and coincide.

Next, a gamut conversion is performed such that a white spot wt1' in the first gamut 370s and a white spot wt2' in the second gamut 372s coincide while the coincidence of the bk1' and the bk2' is maintained. Here, the region of the first gamut 370s is larger than the region of the second gamut 372s, and therefore, the conversion is performed such that the second gamut 372s is expanded upward.

In the embodiment, the Von-Kries conversion, which is a type of color adaptation model, is applied, and a method of matching the white spot while fixing the black spot is used. The conversion algorithm is not limited to this, and for example, the similarity conversion of the gamut (the alteration of the ratio), the Bradford conversion, the CIECAM97 s conversion, the CIECAM02 s conversion and the like may be used.

The Von-Kries conversion expression from the second gamut 372s into a second gamut 372k is expressed as the following Expression (13).

[Expression 1]

$$\begin{bmatrix} X'' \\ Y'' \\ Z'' \end{bmatrix} = [M^{-1}] \begin{bmatrix} P_{new}/P_{org} & 0 & 0 \\ 0 & Q_{new}/Q_{org} & 0 \\ 0 & 0 & R_{new}/R_{org} \end{bmatrix} [M] \begin{bmatrix} X' \\ Y' \\ Z' \end{bmatrix} \quad (13)$$

Here, (X', Y', Z') is a color value before the gamut conversion, (X", Y", Z") is a color value after the gamut conversion, $[M^{-1}]$ is the inverse conversion matrix of [M], and [M] is a 3×3 matrix for converting a color value XYZ into a color value PQR, which is relevant to the response of the cone of the eye. The other variables are expressed as the following Expression (14).

[Expression 2]

$$\begin{bmatrix} P_{org} \\ Q_{org} \\ R_{org} \end{bmatrix} = [M] \begin{bmatrix} X'_{wt2} \\ Y'_{wt2} \\ Z'_{wt2} \end{bmatrix}, \quad \begin{bmatrix} P_{new} \\ Q_{new} \\ R_{new} \end{bmatrix} = [M] \begin{bmatrix} X'_{wt1} \\ Y'_{wt1} \\ Z'_{wt1} \end{bmatrix}, \quad (14)$$

Here, the color values of the white spot wt1' and the white spot wt2' are $(X_{wt1}', Y_{wt1}', Z_{wt1}')$ and $(X_{wt2}', Y_{wt2}', Z_{wt2}')$, respectively.

Meanwhile, instead of performing the gamut conversion in two stages in the above way, the second gamut 372 may be directly converted into the second gamut 372k. The conversion expression can be expressed as the following Expression (15) and Expression (16).

[Expression 3]

$$\begin{bmatrix} X'' \\ Y'' \\ Z'' \end{bmatrix} = [M^{-1}] \begin{bmatrix} (P''_{wt} - P''_{bk})(P - P_{bk})/(P_{wt} - P_{bk}) + P''_{bk} \\ (Q''_{wt} - Q''_{bk})(Q - Q_{bk})/(Q_{wt} - Q_{bk}) + Q''_{bk} \\ (R''_{wt} - R''_{bk})(R - R_{bk})/(R_{wt} - R_{bk}) + R''_{bk} \end{bmatrix} \quad (15)$$

[Expression 4]

$$\begin{bmatrix} P \\ Q \\ R \end{bmatrix} = [M] \begin{bmatrix} X \\ Y \\ Z \end{bmatrix}, \quad (16)$$

$$\begin{bmatrix} P'_{wt} \\ Q'_{wt} \\ R'_{wt} \end{bmatrix} = [M] \begin{bmatrix} X_{wt} \\ Y_{wt} \\ Z_{wt} \end{bmatrix}, \quad \begin{bmatrix} P_{bk} \\ Q_{bk} \\ R_{bk} \end{bmatrix} = [M] \begin{bmatrix} X_{bk} \\ Y_{bk} \\ Z_{bk} \end{bmatrix},$$

$$\begin{bmatrix} P''_{wt} \\ Q''_{wt} \\ R''_{wt} \end{bmatrix} = [M] \begin{bmatrix} X''_{wt} \\ Y''_{wt} \\ Z''_{wt} \end{bmatrix}, \quad \begin{bmatrix} P''_{bk} \\ Q''_{bk} \\ R''_{bk} \end{bmatrix} = [M] \begin{bmatrix} X''_{bk} \\ Y''_{bk} \\ Z''_{bk} \end{bmatrix}$$

Here, the color values of the white spot wt2 and black spot bk2 in the second gamut 372 are $(X_{wt}, Y_{wt}, Z_{wt})$ and $(X_{bk}, Y_{bk}, Z_{bk})$, respectively, and the color values of the white spot wt2" and black spot bk2" in the second gamut 372k are $(X_{wt}", Y_{wt}", Z_{wt}")$ and $(X_{bk}", Y_{bk}", Z_{bk}")$, respectively.

Meanwhile, the relation between the L*a*b* and the XYZ is expressed as the following Expression (17) to Expression (19).

[Expression 5]

$$L^* = 116\left(\frac{Y}{Y_{ST}}\right)^{\frac{1}{3}} - 16 \quad (17)$$

$$a^* = 500\left\{\left(\frac{X}{X_{ST}}\right)^{\frac{1}{3}} - \left(\frac{Y}{Y_{ST}}\right)^{\frac{1}{3}}\right\} \quad (18)$$

$$b^* = 200\left\{\left(\frac{Y}{Y_{ST}}\right)^{\frac{1}{3}} - \left(\frac{Z}{Z_{ST}}\right)^{\frac{1}{3}}\right\} \quad (19)$$

Here, ($X_{ST}$, $Y_{ST}$, $Z_{ST}$) represents the standard color value. By the inverse conversion of Expression (17) to Expression (19), the color value (L*, a*, b*) can be uniquely converted into the color value (X, Y, Z).

In this way, the second gamut 372k after the Von-Kries conversion is obtained. As shown in FIG. 25C, the color value of the white spot wt1' and the color value of the white spot wt2" after the conversion of the white spot wt2' coincide.

Thus, the mapping (in the embodiment, the parallel translation of the gamut) is performed such that the color value of the black spot with respect to the first profile and the color value of the black spot with respect to the second profile coincide, and thereby, the first printed matter and the second printed matter can roughly coincide, particularly in the color reproducibility in the shadow region.

[Adjustment of Color Change Property Parameter]

It is preferable to adopt a configuration in which the parameters obtained by the color change property parameter estimation process 40 described in FIG. 3 can be adjusted through a GUI (Graphical User Interface).

Figure 26:
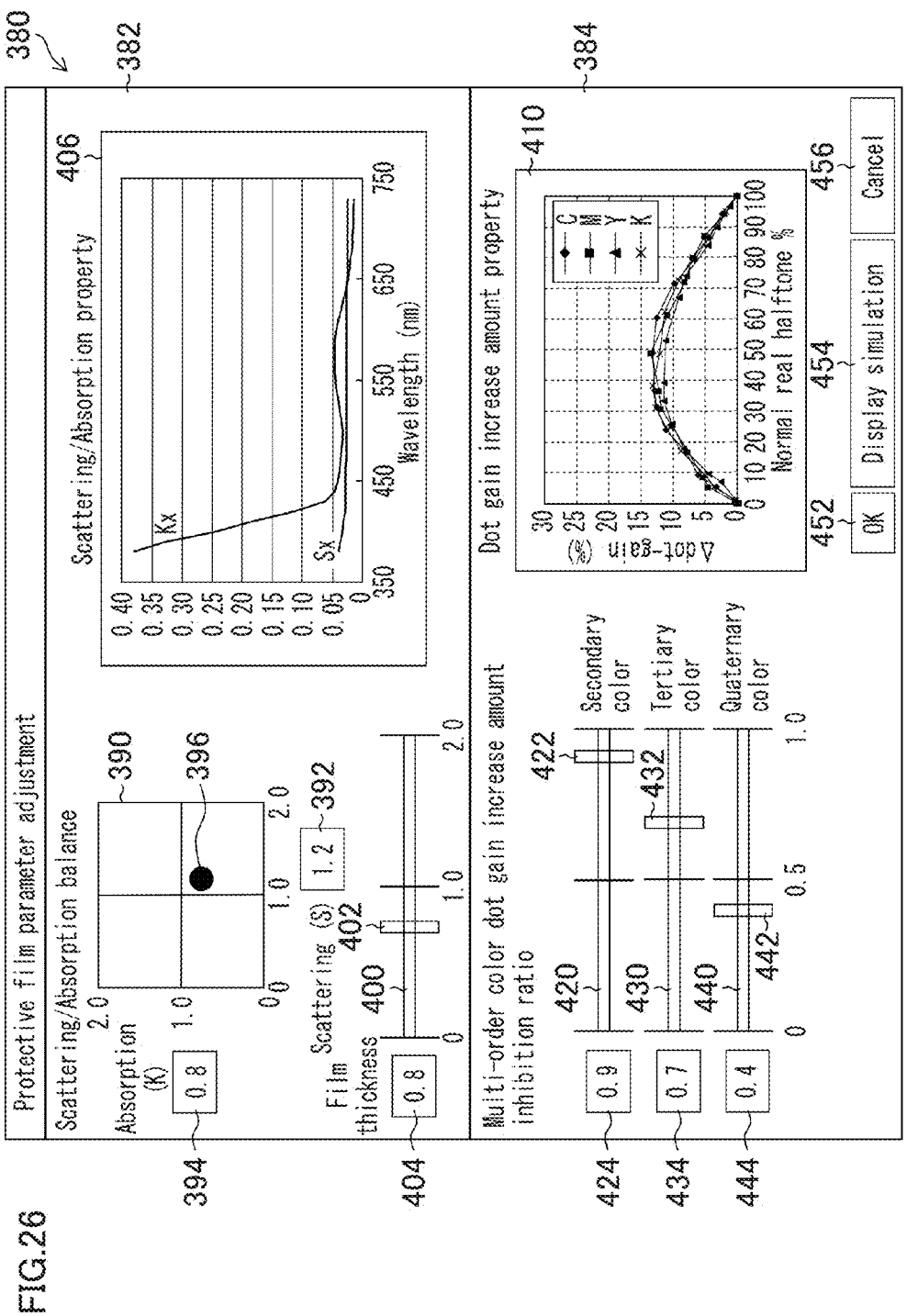
FIG. 26 is a diagram showing an example of an adjustment GUI (Graphical User Interface) screen for adjusting color change property parameters.

FIG. 26 is a diagram showing an example of an adjustment GUI screen for adjusting the color change property parameter. The description of "protective film parameter" in FIG. 26 means the "color change property parameter". A protective-film parameter adjustment screen 380 shown in FIG. 26 includes an optical physical property value adjustment GUI display region 382 for adjusting the optical physical property value of the protective film, and a dot gain property adjustment GUI display region 384 for adjusting the parameter of the dot gain property due to the interface between the protective film and the printed matter.

FIG. 26 shows an example in which the optical physical property value adjustment GUI display region 382 is arranged on the upper side of the protective-film parameter adjustment screen 380 and the dot gain property adjustment GUI display region 384 is arranged on the lower side of the protective-film parameter adjustment screen 380, but the mode of the display layout on the screen is not limited to the example of FIG. 26. The arrangement relation between the upper side and the lower side may be exchanged, or they may be arranged so as to be horizontally arrayed. Alternatively, the optical physical property value adjustment GUI display region 382 and the dot gain property adjustment GUI display region 384 may be displayed on separate windows from each other.

The optical physical property value adjustment GUI display region 382 includes a coordinate display section 390, two text boxes 392, 394, a gauge 400 of a slider bar, a slider 402, one text box 404, and a graph display section 406.

The coordinate display section 390, for each of the scattering coefficient Sx and the adsorption coefficient Kx, displays an adjustable range (0.0 to 2.0 for both). The abscissa indicates the adjustment amount Cs of the scattering coefficient, and the ordinate indicates the adjustment amount Ck of the absorption coefficient. The numerical values of the adjustment amounts Cs, Ck function as the adjustment coefficients (multipliers) for the scattering coefficient Sx and the absorption coefficient Kx, respectively. When the adjustment is not performed, they are "1.0".

The coordinate display section 390 indicates the balance between the scattering coefficient and the absorption coefficient, by a coordinate point 396. The coordinate point 396 is moved by the mouse operation, the touch operation and others of the input device 228 (see FIG. 13), and thereby, the balance can be set. The position of the coordinate point 396 is linked with the numerical value input of the adjustment amounts (Cs, Ck).

In the text box 392 arranged at a lower portion of the coordinate display section 390, the numerical value of the adjustment amount Cs of the scattering coefficient is displayed. In the figure, "1.2" is exemplified as the numerical value of the adjustment amount Cs. In the text box 394 arranged at a left portion of the coordinate display section 390, the numerical value of the adjustment amount Ck of the absorption coefficient is displayed. In the figure, "0.8" is exemplified as the numerical value of the adjustment amount Ck. The numerical values in the text boxes 392, 394 can be directly altered by the key input operation and others of the input device 228 (see FIG. 13), and the position of the coordinate point 396 is altered in conjunction with the alteration of the numerical values. By such an operation from an operator, it is possible to adjust the balance between the scattering coefficient Sx and the absorption coefficient Kx of the protective film.

The gauge 400 displays a range (0.0 to 2.0) that can be set as the film thickness (x) of the protective film. The abscissa of the gauge 400 indicates the adjustment amount Cx of the film thickness. The numerical value of the adjustment amount Cx of the film thickness functions as the adjustment coefficient (multiplier) for the film thickness (x). When the adjustment is not performed, it is "1.0". By the mouse operation, the touch operation and others of the input device 228 (see FIG. 13), it is possible to move the slider 402 in the horizontal direction of FIG. 26 and to adjust the film thickness of the protective film. In the text box 404 arranged at a left portion of the gauge 400, the numerical value of the adjustment amount Cx of the film thickness is displayed. In the figure, "0.8" is exemplified as the numerical value of the adjustment amount Cx of the film thickness. The slider bar by the gauge 400 and the slider 402 is linked with the numerical value input, and by the key input operation and others from the input device 228 (see FIG. 13), it is possible to input a desired numerical value in the text box 404 and to alter the value of the film thickness (x) of the protective film.

In the graph display section 406, the parameter of the optical physical property value in the current adjustment state is displayed. That is, in the graph display section 406, the graphs of the scattering coefficient Sx and the absorption coefficient Kx in the current adjustment state are displayed. The abscissa of the graph indicates the wavelength (the unit is nanometer [nm]), and the ordinate indicates the value of each coefficient.

When the respective parameters for the scattering/absorption of the protective film are the adjustment amount Cs of the scattering coefficient, the adjustment amount Ck of the absorption coefficient and the adjustment amount Cx of the film thickness, the respective parameters after the adjustment are calculated by the following expressions, for each wavelength.

$$Kx(\text{after adjustment}) = Kx(\text{before adjustment}) \times Ck \times Cx$$

$$Sx(\text{after adjustment}) = Sx(\text{before adjustment}) \times Cs \times Cx$$

Next, the dot gain property adjustment GUI display region 384 is described. The dot gain property adjustment GUI display region 384 includes a graph display section 410, gauges 420, 430, 440 of three sliders, respective sliders 422, 432, 442 of the gauges 420, 430, 440, and three text boxes 424, 434, 444.

In the graph display section 410, the graph of the dot gain increase amount property for the primary color is displayed. In the graph shown here, as described in FIG. 3, the abscissa indicates the protective film-absence real area ratio, and the ordinate indicates the primary-color dot gain increase amount (Δdg). In the graph for each color, by the mouse operation, the touch operation and others of the input device 228 (see FIG. 13), it is possible to move a point on the graph and to adjust the parameter value.

The gauge 420 and the slider 422 constitute a slider bar for adjusting the dot gain increase amount inhibition ratio for the secondary color. The gauge 420 displays a range (0.0 to 1.0) that can be set as the dot gain increase amount inhibition ratio. In the text box 424 arranged at a left portion of the gauge 420, the numerical value of the dot gain increase amount inhibition ratio for the secondary color is displayed.

The gauge 430 and the slider 432 constitute a slider bar for adjusting the dot gain increase amount inhibition ratio for the tertiary color. In the text box 434 arranged at a left portion of the gauge 430, the numerical value of the dot gain increase amount inhibition ratio for the tertiary color is displayed.

The gauge 440 and the slider 442 constitute a slider bar for adjusting the dot gain increase amount inhibition ratio for the quaternary color. In the text box 444 arranged at a left portion of the gauge 440, the numerical value of the dot gain increase amount inhibition ratio for the quaternary color is displayed.

Similarly to the relation between the slider 402 and text box 404 for the film thickness adjustment already described, the operation of the sliders 422, 432, 442 is linked with the numerical value input, and the direct numerical value input into the text boxes 424, 434, 444 is possible.

Further, the protective-film parameter adjustment screen 380 shown in FIG. 26 includes an OK button 452, a simulation display button 454 and a cancel button 456. The description of "button" means a GUI button. Here, the expression of "pressing" for the GUI button includes the operation to perform the input of an instruction corresponding to the button, as exemplified by click, touch or mouseover.

When the OK button 452 is pressed, the setting of the adjustment values of the parameters is saved. When the cancel button 456 is pressed, the investigation work is canceled, the protective-film parameter adjustment screen 380 is closed, and the setting work is finished.

When the simulation display button 454 is pressed, the printed color prediction simulation starts on the screen of the display device 226 (see FIG. 13). That is, the printed color of the protective film-attached printed matter is reproduced on the screen of the display device 226 in a simulative manner, allowing for the prediction, evaluation and others of the appearance. It is preferable that the display device 226 is a high-brilliance and high-definition monitor.

The result of the adjustment on the protective-film parameter adjustment screen 380 described in FIG. 26 can checked by the simulation display on the monitor. The color conversion in the simulation display has been described in [Utilization Example 1].

[Adjustment of Profile]

A configuration allowing for a further adjustment of the profile of the protective film-attached printed matter created by the profile generation process unit 274 in FIG. 13 may be added, and the profile after the adjustment may be used as the profile of the protective film-attached printed matter at the time of the color conversion process.

As the way of the adjustment of the profile, for example, there is a method of blending the LUT (the correspondence relation of data halftone dot area ratio→colorimetric value) for the profile of the protective film-absence printed matter and the LUT (the correspondence relation of data halftone dot area ratio→colorimetric value) for the profile of the protective film-attached printed matter, at a predetermined ratio. Specifically, the weighted average value of the output values (colorimetric values) of the above two LUTs with respect to an identical data halftone dot area ratio is adopted as the output value of the LUT for the adjusted profile with respect to the data halftone dot area ratio. That is, when the LUT output value for the profile of the protective film-absence printed matter with respect to a certain data halftone dot area ratio is represented as $(X_0, Y_0, Z_0)$, the LUT output value for the profile of the protective film-attached printed matter is represented as $(X_1, Y_1, Z_1)$, and the weight is represented as w ($0 \leq w \leq 1$), the colorimetric value $(X_1', Y_1', Z_1')$ after the adjustment is as the following expressions. Here, in the case of w=1, it coincides with the protective film-attached profile before the adjustment.

$$X_1' = (1-w) \cdot X_0 + w \cdot X_1$$

$$Y_1' = (1-w) \cdot Y_0 + w \cdot Y_1$$

$$Z_1' = (1-w) \cdot Z_0 + w \cdot Z_1$$

This is applied to all grid points of the LUT, and the colorimetric value that is the output value of the LUT is replaced with $(X_1', Y_1', Z_1')$.

By the configuration allowing for such an adjustment, it is possible to easily adjust the effect of the correction of the color change due to the protective film and the effect of the simulation. For example, in the case of intending to slightly decrease the degree of the effect of the color correction, the w can be utilized, for example, by being adjusted from "1.0" to "0.9".

[Other Configuration Example of Image Processing Device]

Figure 27:
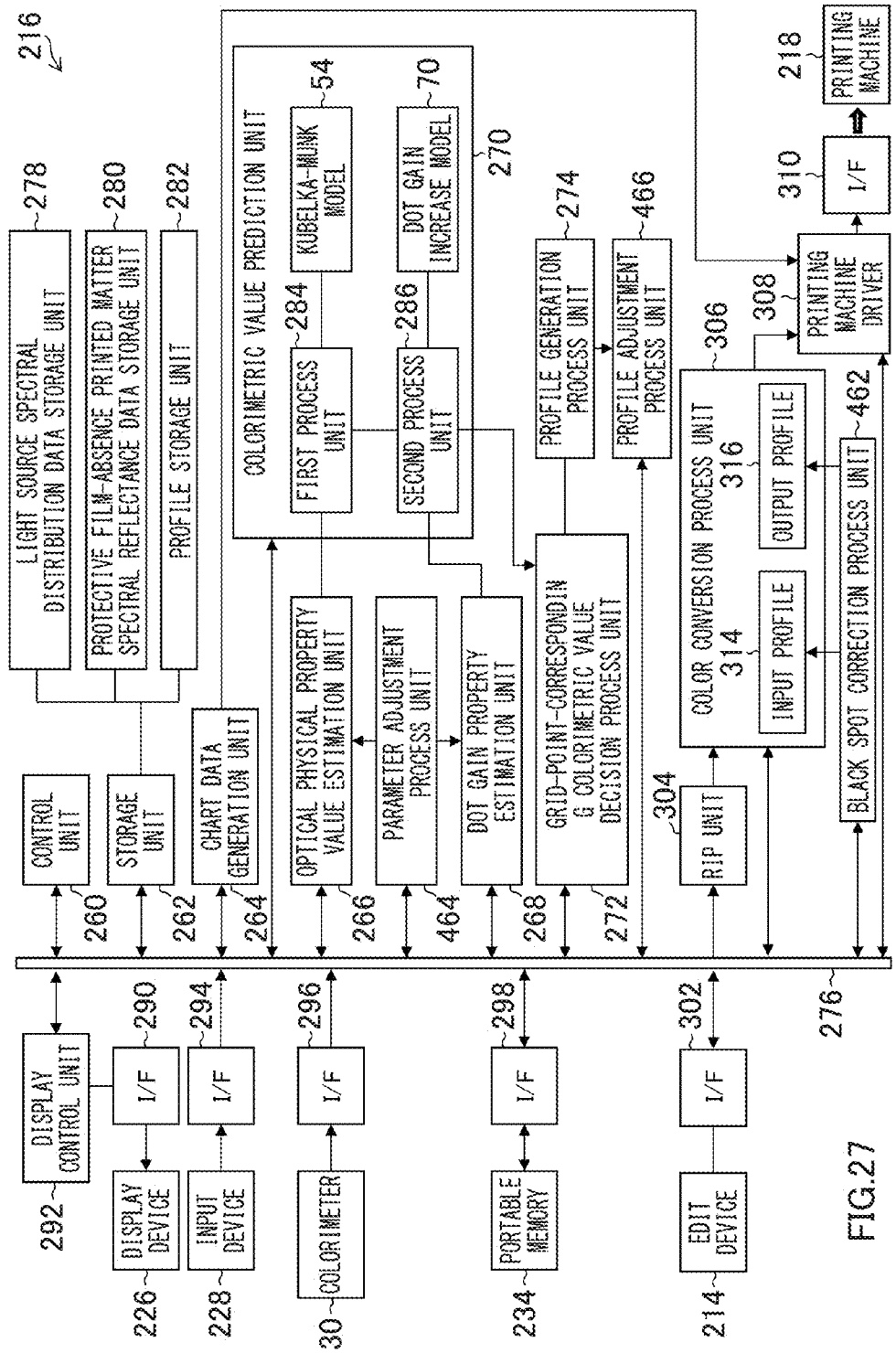
FIG. 27 is a functional block diagram showing another configuration example of the image processing device.

FIG. 27 is a functional block diagram showing another configuration example of the image processing device 216. In FIG. 27, for the identical or similar elements to the configuration shown in FIG. 13, the identical reference numerals are assigned, and the descriptions are omitted. The image processing device 216 shown in FIG. 27 includes a black spot correction process unit 462, a parameter adjustment process unit 464, and a profile adjustment process unit 466, in addition to the configuration shown in FIG. 13.

The black spot correction process unit 462 performs the process of the black spot correction described in FIGS. 25A to 25C. The parameter adjustment process unit 464 performs the adjustment process of the color change parameter described in FIG. 26. The profile adjustment process unit 466 performs the above-described adjustment process of the profile, and generates the profile after the adjustment.

<Program for Making Computer Function as Image Processing Device>

A program for making a computer function as the image processing device 216 described in the above embodiment can be recorded in a CD-ROM (compact disc read only memory), a magnetic disc, or another computer-readable medium (a tangible and non-transitory information storage medium), and the program can be provided through the information storage medium. Instead of such a mode in which the program is stored in the information storage medium and is provided, it is also possible to provide program signals as a download service by utilizing a communication network such as the internet. Further, it is also possible to provide the image processing device 216 as an application server, and perform a service to provide the processing functions through a communication network.

Further, by incorporating this program into the computer, it is possible to make the computer implement each function of the image processing device 216, and to implement the image processing function described in the above embodiment.

Advantage of Embodiment

The above embodiment of the present invention includes the process of the dot gain increase model 70 as the dot gain correction process for the middle tone based on the color change property due to the interaction between the protective film and the base printed matter. Thereby, the color prediction accuracy for the protective film-attached printed matter is enhanced much more, compared to the conventional technology. Further, by performing the color conversion process using the profile created from the color prediction result described in the embodiment, the accuracy of the simulation and the accuracy of the color correction are enhanced.

In the embodiment of the present invention described above, constituent features can be appropriately altered, added or deleted, in a range without departing from the spirit of the present invention. The present invention is not limited to the embodiment described above, and a person with an ordinary skill in the field can made many modifications, within the technical idea of the present invention.

Example of Modification 1

In the embodiment, the number of the color patches 244 included in the color chart 238c in FIG. 12 exemplified as the profile creation chart 50 is 100, the number of the spectral data is 41, and the interval of the light wavelength is 10 nm. However, they may be configured to be freely alterable, taking into consideration the color reproduction accuracy, the image processing time and the like comprehensively.

Example of Modification 2

Further, in the embodiment, the Kubelka-Munk model is used as the prediction expression for the colorimetric value of the protective film-attached printed matter. However, needless to say, without being limited to this, modified expressions of the Kubelka-Munk model, or other mathematical models can be applied. Similarly, in the embodiment, the Murray-Davies expression is used as the calculation expression for the area ratio of the halftone dot. However, needless to say, without being limited to this, modified expressions of the Murray-Davies expression, or other mathematical models can be applied.

Example of Modification 3

Furthermore, in the embodiment shown in FIG. 11, the configuration of using the printing machine 218 with the inkjet scheme has been described. However, without being limited to this, the present invention can be applied also to configurations of employing printing machines with various printing schemes such as an electrophotography, a heat-sensing scheme or a flexographic printing, regardless of a plate scheme/non-plate scheme.

What is claimed is:

1. A printed color prediction method for predicting a color reproduction on a protective film-attached printed matter in which a protective film coats a printed matter, the printed color prediction method comprising:
   a spectral reflectance acquisition step of acquiring a spectral reflectance in a protective film non-coating region of the printed matter, the printed matter having a printed surface that the protective film does not coat;
   an optical physical property value estimation step of performing a process of estimating an optical physical property value of the protective film;
   a spectral distribution acquisition step of acquiring a spectral distribution of an observation light source for the protective film-attached printed matter;
   an interaction property estimation step of performing a process of estimating a color change property due to an interaction between the printed matter as a base matter and the protective film, the printed matter being coated with the protective film; and
   a prediction step of predicting a colorimetric value of the protective film-attached printed matter, based on the spectral reflectance of the printed matter acquired by the spectral reflectance acquisition step, the optical physical property value of the protective film estimated by the optical physical property value estimation step, the spectral distribution of the observation light source acquired by the spectral distribution acquisition step and the color change property due to the interaction estimated by the interaction property estimation step;
   wherein in the interaction property estimation step, the process of estimating the color change property due to a change in dot gain as the interaction is performed based on a dot gain property in a case of presence of the protective film and a dot gain property in a case of absence of the protective film, the case of the presence of the protective film being a case of a state in which the protective film coats each of multiple types of base matters, the case of the absence of the protective film being a case of a state in which the protective film does not coat each of the multiple types of base matters, the multiple types of base matters having a monochromatic gradation by different halftone dot area ratios.

2. The printed color prediction method according to claim 1, wherein the color change property due to the interaction is a dot gain property that indicates a dot gain increase amount due to the interaction between the protective film and the printed matter as the base matter.

3. The printed color prediction method according to claim 1, wherein the optical physical property value of the protective film includes two independent optical physical property values of an intrinsic reflectance, a scattering coefficient and an absorption coefficient of the protective film for each light wavelength.

4. The printed color prediction method according to claim 1,
wherein the optical physical property value estimation step comprises:
a first acquisition step of acquiring spectral reflectances of at least two types of base matters that the protective film does not coat;
a second acquisition step of acquiring spectral reflectances in a state in which the protective film is arranged on each of the at least two types of base matters; and
a computation step of determining a relational expression based on a mathematical model, for each of the at least two types of base matters, using the respective spectral reflectances acquired in the respective steps of the first acquisition step and the second acquisition step and the optical physical property value of the protective film as an unknown value, and simultaneously solving the relational expression for each of the base matters, and
the optical physical property value of the protective film is estimated based on a computation process in the computation step.

5. The printed color prediction method according to claim 1,
wherein the interaction property estimation step comprises:
a step of calculating a dot gain increase amount that indicates a difference between a dot gain amount for a primary color in the case of the presence of the protective film and a dot gain amount for the primary color in the case of the absence of the protective film; and
a step of specifying a relation between the halftone dot area ratio of the base matter in the case of the absence of the protective film and the dot gain increase amount.

6. The printed color prediction method according to claim 1,
wherein the interaction property estimation step comprises:
a correction parameter acquisition step of acquiring a correction parameter for correcting data that indicates the color change property due to the interaction between the printed matter as the base matter and the protective film, the printed matter being coated with the protective film; and
a correction process step of correcting the color change property using the correction parameter.

7. The printed color prediction method according to claim 6,
wherein the data that indicates the color change property due to the interaction is data that indicates a dot gain increase amount property for a primary color, and
the correction parameter is a parameter that indicates an inhibition ratio of a dot gain increase amount relevant to a multi-order color of a secondary or higher color.

8. The printed color prediction method according to claim 1,
wherein the prediction step comprises:
a first process step of performing a process of predicting a spectral reflectance of the protective film-attached printed matter, based on a mathematical model, using the optical physical property value estimated by the optical physical property value estimation step; and
a second process step of modifying the spectral reflectance of the protective film-attached printed matter predicted by the first process step, or a predicted color value calculated based on the spectral reflectance of the protective film-attached printed matter predicted by the first process step, using the color change property due to the interaction estimated by the interaction property estimation step.

9. A profile generation method comprising:
a decision process step of predicting the colorimetric value of the protective film-attached printed matter from a spectral reflectance of a color chart as the printed matter, using the printed color prediction method according to claim 1, and further deciding a colorimetric value corresponding to each grid point of a color conversion table, based on the predicted colorimetric value of the protective film-attached printed matter; and
a generation process step of generating a profile based on the colorimetric value corresponding to each grid point of the color conversion table.

10. A printed color prediction device comprising at least one processor for predicting a color reproduction on a protective film-attached printed matter in which a protective film coats a printed matter, the at least one processor executes:
a spectral reflectance acquisition process that acquires a spectral reflectance in a protective film non-coating region of the printed matter, the printed matter having a printed surface that the protective film does not coat;
an optical physical property value estimation process that performs a process of estimating an optical physical property value of the protective film;
a spectral distribution acquisition process that acquires a spectral distribution of an observation light source for the protective film-attached printed matter;
an interaction property estimation process that performs a process of estimating a color change property due to an interaction between the printed matter as a base matter and the protective film, the printed matter being coated with the protective film; and
a prediction process that predicts a colorimetric value of the protective film-attached printed matter, based on the spectral reflectance of the printed matter acquired by the spectral reflectance acquisition process, the optical physical property value of the protective film estimated by the optical physical property value estimation process, the spectral distribution of the observation light source acquired by the spectral distribution acquisition process and the color change property due to the interaction estimated by the interaction property estimation process,
wherein the interaction property estimation process estimates the color change property due to a change in dot gain as the interaction is performed based on a dot gain property in a case of presence of the protective film and a dot gain property in a case of absence of the protective film, the case of the presence of the protective film being a case of a state in which the protective film being a case of a state in which the protective film does not coat each of the multiple types of base matters, the multiple types of base matters having a monochromatic gradation by different halftone dot area ratios.

11. A profile generation device comprising:
the printed color prediction device according to claim 10;
the at least one processor executes a decision process that decides a colorimetric value corresponding to each grid point of a color conversion table, based on the colorimetric value of the protective film-attached printed matter predicted from a spectral reflectance of a color chart as the printed matter by the prediction process; and a generation process that generates a profile based on the colorimetric value corresponding to each grid point of the color conversion table.

12. A non-transitory computer-readable medium recording a program for causing a computer to execute the printed color prediction method according to claim 1.

* * * * *